United States Patent
Johnson et al.

(10) Patent No.: US 12,485,402 B2
(45) Date of Patent: Dec. 2, 2025

(54) THREE RESIN REACTORS IN SERIES PEPTIDE SYNTHESIZER

(71) Applicant: Eli Lilly and Company, Indianapolis, IN (US)

(72) Inventors: Martin D. Johnson, Carmel, IN (US); Michael E. Kopach, Greenwood, IN (US); Mark R. Berglund, Zionsville, IN (US); Stephen Robert Groskreutz, Brownsburg, IN (US); Jingyao Wang, Carmel, IN (US); Luke P. Webster, Indianapolis, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 699 days.

(21) Appl. No.: 17/796,484

(22) PCT Filed: Jan. 29, 2021

(86) PCT No.: PCT/US2021/015856
§ 371 (c)(1),
(2) Date: Jul. 29, 2022

(87) PCT Pub. No.: WO2021/158444
PCT Pub. Date: Aug. 12, 2021

(65) Prior Publication Data
US 2023/0158468 A1    May 25, 2023

Related U.S. Application Data

(60) Provisional application No. 62/970,247, filed on Feb. 5, 2020.

(51) Int. Cl.
*C07K 1/04*     (2006.01)
*B01D 15/08*    (2006.01)
*B01J 19/00*    (2006.01)

(52) U.S. Cl.
CPC ......... *B01J 19/0046* (2013.01); *B01D 15/08* (2013.01); *C07K 1/045* (2013.01); *C07K 1/047* (2013.01); *B01J 2219/00596* (2013.01); *B01J 2219/00686* (2013.01); *B01J 2219/00693* (2013.01); *B01J 2219/00698* (2013.01); *B01J 2219/00707* (2013.01); *B01J 2219/00725* (2013.01); *B01J 2219/00759* (2013.01)

(58) Field of Classification Search
CPC ........ B01J 19/0046; B01J 2219/00596; C07K 1/045; C07K 1/047; B01D 15/08
See application file for complete search history.

(56) References Cited

U.S. PATENT DOCUMENTS

| | | |
|---|---|---|
| 4,362,699 A | 12/1982 | Verlander et al. |
| 2002/0019013 A1 | 2/2002 | Lou et al. |
| 2014/0303356 A1 | 10/2014 | Gramer et al. |
| 2018/0057525 A1 | 3/2018 | Simon et al. |

FOREIGN PATENT DOCUMENTS

| | | |
|---|---|---|
| CN | 109879936 A | 6/2019 |
| EP | 0260634 A2 | 9/1987 |
| EP | 2204225 A1 | 7/2010 |
| RU | 2577964 C2 | 3/2016 |
| WO | 2012004384 A2 | 1/2012 |
| WO | 2012056300 A2 | 7/2012 |
| WO | 2019028168 A1 | 2/2019 |

OTHER PUBLICATIONS

International Search Report and Written Opinion in International Application No. PCT/US2021/015856, mailed Sep. 14, 2021, 8 pages.

*Primary Examiner* — Sikarl A Witherspoon
(74) *Attorney, Agent, or Firm* — Michael R. Asam

(57) ABSTRACT

A Solid Phase Peptide Synthesis (SPPS) device and method of using the same for manufacturing peptides is taught herein. The system comprises at least two reactors, each reactor including a quantity of SPPS resin. The reactors are positioned in series. A de-protecting agent is added to the first reactor and then transferred to the second and third reactors, in series, thereby operating to de-protect the protected N-group. Wash solvent is added to the first reactor and then transferred to the second and this operation repeated several times. Likewise, an amino acid activated ester solution is added, in series, to the first, second and third reactors, thereby operating to couple the amino acid to the de-protected N-group. Wash solvent is added to the first reactor and then transferred to the second and this operation repeated several times prior to the next cycle. The use of the reactors in series reduces the overall solvent required. Online LCMS is also used to monitor progress and identity of reactions happening within the solid phase resin particles.

39 Claims, 7 Drawing Sheets

39-mer backbone intermediate used in the synthesis of tirzepatide

THREE RESIN REACTORS IN SERIES PEPTIDE SYNTHESIZER

TECHNICAL FIELD

The present disclosure relates to a new system and method for manufacturing peptides synthetically. More specifically, the present disclosure relates to a device that uses resin reactors in series as a mechanism for coupling peptides together as part of Solid Phase Peptide Synthesis.

BACKGROUND

Solid Phase Peptide Synthesis ("SPPS") is the method and system that is most commonly used to synthesize polypeptides and amino acid sequences. SPPS involves coupling an activated amino acid (which is usually the terminal or last amino acid in the sequence) to a solid support. This solid support is usually is a polymeric resin bead that is functionalized (such as with an $NH_2$ group). The terminal amino acid (which generally has its $NH_2$ terminus protected via a F-moc, BOC or other protecting group) is reacted with the resin such that the functionalized group on the resin reacts with and binds to the activated COOH group of the terminal amino acid. In this manner, the terminal amino acid is covalently attached to the resin.

Then, in the next step, the $NH_2$ terminus of the terminal amino acid is de-protected, thereby exposing its $NH_2$ group for the next reaction. Accordingly, a new amino acid is introduced. This new amino acid has its $NH_2$ terminus protected via a protecting group (such as an Fmoc, BOC or another protecting group). As such, when this new amino acid is added, the activated ester from the new amino acid reacts with the newly de-protected $NH_2$ group of the terminal amino acid, thereby coupling these two amino acids together. Once this new amino acid has been coupled, it likewise has a protected $NH_2$ group that may be subsequently de-protected and reacted with the next amino acid. By doing this repetitive, iterative process over and over, the entire amino acid sequence may be constructed. Once the entire sequence has been constructed, the sequence may be uncoupled (cleaved) from the resin and deprotected, thereby producing the amino acid structure. (It should be noted that the side chains of the various amino acids ($R_1$, $R_2$, etc.) that are added via this process may be orthogonally protected via groups such as BOC, t-butyl or trityl, etc. to prevent such side chains from reacting during the amino acid synthesis process. Also, one or more of the amino acids may have a "side chain" or other group as part of its structure that may also have to be protected. However, those skilled in the art will appreciate how such side chains or other group may be constructed, protected, and subsequently de-protected during the synthesis process.)

While this SPPS process is used commercially and is still the standard in peptide synthesis, it has a drawback in that it is expensive and time consuming. Each amino acid that is added must be de-protected and coupled, which is difficult and usually results in large quantities of solvents being used. Making matters worse is that many of these solvents are not environmentally friendly.

Accordingly, it would be an improvement to find a new way to use SPPS, that would address one or more of these deficiencies, especially in the commercial manufacturing of peptides. It would be a further advancement if such a system could be more environmentally friendly and reduce manufacturing costs. In fact, the present embodiments will specifically reduce the quantity of waste, and the quantity of solvent and reagents that are used. Such a method and system is disclosed herein.

SUMMARY

A process and system for coupling an amino acid "X" activated ester to a protected N-group (such as an $NH_2$ terminus) of an amino acid that is attached to a SPPS resin. Generally, the system will comprise a collection of reactors that are arranged in series. In some embodiments, two or more reactors are arranged in series. In a preferred embodiment, 3 or more reactors are arranged in series.

Each reactor contains a quantity of a protected N-group affixed to a peptide synthesis resin. This protected N-group may be an $NH_2$ group of an amino acid or may be an $NH_2$ group found on or covalently attached to the resin itself such as, but not limited to Sieber amide or Rink Amide resins. Other types of resins, such as Wang resins or CTC (chlorotrityl chloride) resins may also be used.

The first step in the process involves adding a first quantity of de-protecting reagent to the first reactor and allowing this reagent to contact the protected N-group. Then, this first quantity of de-protecting reagent is transferred from the first reactor to the second reactor and a second quantity of de-protecting reagent to the first reactor. The first quantity of de-protecting reagent is removed from the second reactor and the second quantity of de-protecting reagent is transferred from the first reactor to the second reactor. This second quantity of de-protecting reagent is then removed from the second reactor.

The purpose of contacting both the first and second reactors with the first and second quantity of de-protecting reagent is so that this de-protecting reagent will react with the protected N-group and, either separately or collectively, will operate to de-protect the protected N-group affixed to the peptide synthesis resin in both the first and second reactors. Thus, by adding the first and second quantity of de-protected reagent, the N-group in both the first and second reactors are unprotected and capable of being coupled to another amino acid. The first quantity of wash is added to the first reactor then transferred to the second reactor, then to waste. The wash cycle is repeated several times. The washing with solvent may be used with green solvents or solvents that are more environmentally friendly that is typically used with SPPS. Such green wash solvents include acetonitrile (ACN), ethyl acetate, isopropyl acetate, 2-MetHF (2-Methyltetrahydrofuran), and CPME (cyclopentyl methyl ether), or solvent mixtures such as NBP/THF 2/1 v/v, which is exemplified herein. The chemistry reactions could also occur in ACN, ACN/DMSO or n-butylpyrrolidinone, which are also green solvents.

Accordingly, a first quantity amino acid "X" and a first quantity of solvent is added to the first reactor and then after a certain amount of time, is transferred out of the first reactor and into the second reactor. It should be noted that the quantities of amino acid "X" that are added to the reactors are actually "activated esters" of the amino acid X, thereby facilitating the coupling reaction. However, for shorthand notation, it may be referred to herein as simply adding the "quantity of amino acid X" to the reactor, but those skilled in the art will appreciate that it is the activated ester. Alternatively, the unactivated amino acid may be added to the reactor and then an activate solution is added to react and convert the amino acid into an activated ester. That also falls within the meaning of adding an amino acid activated ester to a resin, as used herein.

A second quantity of amino acid "X" and a second quantity of solvent is added to the first reactor. The first and second quantity of amino acid "X" activated ester, either separately or collectively, couples the amino acid "X" to the de-protected N group in the first reactor. (Amino acid "X" activated ester may be any amino acid, including functionalized, derivatized or synthetic amino acids that are desired to be added to the chain). (As used herein, sometimes it is referred to that the amino acid "X" is coupled, however, those skilled in the art will appreciate that it is the activated ester that is most often used for easiness of reaction).

The first quantity of amino acid "X" and the first quantity of solvent is removed from the second reactor and the second quantity of amino acid "X" and the second quantity of solvent is transferred from the first reactor to the second reactor. Then the second quantity of amino acid "X" and the second quantity of solvent are removed the from the second reactor. The first and second quantity of amino acid "X", either separately or collectively, couples the amino acid "X" to the de-protected N group in the second reactor. The first quantity of solvent wash is added to the first reactor then transferred to the second reactor, then to waste. The solvent wash cycle is repeated several times. The second quantity of solvent wash may be in the first reactor simultaneously with the first quantity of solvent wash in the second reactor, and so on. Thus, after performing these steps the amino acid "X" will have been coupled to the de-protected N-group-thereby adding amino acid "X" to the chain. Of course, as with other SPPS systems, amino acid "X" contains a protected $NH_2$ group, and thus, the process above may be repeated (e.g., de-protecting the $NH_2$ group and coupling a new amino acid to it, in the manner outlined above). Thus, by repeating this process, the desired amino acid sequence and/or peptide may be constructed. Once the synthesis is finished, the constructed amino acid may be released (de-coupled) to the resin in both the first reactor and the second reactor.

Although the above-recited method uses two reactors in series, each with a supply of resin, other embodiments may be designed in which a third reactor, also containing a quantity of resin, is put in series with the first two reactors. In this embodiment, the de-protection step must also occur in the third reactor. So once first quantity of de-protecting reagent is removed from the second reactor, it is added to the third reactor. This first quantity of de-protected reagent is removed from the third reactor, and then the second quantity of de-protected agent, once it has been removed from the second reactor, is added to the third reactor. Likewise, a third quantity of de-protecting reagent will be added to the first reactor, moved the second reactor and then moved to the third reactor. The purpose of the first, second and third quantity of de-protecting reagent, either separately or collectively, is to de-protect the protected N-group affixed to the peptide synthesis resin in the third reactor. In like manner, the first quantity of amino acid "X" and the first quantity of solvent to the third reactor will be added to the third reactor after it was removed from the second reactor. Similarly, the second quantity of amino acid "X" and the second quantity of solvent to the third reactor will be added to the third reactor after it was removed from the second reactor. A third quantity of amino acid "X" and a third quantity of solvent is sequentially cycled through the first, second and third reactors. The first, second and third quantity of amino acid "X", either separately or collectively, couples the amino acid "X" to the de-protected N group in the third reactor. A washing step, as described above, is then performed. Thus, in this manner, the amino acid sequence may be built in all three reactors iteratively (by repeating these or similar steps for each amino acid) and then released from the resins in each of the three reactors.

Thus, the present embodiments provide various reactors positioned in series and that the reagents will be added to the first reactor and then subsequently and sequentially moved to the second reactor and then the third reactor, etc. By positioning such reactors in series, each reactor can contain a quantity of resin that will be used in SPPS which will be used to construct a peptide sequence. Yet, by positioning the reactors in this manner, lesser amount of solvent (washing material) will be required. Likewise, a lesser amount of coupling reagent may be required, thus resulting in less waste and a more efficient and environmentally-friendly process.

BRIEF DESCRIPTION OF THE DRAWINGS

The features and advantages of the present disclosure will become more apparent to those skilled in the art upon consideration of the following detailed description taken in conjunction with the accompanying figures.

DETAILED DESCRIPTION

Figure 1:
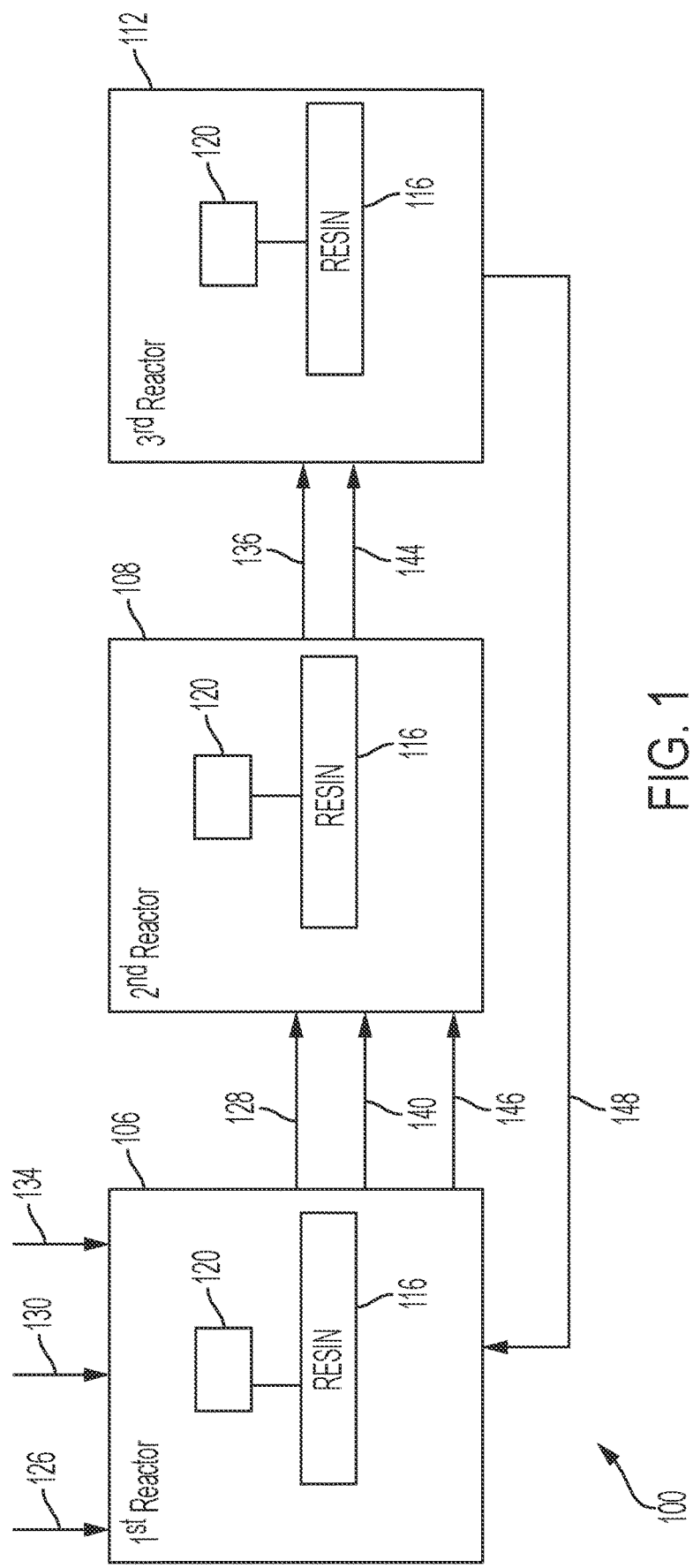
FIG. 1 is a schematic view of the system and method for coupling amino acid "X" to a protected N-group attached to a peptide synthesis resin used herein.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

Referring now to FIG. 1, a schematic view of a system 100 for coupling amino acid "X" to a protected N-group that is attached to a peptide synthesis resin. The system 100 implements the process outlined herein and is a modified SPPS system designed to produce peptides and/or amino acid sequences. The system 100 comprise at least two reactors, which are depicted as first reactor 106 and second reactor 108. These reactors 106, 108 are arranged in series. More than two reactors may be used. In fact, in the system 100 shown in FIG. 1, a third reactor 112 is also arranged in series. More than three reactors may also be used.

Each of the reactors comprises a quantity of resin 116. The resin includes a protected N-group 120 (such as a protected $NH_2$) group. In some embodiments, this protection group used for the protected N-group is an Fmoc group. Those skilled in the art of SPPS will appreciate the types of resins that may be used as resin 116, including a Seiber and Rink amide resin. As part of the SPPS process, the protected N-group must be "de-protected" so that it can react with an amino acid (and thus operate to construct the peptide/amino acid sequence). Thus, a de-protecting process occurs. This de-protection occurs by adding a first quantity of de-protecting reagent 126. (This first quantity of de-protecting reagent 126 is represented graphically by an arrow). In some embodiments, the de-protection reagent may be piperidine, but other materials/reagents may also be used.

The first quantity of de-protecting reagent 126 may be stirred and allowed to react with the protected N-group 120 on the resin 116 in the first reactor 106 for a period of time. (Those skilled in the art will appreciate how to determine the exact time allotments needed herein). Then, the first quantity of de-protecting reagent 126 is removed from the first reactor 106 and transferred to the second reactor 108 (as shown by arrow 128). This first quantity of de-protecting reagent 126 may be stirred and allowed to react with the protected N-group 120 on the resin 116 in the second reactor 108 for a period of time. At the same time, a second quantity of de-protecting reagent 130 is added to the first reactor 106 and allowed to react in a similar manner.

Once these reactions have completed (or in other words, the allotted time has expired), the first quantity of de-protecting reagent 126 is removed from the second reactor 108 and transferred to the third reactor 112 (as shown by arrow 136). Likewise, the second quantity of de-protecting reagent 130 is removed from the first reactor 106 and transferred to the second reactor 108 (as shown by arrow 140). A third quantity of de-protecting reagent 134 is then added to the first reactor 106. At this time, reactions in the first reactor 106, the second reactor 108 and the third reactor 112 are allowed to continue.

After these reactions in the first reactor 106, the second reactor 108 and the third reactor 112 finish (or in other words, the allotted time has expired), the first quantity of de-protecting reagent 126 is removed from the third reactor 112. The second quantity of de-protecting reagent 130 is removed from the second reactor 108 and transferred to the third reactor 112 (as shown by arrow 144). The third quantity of de-protecting reagent 134 may be removed from the first reactor 106 and added to the second reactor 108 (as shown by arrow 146).

In some embodiments, this first quantity of de-protecting reagent 126 that was removed from the third reactor 112 may be sent to an additional reactor (if the embodiment includes an additional reactor). In other embodiments, this first quantity of de-protecting reagent 126 is collected and sent to waste. This will also happen to the second and third quantities of de-protection reagents 130, 134 once they have cycled through the third reactor 112. In other embodiments, including the embodiment shown in FIG. 1, this first quantity of de-protecting reagent 126 (and subsequently the second and third de-protection reagents 130, 134) may be returned to the first reactor 106 (as shown by arrow 148) so that additional iterations of the de-protection may be run as desired. (Note that if the de-protection reagents are returned to the first reactor, this process will be more like a batch reaction and will likely be less efficient).

The third quantity of reagent 134 will be removed from the first reactor 106 and transferred to the second reactor 108. This quantity of reagent 134 will then cycle through the second reactor 108 and the third reactor 112, in the manner outlined herein. (although the arrow for the third quantity of reagent 134 being sent from the second reactor 108 to the third reactor 112 is not shown).

Those skilled in the art will appreciate that pumping corrections may be made to either the first, second or third quantities of de-protection reagents 126, 130, 134, as needed, in order to keep the volume of reagent in each quantity (and in each reactor) uniform or nearly uniform.

As will be readily apparent to those skilled in the art, the purpose of the de-protection reagents 126, 130, 134 that is added to the first, second and third reactors 106, 108, 112 is, either separately or collectively, to operate to de-protect the protected N-group 120 affixed to the peptide synthesis resins 116. By thus de-protecting the N-group in series using quantities of reagent cycled through in series in the manner outlined herein, the N-group may be ready for a coupling reaction which will operate to couple the N-group to another amino acid (as will be described in greater detail below).

If desired, once the unprotected N-group that is attached to the resin 116 may be "washed" with a solvent such as DMF. Other solvents may also be used including NBP (N-butylpyrrolidinone), NMP (N-Methyl-2-pyrrolidone), DMSO, acetates and ethers like MeTHF (methyltetrahydrofuran), or solvent mixtures such as NBP/THF 2/1 v/v, which is exemplified herein. Such washing may occur in the same manner as outlined above with respect to the de-protection reagents 126, 130, 134. In other words, a first quantity of washing solvent may be added to the first reactor 106 and then subsequently cycled through the second and third reactors 108, 112. Likewise, a second and third quantity of washing solvent may likewise be cycled through reactors 106, 108 and 112. This washing step may be iterative so that there may be 5, 8 or 10 different washing cycles (either with the same quantity of solvent or with new quantities of solvent being added to the first reactor each time). (Although not described in detail herein, the washing step may be important and may be performed after each deprotection and coupling step). Likewise, pump correction may also be used to ensure that each quantity of washing solvent that is added to the reactors is nearly uniform.

Figure 2:
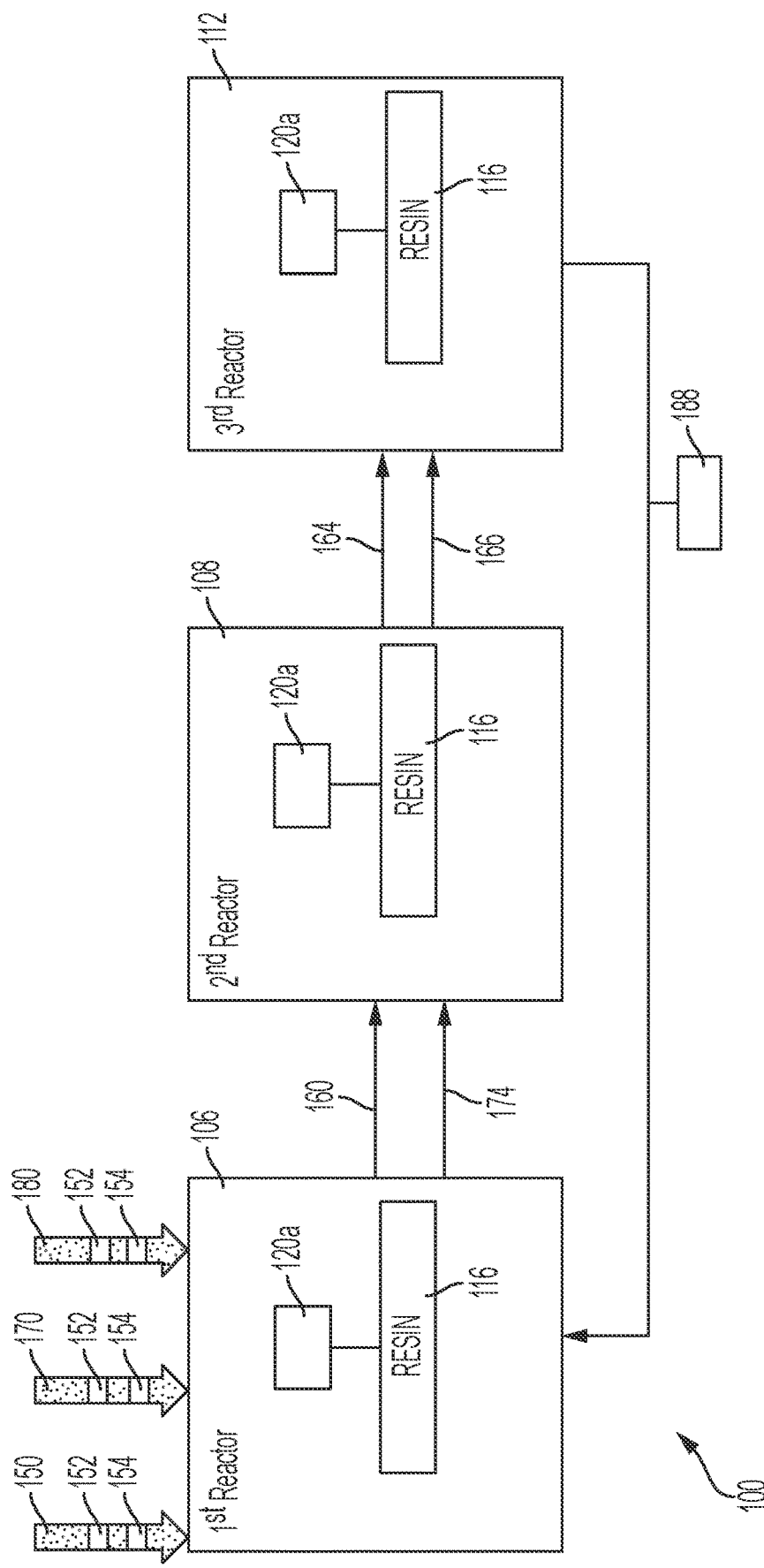
FIG. 2 is a schematic view of the system and method for coupling amino acid "X" to a protected N-group attached to a peptide synthesis resin used herein.

Referring now to FIG. 2, the coupling of the amino acid will now be described using the system 100. Each of the resins 116 has been de-protected as outlined above (and optionally washed). Accordingly, the resins 116 are shown to include unprotected N-group 120*a* (rather than protected N-group 120 that was shown in FIG. 1).

A first quantity of amino acid "X" 150 is added to the first reactor 106. This is represented graphically in FIG. 2 by an arrow. In the embodiment shown in FIG. 2, the first quantity of amino acid "X" 150 has been pre-mixed with a first quantity of solvent 152 as well as a first quantity of other reagents 154. More specifically, the first quantity of amino acid "X" 150 has been mixed with the other reagents 154 and the solvent 152 prior to its addition to the first reactor 106. In other embodiments, the first solvent 152 and/or the other reagents 154 may also be added sequentially and/or simultaneously to the first reactor 106 in addition to the first quantity of amino acid "X" 150. In some embodiments, the first quantity of solvent 152 may be DMF. In some embodiments, the other reagents 154 be agents that operate to "activate" the amino acid "X" 150 and/or the unprotected N-group 120*a* and/or facilitate the coupling reaction. Thus, in some embodiments, the other reagents 154 may be DIC and oxyma.

Once the amino acid "X" 150 (and the first quantity of solvent 152 and the other reagents 154) are added to the first reactor 106, the coupling reaction is allowed to proceed. This reaction occurs between the unprotected N-group 120*a* and the amino acid "X". After a period of time (such as, for example 30 minutes or some other set amount of time that those skilled in the art will understand how to calculate/determine), the first quantity of amino acid "X" 150 may be removed from the first reactor 106 (as shown by arrow 160).

In some embodiments, this first quantity of amino acid "X" 150 may be transferred to the second reactor 108. The first quantity of solvent 152 and/or the other reagents 154 may also be removed from the first reactor 106 and transferred to the second reactor 108.

Once in the second reactor 108, the first quantity of amino acid "X" (as well as the first solvent 152 and/or the other reagents 154) may operate to react with the unprotected N-group 120a in the second reactor 108. Likewise, a second quantity of amino acid "X" 170 may be added to the first reactor 106. (Again, this second quantity of amino acid "X" 170 may be pre-mixed with other reagents 154 and/or solvent 152). After a period of time (such as, for example 30 minutes), the first quantity of amino acid "X" 150 may be removed from the second reactor 108 (as shown by arrow 164). This first quantity of amino acid "X" 150 may be transferred from the second reactor 108 to the third reactor 112. If a first quantity of solvent 152 and/or the other reagents 154 were used, then they will be also be removed from the second reactor 108 and transferred to the third reactor 112. The second quantity of amino acid "X" 170 may be removed from the first reactor 106 (as shown by arrow 174). This second quantity of amino acid "X" 170 may be transferred from the first reactor 106 to the second reactor 108.

A third quantity of amino acid "X" 180 may be added to the first reactor 106. (Again, this third quantity of amino acid "X" 180 may be pre-mixed with other reagents 154 and/or solvent 152 and may be from the same batch as the first quantity 150 and/or the second quantity 170.) The reaction is allowed to proceed such that the unprotected N-group 120a in the first, second and third reactors 106, 108, 112 reacts with and is coupled to the amino acid "X". Once this reaction is completed or after some period of time, the first quantity of amino acid "X" may be removed from the third reactor 112 and sent to waste or recycled back to the first reactor 106 (as indicated by arrow 188). (Again, such recycling makes this reaction more like a batch, and thus may be less desired. In fact, if a batch mode is desired, it may be better to couple the reactors in parallel). In like manner, the second quantity of amino acid "X" 170 may be transferred to the third reactor 112 (and allowed to react as shown by arrow 166) and the first quantity of amino acid "X" 180 may be transferred to the second reactor 108 and subsequently to the third reactor 112 (and allowed to react in each reactor). In this iterative manner, the reaction occurs "in series" and the first, second and third quantity of amino acid "X" 150, 170, 180 are cycled through the reactors 106, 108, 112. In this manner, the amino acid quantities 150 170 180, either separately or collectively, operates to react with the unprotected N-groups 120a and couples the amino acid "X" to the de-protected N groups 120a in the first, second and third reactors 106, 108, 112.

In some embodiments, it may be advantageous to filter the solution before it is transferred from one reactor to the next reactor (for example, transferred from the first reactor 106 to the second reactor 108 or from the second reactor 108 to the third reactor 112). Those skilled in the art will appreciate how such filtering may occur.

It will be appreciated that using reactors in series, as outlined herein, can provide a reduction in the amount of solvent used for the de-protection and/or the washing steps. For example, if traditional batch processing is used, a 20% solution of piperidine in DMF would be required for the de-protection reaction. Such a solution would be divided into 10 volumes and each batch reactor reacted 3 times with this solution. This would result in about 30 L/kg used for each reactor. However, if the three reactors are used in series, as taught herein, the 20% solution of piperidine in DMF would still be divided into 10 volumes based on the resin amount in each reactor and reacted 3 times (iterations) through the series of three reactors. In order for reactors 2 and 3 to experience number of equivalents piperidine greater than or equal to batch, a fourth charge of 10 L/kg may be used. Here, the overall amount of piperidine solution would be 40/3=13.3 L/kg, which is a 2.25 fold reduction.

The higher the number of excess amino acids and the higher the amino acid cost, the more advantageous it is to use reactors in series for the couplings. For example, the Lys20 IV decoupling reagent may be about $20/gram in price; thus, reductions in the amount of excess reagents can result in significant cost savings. However, the lower the number of excess equivalents, the more advantageous it is to run coupling reactions in parallel, because of the hold up of reaction solution in the resin, preventing a percentage of the excess equivalents from transporting to the next reactor without dilution. If the excess amino acid equivalents are about 2 or less, and if they are standard inexpensive amino acids, then we have chosen to run the coupling reactions in parallel but the deprotections and washes in series.

It should be noted that, in some embodiments, the larger the number of reactors in series, the less overall solvent and reagent is needed per kilogram of product. This is analogous to the flow chemistry principle that a larger number of CSTRs (continuous stirred-tank reactors in series becomes closer to ideal plug flow. In some embodiments, it is believed that three reactors in series may be optimal because of the trade-off between waste reduction and equipment cost. In other words, embodiments may be designed in which diminishing returns are hit with more than 3 to 5 reactors in series. To achieve the same maximum residual reagent concentration at the end of washing, 3 reactors in series may operate to cut solvent requirements in half versus single batch processing. Of course, other embodiments may be designed in which more than three or more than five reactors are used. Further embodiments may be designed in which two reactors are used in series.

In some embodiments, it may be desirable to measure all the reagent charges by mass and to use a DeltaV distributive control system (provided by the Emerson company of St. Louis Missouri USA) (rather than a Windows based user interfaces.) This because documentation is also done automatically in DeltaV and the system can create executed master batch records. Further, in the DeltaV system, most of the operation is done by remote access, which can be accomplished from anywhere in the world that has internet. The DeltaV system can be set to send descriptive text messages to the cell phones of operators, chemists, engineers, and analysts when important steps are happening in the process or when anything needs attention, which is subsequently handled remotely in most circumstances. One of the common problems with the best commercially available laboratory research scale SPPS technology is that control systems crash, miss charges, or error-out at some point during the peptide build. Reagent charges are missed because they are done via level sensor. In contrast, the system can be designed to do all reagent charges by mass from weigh scales. Individual experiments often need to run for more than a month, for example if the peptide has more than 30 amino acids. An amino acid mischarge near the end of a one-month experiment means that the experiment must be re-started, and the month (or other time required for synthesis) is wasted, along with the wasted materials. That is much less likely to happen with DeltaV automation because it is designed to be more reliable and robust, as it is an industry standard for GMP manufacturing.

In further embodiments, the system may be designed to provide much more process information and understanding than other commercially available synthesizers because of its online analytical. Online LCMS (liquid chromatography/mass spectroscopy) of the peptide on resin, quantifies reaction conversion and kinetics for all deprotections and couplings in all of the parallel reactors simultaneously. Timing is integrated with the chemical process because the same DeltaV system that runs the process also runs the online analytical. Accordingly, workers may not need to be in the lab to take and analyze samples for forward processing decisions.

In order to get an online LCMS system, the following steps may be implemented:
1. Pull 1.0 mL slurry from the resin reactor
2. Immediately cleave with TFA in small reactor (time from pulling the sample to start cleavage with TFA is about 2 minutes)
3. Dilute cleaved peptide solution in LC (liquid chromatography) diluent and mix
4. Transport solution across the lab and park on the LC injection loop (gas-bubble-free)
5. Switch the loop to inject the sample on the LC
6. Flush the spent resin beads from the cleavage reactor to waste
7. Clean sample valves and tubing with solvent.

However, it should be noted that in order to implement this online LCMS, the flow goes vertically up through the sample valves so that they get completely filled gas bubble free. Two three-way valves are used to switch the slurry sample away from the sample loop and blow it into the cleavage and deprotection zone. A single solenoid airline tees to the actuators of both valves so that they switch at exactly the same time, which may be important for getting exactly 1 mL of slurry every sample. Then, the slurry passes all the way through the sample zone and then continues in the uphill direction beyond of the sample valves. This may be important so that the sample valves are filled with representative slurry density, even when the viscosity and slurry density of the reactor are changing from one step to the next and the flow distance past the valves changes. The slurry sample tube from the reactor is uphill all the way to the sample valves. This is important so that later the tube clears when pumping back to the reactor in reverse direction. It minimizes carryover and prevents solid clogging. Solvent is used to flush out the sample valves after every time the dilution cart finishes a sample. Otherwise, they eventually clog with solids. The solvent enters between the sample valves and the peristaltic pump in the backwards direction away from the valves, then pushes in the forward direction through the valves. Solvent slugs flush all the way into the cleavage zone to clear resin solids each time. Beyond the valves, the slurry continues to flow in the uphill direction. The flow in this uphill direction is long enough so that there is enough margin to ensure a representative sample gets in the sample loop but that the slurry does not move past the apex and begin to flow back downhill. If it does, then it will get to the peristaltic pump which can cause carryover problems and also grind up the resin, creating filterability problems in the reactor. The peristaltic pump is located after the downhill part of the sample loop instead of upstream from the sample loop. When it is upstream from the sample loop it creates carryover problems and grinds up the resin causing reactor filterability problems. A valve (which may be custom) may be used, with an extra port welded on the body, so that the dilution solvent enters directly on top of the ball and pushes in the upward direction, which completely mixes the dilution solvent with the cleavage solution and also disrupts the resin bed settled on top of the ball.

Referring now to FIGS. 1 and 2 collectively, the addition of the next amino acid in the peptide sequence will now be described. This next amino acid in the sequence may be designated as "Z", meaning that it can be any amino acid desired (whereas, as noted above, amino acid "X" may also be any amino acid desired). The steps and processes outlined above will operate to couple amino acid "X" to the resin. (Thus, amino acid "X" becomes the first amino acid in the peptide sequence). Once this amino acid "X" has been coupled and attached to the resins, the resins in the first, second and/or third reactors 106, 108, 112 may be washed with solvent. This solvent will generally be the same solvent outlined above. Such washing may occur in the sequential (e.g., in series) manner outlined herein. Thus, for example, a first additional quantity of solvent may be added to the first reactor 106, stirred in the first reactor 106, and then transferred to the second reactor 108 (and used to wash the resin in the second reactor 108, and then transferred to the third reactor 112. Likewise, once the first additional quantity of solvent is removed from the first reactor 106, a second additional quantity of solvent may be added to the first reactor 106 (and cycled through the other reactors). (A third quantity of additional solvent may also be likewise cycled through the system). In other words, the washing step may proceed, in the sequence and manner outlined above.

Once the reactors 106, 108, 112 have been washed with solvent, a first additional quantity of de-protecting reagent may be added to the first reactor 106 and then (after a certain period of time), transferred out of the first reactor 106 and added to the second reactor 108. This first additional quantity of de-protecting reagent will then (after a certain period of time) also be removed from the second reactor 108. A second additional quantity of de-protecting reagent is added to the first reactor 106, reacted for a period of time, and then removed from the first reactor 106 and transferred to the second reactor 108, reacted therein and then removed from the second reactor 108 (and then added to the third reactor 112 in the manner outlined herein). This first and second additional quantity of de-protecting reagent (and third additional quantity of de-protected reagent), either separately or collectively, operates to de-protect the protected N-group of amino acid "X" in both the first and second reactors.

After this reaction with de-protecting reagent, the amino acid "X" (which is affixed to the resin) is ready to be coupled to the next amino acid "Z" in the desired sequence. Thus, in the manner outlined herein, the following steps will occur:
  adding a first quantity amino acid "Z" to the first reactor 106;
  transferring the first quantity of amino acid "Z" to the second reactor 108;
  adding a second quantity of amino acid "Z" to the first reactor 106, wherein the first and second quantity of amino acid "Z", either separately or collectively, couples the amino acid "Z" to the de-protected N group of amino acid "X" in the first reactor 106;
  removing the first quantity of amino acid "Z" from the second reactor 108; and
  transferring the second quantity of amino acid "Z" from the first reactor 106 to the second reactor 108; and
  removing the second quantity of amino acid "Z" from the second reactor 108, wherein the first and second quantity of amino acid "Z", either separately or collectively, couples the amino acid "Z" to the de-protected N group of amino acid "X" in the second reactor 108.

Those skilled in the art will appreciate that the amino acid "Z" may also be reacted with the amino acid "X" in the third reactor 112 in a like manner using these series of reactors and reagents, adding each amino acid sequentially. Thus, in this manner, the amino acid sequence is built. The process is then repeated, iteratively, to add the next amino acid, and the next, etc., as in known is SPPS synthesis.

Figure 3:
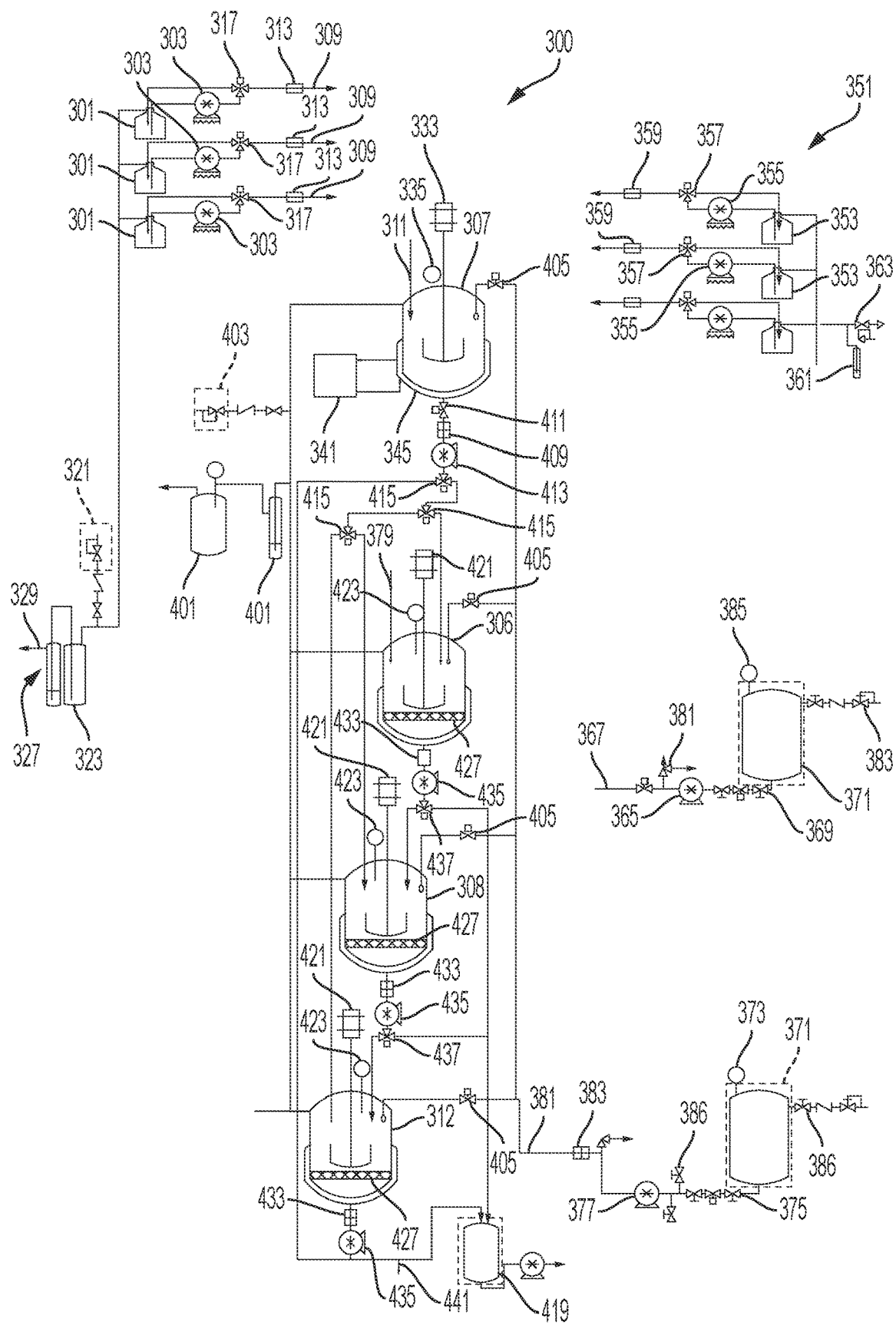
FIG. 3 is a schematic view of the system and method for coupling amino acid "X" to a protected N-group attached to a peptide synthesis resin used herein.

Referring now to FIG. 3, a schematic view is shown of another embodiment of a system 300 for coupling amino acid "X" to a protected N-group that is attached to a peptide synthesis resin. Specifically, the system 300 includes multiple storage tanks 301 that are designed to house quantities of amino acids. Specifically, each specific amino acid that will be added to the peptide chain may have its own separate storage tank 301. Further, each tank 301 may have its own pump 303 which is designed to pump the amino acid (which may be dissolved in a solution) out of the storage tank 301 and into an activation reactor 307. Specifically, the pump 303 will pump the solution of the amino acid out of the tank 301 through the line 309, into line 311, and into the reactor 307. Those skilled in the art will appreciate how to connect this tubing/piping and the pump 303 to accomplish this this transfer of the amino acid solution from the individual tanks 301 to the reactor 307. Only 3 different amino acid tanks 301 are shown in FIG. 3. More may be used as desired.

Optionally, one or more flow sensors 313 may be attached to the line 309 and/or the pumps 303 to sense the flow of the amino acid through the line (and into the reactor 307) so that the quantity, flow rate, flow timing, etc. may be adjusted, as desired. Further, valves 317 may be used to divert the flow of the amino acid back to the feed vessel 301 for priming the pump. Those skilled in the art will appreciate how to use the valves and/or the inerting vent system 327, which may also include a vent 329 as well as overflow vessels for safety, as desired.

Similarly, the system 300 includes multiple storage tanks 353 that are designed to house quantities of other reagents, such as DIC, oxyma, etc., and other wash solvents. Further, each tank 353 may have its own pump 355 which is designed to pump the liquid out of the storage tank 353 and into an activation reactor 307 or any of the filter reactors 306, 308, 312. Those skilled in the art will appreciate how to connect this tubing/piping and the pumps 355 to accomplish this this transfer. Only 3 different feed tanks 353 are shown in FIG. 3. More may be used as desired.

Optionally, one or more flow sensors 359 may be attached to the lines from pumps 355 to sense the flow through the line so that the quantity, flow rate, flow timing, etc. may be adjusted, as desired. Further, valves 357 may be used to divert the flow of the back to the feed vessel 353 for priming the pump. Those skilled in the art will appreciate how to use the valves and/or the inerting system 363, which may also include a vent bubbler 361 as well as overflow vessels for safety, as desired.

As noted above, the system 300 includes an activation reactor 307. The activation reactor 307 is generally positioned upstream of the first reactor 306, the second reactor 308 and the third reactor 312. The activation reactor 307 may optionally include an agitator 333 that is designed to mix the contents (solution) within the activation reactor 307. Also, a temperature probe 335 may also be added to the activation reactor 307. A circulator 341 associated with the jacket 345 may also (optionally) be included.

The activation reactor 307 may be designed such that it "activates" the amino acid solution by pre-mixing the amino acid solution with DIC and oxyma. Those skilled in the art will appreciate how such addition of DIC and oxyma (and/or a solvent and some other activating agent and base) may be added to the reactor 307.

The system 300 also includes a de-protection solution vessel 371 which houses the de-protecting reagent. (In the embodiment shown in FIG. 3, the de-protecting reagent is piperdine, although other materials may be used). One or more valves 369 and a pump 365 may be designed to pump the de-protecting reagent (via lines 367) to the first reactor 306 (via entry line 379). A relief valve 381 may optionally be added to the line 367. Further, a pressure sensor 385 may optionally be used within the vessel 371. Additional valves 383 as part of a venting system for the vessel 371 may optionally be used, as desired.

A storage vessel 371*a* used for solvent (which in this case may be DMF or some other solvent) may also be used as part of the system 300. The storage vessel 371*a* may include (optionally) a pressure sensor 373 to measure the pressure of the solvent. One or more valves 375 and a pump 377 may be used to deliver the solvent vessel 371*a*. The solvent is delivered to the activation reactor 307, the first reactor 306, the second reactor 308 or the third reactor 312 via lines 381. A flow sensor 383 may be used (optionally) to measure this flow through the line 381. Additional venting valves 386 as desired may optionally be used.

As with the embodiments described above, the first, second and third reactors 306, 308, 312 comprise a quantity of resin (such as a Sieber resin) housed therein and are arranged in series downstream of the activation reactor 307. These reactors may include, for safety purposes, an inert headspace metered nitrogen supply 403 and one or more venting overflow vessels 401. Other vents and/or safety measures may be designed, as will be appreciated by those skilled in the art.

As noted above, the solvent solution is connected, via one or more lines 381, to each of the first, second and third reactors 306, 308, 312, as well as to the activation reactor 307. One or more valves 405 may control the flow of the solvent into each of these vessels. In other embodiments, the solvent entry point to each of these reactors may be a "spray ball" or other spray feature that allows for efficient introduction of the solvent into the vessel as well as allows the solvent to "wash down" the sides of the vessel (and any solids that may be positioned thereon) thereby ensuring proper mixing and exposure of all resin to the reagents and wash solvents. (In fact, in between the addition of each particular amino acid when the resins in the reactors 306, 308 and 312 are being "washed", it is generally advisable to spray down the reactors 306, 308 and 312 with solvent in this manner).

As noted above, the solution exiting the activation reactor 307 will exit via exit bottom port and connected tubing. In the flow of this exit line may optionally be a flow sensor 409, one or more valves 411 that control the flow as well as a pump 413. Further, the exit line may include one or more valves 415 which allow the automation to selectively control the flow of the solution though the lines such that the solution can be directed to waste 419 or to the first, second, and/or third reactors 306, 308, 312. (Generally, the system 300 will run such that the second and third reactors 308, 312 are in series with the first reactor 306 such that the flow will go to the first reactor 306 first, but the valve 415 (which may be a 3-way valve (or 2 way valve or 4-way valve, etc.) allow the user to control this flow and modify it, if it is so desired).

The first, second and third reactors 306, 308 and 312 that are used in this system 300 are similar and/or identical to that which was described above. These reactors 306, 308 and 312 may optionally each include an agitator 421 and a temperature sensor 423. The reactors first, second and third reactors 306, 308 and 312 include resins which will serve as the substrate for building the peptide. This resin will include a protected N-group that may be deprotected via the de-protecting reagent from vessel 371 and then reacted with the activated amino acid solution (which was activated in the reactor 307), thereby coupling this amino acid to the sequence/resin (using SPPS techniques). By doing such steps sequentially, different amino acids from the tanks 301 may be added, as desired.

As described above, the first reactor 306, the second reactor 308 and the third reactor 312 may be positioned in series. Accordingly, the first quantity of the activated amino acid is reacted in the first reactor 306 and then the quantities will be sent to the second and third reactors 308, 312 sequentially (and a new quantity of activated solution added to the first reactor 306) in the manner outlined above. In order to facilitate this flow, each reactor 306, 308, 312 may include a filter 427 to make sure that the solid peptide resin bead and/or the solid forming peptide remains in the reactors 306, 308, 312. Flow sensors 433, valves 437 and pumps 435 may be used optionally and/or as needed to direct this "in series" flow between the first, second and third reactors 306, 308, 312. Likewise, a sampling device 441 may be positioned anywhere throughout the system (or multiple sampling devices 441 as desired) in order to sample what is being flowed through the system 300 to make sure that it is operating correctly or check waste stream to determine when washing is sufficient.

It should be noted that in the embodiment of FIG. 3, the valves 437 can be designed such that the output of the first, second and third reactors 306, 308, 312 can flow sequentially in series and/or may go to waste 419. This is done so that the automation may control the flow desired. Further, in FIG. 3, the output line from the third reactor 312 is shown going to the waste 419. As noted above, embodiments may be designed such that when the reactors 306, 308 and 312 and/or the activation reactor 307 are washed with solvent, the solvent is re-used (and sent back to the reactors), thereby making the system more environmentally-friendly. Likewise, the activated amino acid solution may flow through the first, second and third reactors 306, 308 and 312 and then be recycled back again (multiple times, as desired) through the same reactors (and/or the activation reactor 307), as a means of performing the reaction again (but if this is desired, it is better to run reactions in parallel). For example, in between the addition of each particular amino acid when the resins are being "washed", usually this washing occurs in 10 different washing steps. If that occurs, the first 2 to 8 times the washing may occur with pre-used solvent, because while this solvent may have impurities, it is "clean" enough for the first batch of washes, followed by the last washings (2 to 8 washes) with pure solvent. The wash solvent from the last 2 to 8 washes is collected in a recycle vessel to be used for the first 2 to 8 washes of the next cycle. This way, the amount of solvent used during the overall washing process is reduced).

Figure 4:
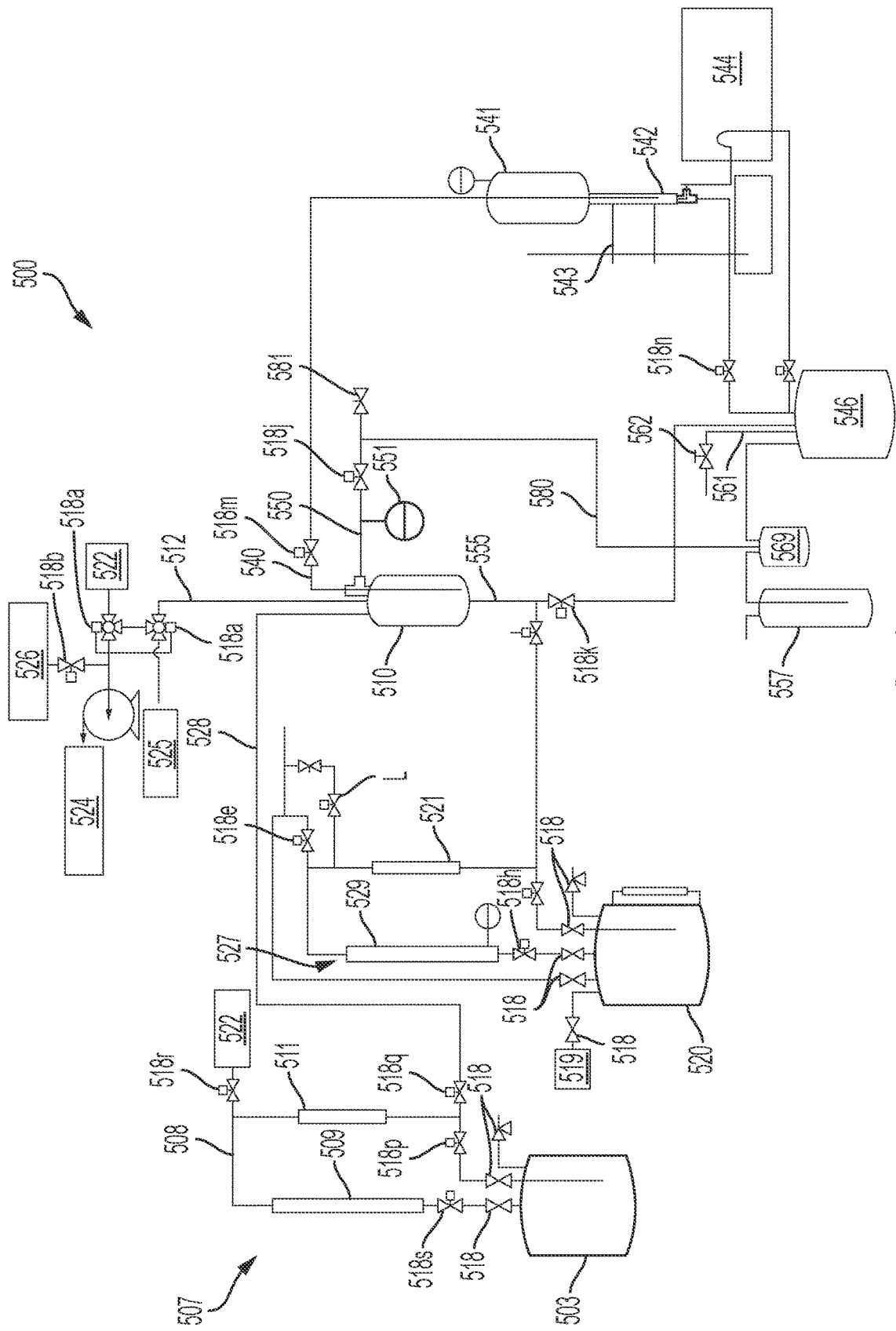
FIG. 4 is a schematic view of the system and method for online LCMS used with the system of FIG. 3.

Referring now to FIG. 4, a system 500 is shown which is an online LCMS system that may be used in conjunction with the embodiments of FIGS. 1-3. Specifically, the system 500 is designed to take measurements of the solutions and solid phase resin bound peptide samples in the reactors outlined above, thereby giving the operator real-time information about what is happening in the system.

The system 500 includes cleaving solution tank 503. In many embodiments, this cleaving solution is TFA, which is designed to cleave the formed peptide from the resin (and thus pull the formed peptide from the resin). TFA may also operate to quench the coupling reactions. The valves 518$p$, 518$q$, and 518$s$, as shown in FIG. 4, operate to control the flow of the TFA solution (or cleaving solution) into the system. There may also be a cleavage overflow zone 507 which includes lines 508 along with overflow vessels 509 and measuring zone 511 (along with valve 518$r$ connected to nitrogen supply 522). This system 507 is designed to measure out the desired amount of TFA and return all excess back to the storage vessel 503. Those skilled in the art will appreciate how to implement these safety features and/or flow features to control the flow of the TFA solution. This may involve using one or more valves 518.

The system 500 also includes a mixing pot 510 (which may be a 500 mL vessel). The mixing pot 510 may receive slurry sample from the reactor solvent (which may be DMF) from the solvent lines 512 that are controlled by valves 518$a$. These lines 512 (along with valves 518$b$ and 518$a$) allow slurry to be retrieved from the reactors (whether it be the activation reactor, or the first second or third reactors described above). The lines 512 may have an inner diameter of $\frac{1}{8}^{th}$ inch and an outer diameter of $\frac{1}{4}$ inch. The lines 512 and valves 518$a$ and 518$b$ also allow for gas (from a nitrogen supply 522) to be added into the system as well as a "pump around" loop. The valves 518$a$ also allow the material to flow to the reactor return 524 and from the reactor 525. Valve 518$b$ allows DMF (solvent) to be obtained from the header 526, as desired. The purpose of the lines 512 is to take a sample of reaction slurry (such as, for example, 1 mL) so that it may be added to the pot 510. The valves may be used to ensure that the material flows out of the reactor 525, (and if necessary flow uphill) so that the slurry does not reach the pump, preventing grinding of the resin beads. Accordingly, by switching the valves and using Nitrogen, slurry may be extracted and the remainder returned to the reactor 525 by pumping backwards, without grinding resin in the pump. Those skilled in the art would appreciate how to do that.

In addition to the slurry sample, another feed into the mixing pot 510 is from a diluent supply 520 that will add solvent or other materials to dilute the 1 mL sample as needed. This diluent supply 520 is connected to the mixing pot via lines 528. A diluent overflow system 527 may also be used. This system 527 may also include diluent overflow zone 529 which includes lines 528 along with overflow vessels 529 and measuring zone 521 (along with valves 518$e$ and 518$l$ connected to nitrogen). Valve 518$h$ controls the flow into the overflow vessel 529. This diluent overflow system 527 is designed to measure out the desired amount of diluent and return all excess back to the storage vessel 520. Those skilled in the art will appreciate how to implement these safety features as well as to control the flow of the diluent solution.

Once in the mixing pot 510, the cleaved and diluted sample, will flow through line 540 to valve 518$m$. This line 540 takes the material (which is generally the peptide or the growing amino acid sequence that has been cleaved from the resin) to HPLC 544 for analysis. A storage pot 541 (which may be 300 mL vessel) may be used upstream of the HPLC to separate gas bubbles from the liquid by gravity and store the sample as needed.

The mixing pot 510 may be attached to line 550 (and valve 518*j*) to vent the mixing pot 510, as desired. Sensors 551, such as pressure or temperature sensors (or other sensors) may measure the conditions in this line (or in the system generally if placed in other locations in system 500). Pressure sensor 551 is used in the automated sequence as an indicator of when to advance to the next step.

Generally, after 30 minutes of mixing in the mixing pot 510 to allow time for deprotection of the peptide (and after dilution), material may be extracted out of the mixing pot 510 via line 555 and allowed to settle at or near valve 518*k*. Once this valve 518*k* is opened, liquid and/or spend resin beads may flow through line 555 into waste 546. A caustic bubbler 557 may be used as a safety mechanism to scrub any TFA that may be in the line 555. As needed, nitrogen or other gas may be added via line 561 and valve 562 to the waste 546 to facilitate this scrubbing. Other safety features, such as knockout pot 569 may also be added. The knockout pot 569 is designed such that the bubbler liquid cannot suck back into the system. As shown in FIG. 4, this knockout pot 569 may also be connected, via line 580, to the nitrogen supply 581 that supplies nitrogen or other gas to keep 569, 546, and 557 inerted.

Those skilled in the art will appreciate how often sampling from the reactors should be sampled using the system 500 outlined in FIG. 4. In some embodiments, during the coupling reaction is on-going, sampling may occur at regular intervals, such as every 45 minutes. In other situations, sampling may occur at other intervals, such as every 60 minutes or during the washing steps. Of course, other sampling frequencies may be designed by those skilled in the art.

In other embodiments, the sampling from the activation reactor may occur, automatically, before the contents of the activation reactor are added to the first reactor. The reason for this is to verify that the amino acid that has been added to the activation reactor (and will subsequently be added to the first, second, and third reactors) is the desired amino acid—e.g., the next amino acid in the sequence. The reason for this is that, for example, if 25 amino acids have already been reacted together, and the "wrong" amino acid is added, then the entire peptide sequence will be wrong and the synthesis of the peptide will have to start over from scratch (from the beginning). Thus, in order to prevent this error, the amino acid will automatically be sampled prior to it being put into a coupling reaction, thereby minimizing the chance that the "wrong" amino acid will be added.

Figure 5:
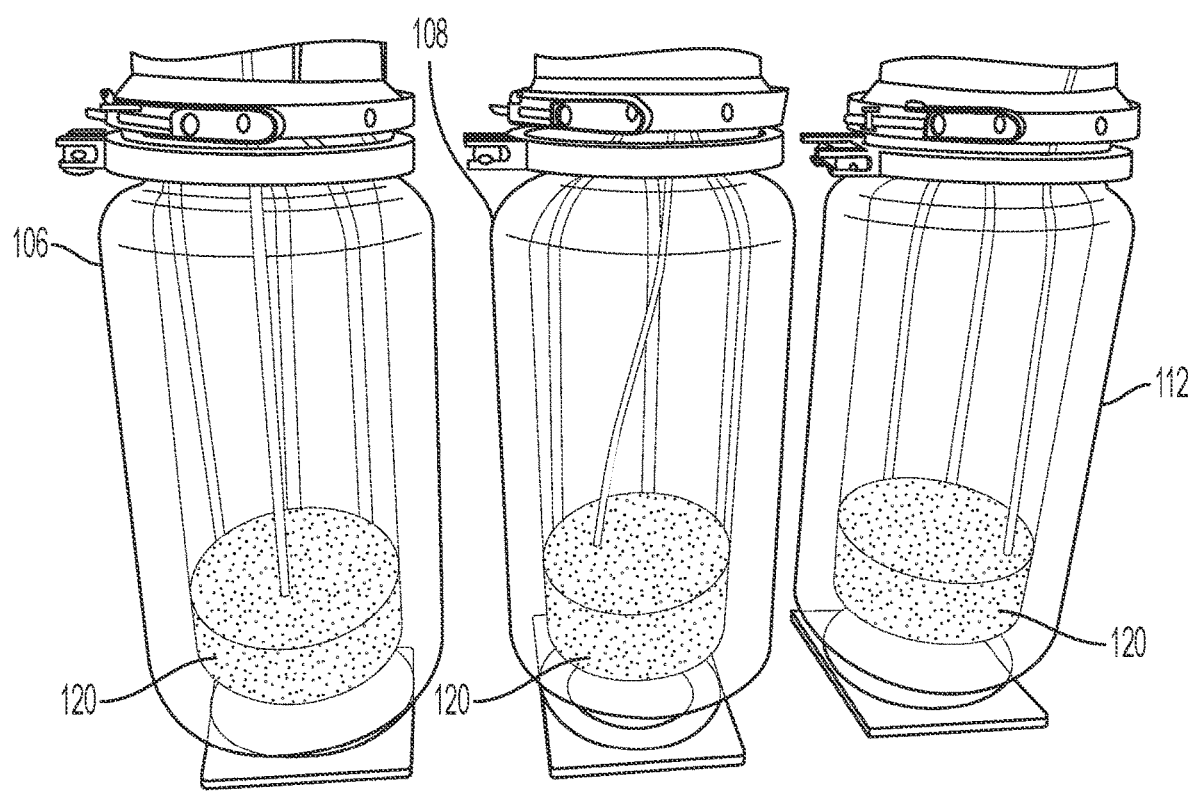
FIG. 5 is a perspective view of three reactors in series as used in the present embodiments.

Referring now to FIG. 5, a perspective view of the reactors 106, 108 and 112 shown in FIG. 1 is illustrated. As can be seen in FIG. 5, the resin 120 is porous, such that some of the activated ester solution (as outlined herein), can absorb in the pores and continue the reaction, as outlined herein.

A further aspect of the present embodiments is that an online LCMS system can be used with a first reactor. This may be the online LCMS system described herein, used with a first reactor of a reactor-in-series system of the type outlined herein. Other embodiments may be designed in which the online LCMS system is used with a single reactor, which in some embodiments, may be a batch reactor. The advantages of the LCMS system is that a precise sample (such as 1 mL) may be extracted automatically at various times during the reaction (such as the beginning, middle and/or end of the reaction). The user may be able to program when the sample is automatically extracted. The sample that is extracted may be used to test how the reaction is progressing and if the reaction is completed. Such sampling may occur during the activation, reaction step and/or during the washing step(s). By using this LCMS, a Kaiser test (which is typically used to monitor the progress of peptide coupling) may not be required (thus saving costs and time). The sampling may also provide real-time monitoring of the reactions, which may be especially valuable at production scale. While currently there are samplers such as (Mettler Toledo samplers), this equipment is not used with SPPS reactors and does not include the devices and methods for cleavage and deprotection, dilution, mixing, separation from spent resin beads, transport to LCMS, and parking on the LCMS switching loop. A detailed procedure of the automated sequence for the online LCMS system shown in FIG. 4 is as follows.

Cart 491 Sequence for Peristaltic Sampling of a Peptide Synthesis

Updated: 15 Dec. 2020

| | |
|---|---|
| Start by venting down. | Valves open: |
| Open 618A, 518k | [618A, 518k] |
| Wait user input time "Vent PSI Read Dly" | |
| Wait until PT < "Vent Low" | |
| Close 618A, 518k | [ ] |
| Sample | |
| Open valve 518j | [518j] |
| Command sample peristaltic pump to start "forward" | |
| Wait user input time "Pump1 Time1" | |
| Command sample peristaltic pump to stop | |
| Energize valve 518a (3-way valves to sample) | [518a, 518j] |
| Wait "AB open time" | |
| De-energize valve A (return 3-ways to reactor/racetrack) | [518j] |
| Command sample peristaltic pump to change directions to "backwards" | |
| Wait user input time "Pump1 CCW time" | |
| Command sample peristaltic pump to stop | |
| Add cleavage solution | |
| Open 518r, 518s | [518j, 518r, 518s] |
| Wait 5 seconds to pressure up cleavage solution bottle | |
| Close 518r, 518s | [518j] |
| Open 518q | [518j, 518q] |
| Wait 5 seconds to vent cleavage solution measure out zone | |
| Close 518q | [518j] |
| Open 518p | [518j, 518p] |
| Wait user input time "P Open Time" | |
| Close 518p | [518j] |
| Open 518r, 518s | [518j, 518r, 518s] |
| Wait user input time "S Open time" | |
| Close 518s | [518j, 518r] |

-continued

| | |
|---|---|
| Open 518q | [518j, 518q, 518r] |
| Wait user input time "Q Open time" | |
| Close 518r, 518q | [518j] |
| Deprotection | |
| Wait "Deprotect Time" | |
| While waiting | |
| Every "Mix Delay Time" (user input parameter) | |
| Open valve L, 618A | [518j, L, 618A] |
| Wait "Mixing Time" (user input parameter) | |
| Close valve L, 618A | [518j] |
| Close valve 518j | [ ] |
| Measure out diluent | |
| Open G | [G] |
| Wait user input time "G Open Time" | |
| Close G | [ ] |
| Open 518e, 518h | [518e, 518h] |
| Wait user input time "DEH Open Time" | |
| Close 518h | [518e] |
| Open 518r, 518q to pressure up mixing pot | [518e, 518q, 518r] |
| Wait until PT > Mix Pot Close | |
| Close 518r, 518q | [518e] |
| Open M1, M2 | [518e, M1, M2] |
| Wait until PT < LVS Empty/M2 Cls | |
| Close M1 M2 | [518e] |
| Mix cleaved sample and diluent | |
| Open valve 618a | [518e, 618a] |
| Wait until PT > user input set point "Mix Pot Close" | |
| Close valve 618a | [518e] |
| Settling | |
| Wait user input "settling time" | |
| Transfer to HPLC | |
| Open valve M1 | [518e, M1] |
| Wait until PT < "M1 Close PSI" | |
| Close valve M1 | [518e] |
| Empty remaining slurry from mixing pot | |
| Open 618a | [518e, 618a] |
| Wait until PT > user input set point "Mix Pot Close" | |
| Close 618a | [518e] |
| Open 518k | [518e, 518k] |
| Wait until PT reads < "Vent Low" | |
| Close 518k | [518e] |
| If Agilent: | |
| Parking sample on HPLC | |
| Open 618a | [518e, 618a] |
| Wait until PT > user input set point "mix pressure" (same set point as above) | |
| Open M1 | [518e, 618A, M1] |
| Wait "M3 Open Delay" | |
| Open M3 | [518e, 618A, M1,M3] |
| Wait "M3 Open Time" | |
| Close M3, 618a, 518e, M1 | [ ] |
| Signal to HPLC to take a sample | |
| Vent | |
|    Open 618a, 518q, 518k | [618a, 518k, 518q] |
|    Wait user input "Vent PSI Read Dly" | |
|    Wait until PT reads < "Vent Low" | |
|    Close 518q, 618a, 518k | [ ] |
| Wait until next commanded sample | |
| Pump Wash | |
| Performed after last coupling or deprotection samples. | |
| Energize valve 518a (3-way valves towards mix pot) | [518a] |
| Open valve 518b (DMF) | [518a, 518b] |
| Command the sample peristaltic pump to run "forward" for a user input time | |
| Command the sample peristaltic pump to stop | |
| Close valve 518b | [518a] |
| De-energize valve 518a (return 3-ways to reactor/racetrack) | [ ] |
| Valve wash: | |
| Command the sample peristaltic pump to run in "reverse" for 1 second | |
| Command the sample peristaltic pump to stop | |
| Energize valve 518a (3-way valves towards mix pot) | [518a] |
| Open 518k valve | [518a, 518k] |
| Wait 5 seconds | |
| Close 518k valve | [518a] |
| De-energize valve 518a (return 3-ways to reactor/racetrack) | [ ] |
| Repeat valve wash 3 times | |
| Command the sample peristaltic pump to run in "reverse" for user input time | |
| Command the sample peristaltic pump to stop | |

Example 1

Construction of Tirzepatide by Solid Phase Peptide Synthesis (SPPS)

Figure 6:
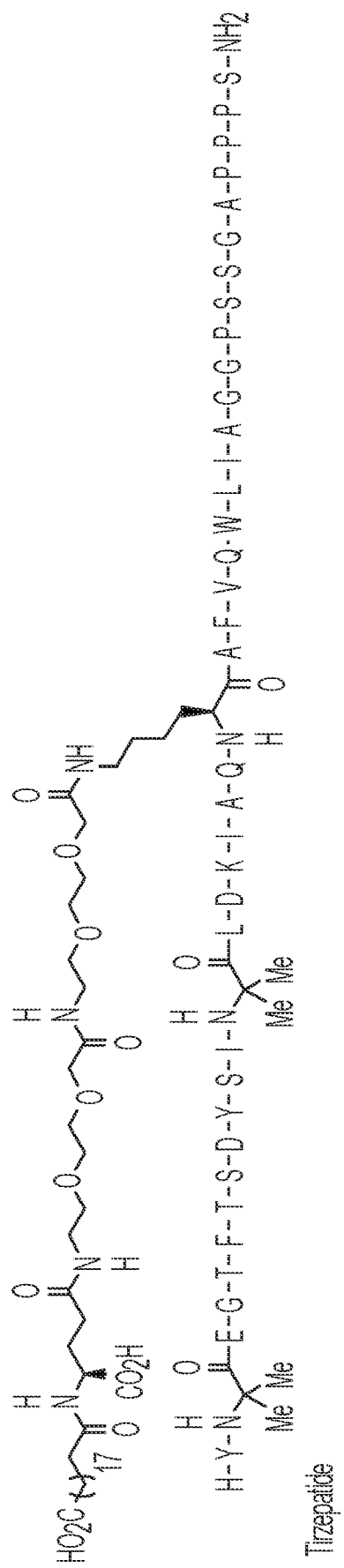
FIG. 6 shows a peptide that may be made using the present embodiments.
Figure 7:
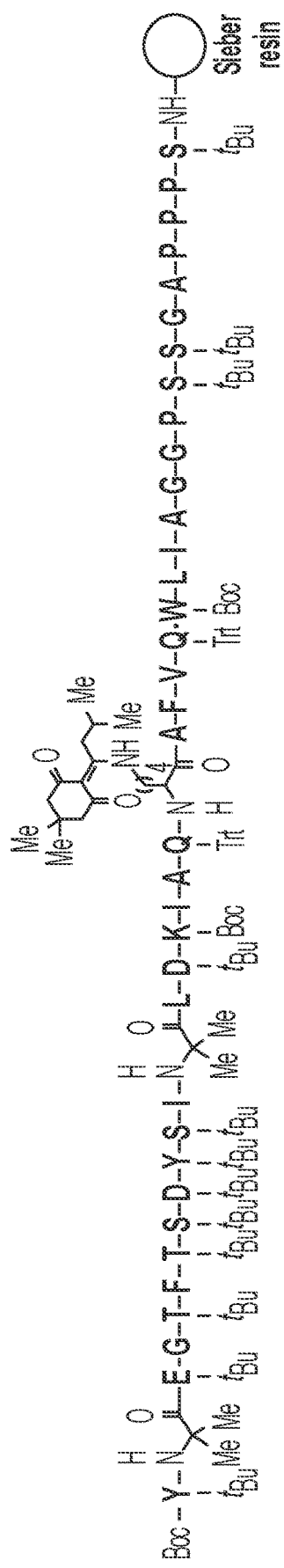
FIG. 7 shows a peptide that may be made using the present embodiments.

Tirzepatide (FIG. 6) contains a backbone of 39 amino acids, the synthesis of which is accomplished by linear solid phase peptide synthesis (SPPS). The tirzepatide synthesis proceeds by first constructing the 39-mer backbone intermediate as shown in FIG. 7 using the reactors-in-series method as described below. Note that during the course of the tirzepatide synthesis, the 39-mer backbone intermediate (FIG. 7) is attached to a solid support (Sieber resin as described herein) via the —$NH_2$ group attached to Serine-39.

Table 1 lists the order in which each of the 39 amino acids are used for the construction of the tirzepatide backbone. For example, serine is the first amino acid used in the backbone synthesis, it being the amino acid present at position 39 of tirzepatide. The nitrogen of each amino acid used in the linear SSPS from Ser39 to Aib2 is protected by a 9-fluorenylmethyloxycarbonyl (Fmoc) group on the α-nitrogen except for Tyr1 which is protected by a t-butyloxycarbonyl (Boc) on the α-nitrogen. For the sidechain protecting groups as indicated in Table 1, oxygen is protected with tert-butyl (tBu), and nitrogen is protected with trityl (Trt), 1-(4,4-dimethyl-2,6-dioxocyclohex-1-ylidene)-3-methylbutyl (ivDde), or Boc.

TABLE 1

Order of the 39 amino acids used in the construction of Tirzepatide by SPPS.

| Amino acid (AA) order of addition | AA position on peptide | AA name | AA used in coupling step |
|---|---|---|---|
| 1 | 39 | Serine | Fmoc-Ser(tBu)-OH |
| 2 | 38 | Proline | Fmoc-Pro-OH |
| 3 | 37 | Proline | Fmoc-Pro-OH |
| 4 | 36 | Proline | Fmoc-Pro-OH |
| 5 | 35 | Alanine | Fmoc-Ala-OH |
| 6 | 34 | Glycine | Fmoc-Gly-OH |
| 7 | 33 | Serine | Fmoc-Ser(tBu)-OH |
| 8 | 32 | Serine | Fmoc-Ser(tBu)-OH |
| 9 | 31 | Proline | Fmoc-Pro-OH |
| 10 | 30 | Glycine | Fmoc-Gly-OH |
| 11 | 29 | Glycine | Fmoc-Gly-OH |
| 12 | 28 | Alanine | Fmoc-Ala-OH |
| 13 | 27 | Isoleucine | Fmoc-Ile-OH |
| 14 | 26 | Leucine | Fmoc-Leu-OH |
| 15 | 25 | Tryptophan | Fmoc-Trp(Boc)-OH |
| 16 | 24 | Glutamine | Fmoc-Gln(Trt)-OH |
| 17 | 23 | Valine | Fmoc-Val-OH |
| 18 | 22 | Phenylalanine | Fmoc-Phe-OH |
| 19 | 21 | Alanine | Fmoc-Ala-OH |
| 20 | 20 | Lysine-ivDde | Fmoc-Lys(ivDde)-OH |
| 21 | 19 | Glutamine | Fmoc-Gln(Trt)-OH |
| 22 | 18 | Alanine | Fmoc-Ala-OH |
| 23 | 17 | Isoleucine | Fmoc-Ile-OH |
| 24 | 16 | Lysine | Fmoc-Lys(Boc)-OH |
| 25 | 15 | Aspartic acid | Fmoc-Asp(tBu)-OH |
| 26 | 14 | Leucine | Fmoc-Leu-OH |
| 27 | 13 | 2-Aminoisobutyric acid | Fmoc-Aib-OH |
| 28 | 12 | Isoleucine | Fmoc-Ile-OH |
| 29 | 11 | Serine | Fmoc-Ser(tBu)-OH |
| 30 | 10 | Tyrosine | Fmoc-Tyr(tBu)-OH |
| 31 | 9 | Aspartic acid | Fmoc-Asp(tBu)-OH |
| 32 | 8 | Serine | Fmoc-Ser(tBu)-OH |
| 33 | 7 | Threonine | Fmoc-Thr(tBu)-OH |
| 34 | 6 | Phenylalanine | Fmoc-Phe-OH |
| 35 | 5 | Threonine | Fmoc-Thr(tBu)-OH |
| 36 | 4 | Glycine | Fmoc-Gly-OH |
| 37 | 3 | Glutamic acid | Fmoc-Glu(tBu)-OH |
| 38 | 2 | 2-Aminoisobutyric acid | Fmoc-Aib-OH |
| 39 | 1 | Boc-Tyrosine | Boc-Tyr(tBu)-OH |

Reactors-In-Series Method

Prepare a 20 vol % solution of piperidine in DMF as follows: dilute piperidine (800 mL) up to a volume of 4.0 L by the addition of DMF to obtain a 20% solution by volume.

Prepare a 0.68 M solution of oxyma in DMF as follows: dissolve ethyl (hydroxyimino) cyanoacetate (oxyma, 386.85 g, 2.722 mol) in DMF up to a volume of 4.0 L to obtain a 0.68 M solution, then bubble nitrogen through the solution at 2 SCFH.

Prepare a 0.60 M solution of DIC in DMF as follows: dissolve N,N'-diisopropylcarbodiimide (340.8 g, 2.700 mol) in DMF up to a volume of 4.5 L to obtain a 0.60 M solution, then bubble nitrogen through the solution at 2 SCFH.

Prepare a 0.375 M solution of serine in DMF as follows: dissolve FMOC-Ser(tBu)-OH (431.3 g, 1.318 mol) in DMF up to a volume of 3.0 L with DMF, shake to dissolve, and then bubble nitrogen through the solution at 2 SCFH. In a similar manner, prepare 0.375 M solutions of each of the amino acids shown in Table 1.

Prepare the reaction system as follows: equip three equally-sized reactors with filter screens to retain solid resin when solution is pumped out. Label the reactors "RB1", "RB2", and "RB3" and add Sieber resin (500 g, 0.70 mmol/g, 350 mmol), divided equally between the reactors. Add 1500 mL DMF to each reactor and stir at room temperature for 24 h to swell the resin.

General Procedure A—F-moc deprotection and DMF washing process: To RB1 add a solution of piperidine (20 vol % in DMF, 1365 mL) and stir at room temperature for 30 min. Pump the piperidine solution from RB1 to RB2, then charge RB1 with another portion of piperidine solution (20 vol % in DMF, 1386 mL) and stir reactors RB1 and RB2 for 30 min. At the end of the stir time, pump the piperidine solution from RB2 to RB3, pump the piperidine solution from RB1 to RB2, and then charge RB1 with another portion of piperidine solution (20 vol % in DMF, 1407 mL). Stir all three reactors for 30 min at room temperature. Pump the piperidine solution from RB3 to waste, then pump the piperidine solution from RB2 into RB3, then pump the piperidine solution from RB1 into RB2. Stir RB2 and RB3 at room temperature for 30 min. Pump the piperidine solution from RB3 to waste, then pump the piperidine solution from RB2 to RB3. Stir RB3 at room temperature for 30 min then pump the piperidine solution from RB3 to waste. In this manner, piperidine solution has been pumped through the three reactors in series three times and stirred each one 30 min each time.

After all three allotments of piperidine solution have been stirred through all three reactors and to the waste collection, add DMF (1218 mL) into RB1 and stir for 5 min at room temperature. Then pump the solvent from RB1 into RB2 and add DMF (1208 mL) to RB1. Stir both vessels at room temperature for 5 min. Pump the solvent from RB2 to RB3 and from RB1 to RB2. Add DMF (1758 mL) into RB1 and stir all three vessels at room temperature for 5 min. Repeat this same procedure until allocations of DMF solvent have been pumped through the three reactors in series (pumping the DMF solvent from RB3 to waste each time) for a total of eight washes per reactor, using a total of 12.66 L (11.95 kg) of DMF. The average DMF wash volume is 1580 mL. The target wash volume is 1400 mL per wash, so on subsequent amino acids in the peptide synthesis, adjust the pump and feed tank pressure so that subsequent charges are closer to 1400 mL.

General Procedure B—amino acid activation and coupling process: To a jacketed reactor labeled "RA" add serine solution (0.375 M in DMF, 774 g), oxyma solution (0.68 M in DMF, 422 g), and then DIC solution (0.60 M in DMF, 506 g). Stir the solution at 15° C. for 30 min to obtain an activated serine solution, then add this solution to RB1. Repeat this process to prepare an activated serine solution in reactor RA and add it to RB2, then repeat the process again and add the activated serine solution to RB3. Each of the 3 reactors has a total slurry volume of about 2200-2300 mL during the coupling reactions, which equals the activated ester solution plus volume of swollen resin. Stir reactors RB1, RB2, and RB3 at room temperature for 8 h, then drain the solvent from all three reactors.

Wash reactors RA, RB1, RB2 and RB3 with DMF solvent in series in a similar manner that of to General Procedure A for a total of 7 washes per each reactor. The first 3 washes are pumped to the spray ball in RA before they are pumped into RB1. Therefore the first 3 washes go through RA, RB1, RB2, and RB3 in series. However, when pumping each wash out of RA, a small portion of the solvent rinse is pumped from RA to RB3 (~30 mL), then a small portion of the solvent rinse is pumped from RA to RB2 (~30 mL), then the majority of the solvent to RB1 (~1340 mL), followed by pumping clear the tube between RA and RB3, and pumping clear the tube between RA and R2. This flushes and clears out the transfer tubing and valves between RA and each of the resin reactors. Then, for the 4th through 7th wash, a small portion of the DMF solvent is pumped in through the spray ball of RB3 (100 mL), then a small portion of the DMF solvent was pumped in through the spray ball of RB2 (100 mL), then 1400 mL DMF solvent was pumped in through the spray ball of RB1. The purpose is to rinse down solid resin particles from the walls of each reactor. The total amount of solvent used for washes after coupling is 10.69 L (10.09 kg). For later amino acids in the 39mer peptide backbone synthesis, the amount of DMF that sprayed into RB2 and RB3 through the spray balls is reduced to ~50 mL.

For each amino acid listed in Table 1, from proline 38 to Boc-tyrosine 1, perform Fmoc deprotection of the previously coupled amino acid using General Procedure A, followed by coupling using General Procedure B. For the coupling of serine 39 as well as the next 38 amino acids, use General Procedure B with the stoichiometries listed in Table 2. Where indicated in Table 2, prepare additional activated ester and re-couple with the stoichiometries given in Table 2 according to General Procedure B. Stir the coupling reactions until a conversion of >99% is achieved.

TABLE 2

Molar equivalents of amino acids, oxyma, and DIC in each reactor relative to the resin.

| | equivalents AA to RB1 | equivalents oxyma to RB1 | equivalents DIC to RB1 | equivalents AA to RB2 | equivalents oxyma to RB2 | equivalents DIC to RB2 | equivalents AA to RB3 | equivalents oxyma to RB3 | equivalents DIC to RB3 |
|---|---|---|---|---|---|---|---|---|---|
| Ser at 39 | 2.46 | 2.61 | 2.82 | 2.46 | 2.40 | 2.77 | 2.49 | 2.40 | 2.76 |
| Pro at 38 | 1.48 | 1.47 | 1.67 | 1.47 | 1.43 | 1.68 | 1.48 | 1.44 | 1.69 |
| Pro38 recoupling | 0.49 | 0.52 | 0.55 | 0.49 | 0.50 | 0.57 | 0.50 | 0.51 | 0.57 |
| Pro at 37 | 1.53 | 1.49 | 1.65 | 1.53 | 1.49 | 1.65 | 1.51 | 1.51 | 2.77 |
| Pro at 36 | 1.47 | 1.52 | 1.65 | 1.47 | 1.52 | 1.65 | 1.49 | 1.53 | 1.67 |
| Pro36 recoupling | 0.98 | 0.97 | 1.08 | 0.98 | 0.99 | 1.10 | 0.99 | 0.99 | 1.11 |
| Ala at 35 | 0.00 | 1.48 | 1.63 | 1.51 | 1.49 | 1.64 | 1.48 | 1.52 | 1.69 |
| Ala35 recoupling | 0.96 | 0.99 | 1.09 | 0.97 | 1.00 | 1.10 | 0.98 | 1.01 | 1.12 |
| Gly at 34 | 1.47 | 1.51 | 1.66 | 1.45 | 1.49 | 1.65 | 1.52 | 1.52 | 1.70 |
| Gly34 recoupling | 1.00 | 0.98 | 1.11 | 0.99 | 0.98 | 1.11 | 1.02 | 1.01 | 1.13 |
| Ser at 33 | 1.50 | 1.50 | 1.64 | 1.51 | 1.49 | 1.64 | 1.55 | 1.53 | 1.68 |
| Ser at 32 | 1.48 | 1.45 | 1.62 | 1.49 | 1.47 | 1.62 | 1.49 | 1.47 | 1.63 |
| Ser32 recoupling | 0.49 | 0.48 | 0.54 | 0.50 | 0.48 | 0.54 | 0.50 | 0.48 | 0.54 |
| Pro at 31 | 1.46 | 1.45 | 1.61 | 1.46 | 1.46 | 1.61 | 1.48 | 1.48 | 1.65 |
| Pro31 recoupling | 0.97 | 0.99 | 1.09 | 0.97 | 0.99 | 1.09 | 0.98 | 0.99 | 1.10 |
| Gly at 30 | 1.43 | 1.46 | 1.64 | 1.44 | 1.46 | 1.63 | 1.49 | 1.48 | 1.66 |
| Gly30 recoupling | 0.98 | 0.97 | 1.08 | 0.97 | 0.98 | 1.10 | 1.00 | 0.99 | 1.12 |
| Gly at 29 | 1.46 | 1.46 | 1.60 | 1.47 | 1.46 | 1.60 | 1.52 | 1.51 | 1.65 |
| Gly29 recoupling | 0.98 | 0.99 | 1.10 | 0.98 | 0.98 | 1.08 | 1.00 | 1.00 | 1.12 |
| Ala at 28 | 1.50 | 1.45 | 1.59 | 1.51 | 1.46 | 1.60 | 1.54 | 1.51 | 1.66 |
| Ala28 recoupling | 1.00 | 0.97 | 1.07 | 1.01 | 0.97 | 1.08 | 1.03 | 1.01 | 1.12 |
| Ile at 27 | 0.00 | 1.45 | 1.61 | 1.44 | 1.47 | 1.61 | 1.53 | 1.51 | 0.00 |
| Ile27 recoupling | 0.99 | 0.96 | 1.10 | 0.99 | 0.99 | 1.09 | 1.03 | 1.03 | 1.14 |

TABLE 2-continued

Molar equivalents of amino acids, oxyma, and DIC in each reactor relative to the resin.

| | equivalents AA to RB1 | equivalents oxyma to RB1 | equivalents DIC to RB1 | equivalents AA to RB2 | equivalents oxyma to RB2 | equivalents DIC to RB2 | equivalents AA to RB3 | equivalents oxyma to RB3 | equivalents DIC to RB3 |
|---|---|---|---|---|---|---|---|---|---|
| Leu at 26 | 1.48 | 1.45 | 1.62 | 1.47 | 1.47 | 1.61 | 1.55 | 1.52 | 1.68 |
| Leu26 recoupling | 1.00 | 0.97 | 1.09 | 1.00 | 0.98 | 1.08 | 1.05 | 1.02 | 1.14 |
| Trp at 25 | 1.52 | 1.47 | 1.60 | 1.52 | 1.46 | 1.61 | 1.60 | 1.54 | 1.71 |
| Gln at 24 | 1.44 | 1.50 | 1.60 | 1.47 | 1.51 | 1.61 | 1.56 | 1.59 | 1.71 |
| Gln24 recoupling | 1.46 | 1.49 | 1.59 | 1.47 | 1.49 | 1.60 | 1.55 | 1.58 | 1.70 |
| Val at 23 | 1.80 | 1.48 | 1.62 | 1.51 | 1.48 | 1.61 | 1.72 | 1.60 | 1.71 |
| Val23 recoupling | 1.44 | 1.48 | 1.62 | 1.47 | 1.49 | 1.63 | 1.51 | 1.58 | 1.71 |
| Phe at 22 | 1.67 | 1.46 | 1.59 | 1.22 | 1.49 | 1.61 | 1.39 | 1.59 | 1.72 |
| Phe22 recoupling | 1.52 | 1.47 | 1.62 | 1.45 | 1.49 | 1.64 | 1.46 | 1.60 | 1.74 |
| Ala at 21 | 1.46 | 1.50 | 1.66 | 1.49 | 1.52 | 1.67 | 1.52 | 1.54 | 1.69 |
| Ala21 recoupling | 1.38 | 1.51 | 1.65 | 1.50 | 1.54 | 1.66 | 1.62 | 1.54 | 1.68 |
| Lys-ivDde at 20 | 1.49 | 1.52 | 1.68 | 1.58 | 1.53 | 1.69 | 1.51 | 1.53 | 1.69 |
| Lys-ivDde20 recoupling | 1.46 | 1.53 | 1.66 | 1.53 | 1.54 | 1.68 | 1.54 | 1.54 | 1.67 |
| Gln at 19 | 1.42 | 1.45 | 1.56 | 1.51 | 1.53 | 1.67 | 1.48 | 1.50 | 1.63 |
| Gln19 recoupling | 1.42 | 1.48 | 1.56 | 1.52 | 1.53 | 1.66 | 1.48 | 1.49 | 1.63 |
| Ala at 18 | 1.43 | 1.45 | 1.57 | 1.55 | 1.57 | 1.68 | 1.62 | 1.50 | 1.65 |
| Ala18 recoupling | 1.37 | 1.45 | 1.58 | 1.53 | 1.52 | 1.68 | 1.54 | 1.52 | 1.65 |
| Ile at 17 | 1.36 | 1.38 | 1.54 | 1.45 | 1.45 | 1.52 | 1.38 | 1.41 | 1.55 |
| Ile17 recoupling | 1.39 | 1.44 | 1.52 | 1.45 | 1.42 | 1.58 | 1.40 | 1.41 | 1.54 |
| Ile17 second recoupling | 1.40 | 1.37 | 1.51 | 1.45 | 1.43 | 1.58 | 1.39 | 1.36 | 1.50 |
| Lys at 16 | 1.39 | 1.42 | 1.63 | 1.55 | 1.52 | 1.70 | 1.46 | 1.55 | 1.65 |
| Lys16 recoupling | 1.43 | 1.48 | 1.64 | 1.47 | 1.54 | 1.71 | 1.43 | 1.52 | 1.65 |
| Asp at 15 | 1.45 | 1.46 | 1.63 | 1.53 | 1.54 | 1.70 | 1.50 | 1.52 | 1.67 |
| Asp15 recoupling | 1.47 | 1.49 | 1.62 | 1.54 | 1.54 | 1.72 | 1.50 | 1.51 | 1.67 |
| Leu at 14 | 1.57 | 1.62 | 1.76 | 1.66 | 1.69 | 1.87 | 1.50 | 1.54 | 1.70 |
| Aib at 13 | 1.54 | 1.53 | 1.77 | 1.61 | 1.70 | 1.88 | 1.46 | 1.57 | 1.70 |
| Aib13 recoupling | 1.51 | 1.62 | 1.73 | 1.56 | 1.68 | 1.78 | 1.42 | 1.56 | 1.67 |
| Ile at 12 | 1.69 | 1.82 | 1.93 | 1.61 | 1.75 | 1.85 | 1.48 | 1.61 | 1.67 |
| Ile12 recoupling | 1.78 | 1.81 | 1.90 | 1.70 | 1.73 | 1.79 | 1.57 | 1.62 | 1.69 |
| Ile12 second recoupling | 1.78 | 1.79 | 1.86 | 1.70 | 1.76 | 1.81 | 1.57 | 1.59 | 1.87 |
| Ser at 11 | 1.77 | 1.82 | 1.98 | 1.71 | 1.75 | 1.89 | 1.61 | 1.65 | 1.76 |
| Ser11 recoupling | 1.80 | 1.77 | 1.92 | 1.73 | 1.71 | 1.84 | 1.62 | 1.61 | 1.73 |
| Tyr at 10 | 1.66 | 1.79 | 1.93 | 1.67 | 1.75 | 1.88 | 1.61 | 1.67 | 1.72 |
| Tyr10 recoupling | 1.77 | 1.82 | 1.96 | 1.68 | 1.65 | 1.66 | 1.60 | 1.67 | 1.79 |
| Asp at 9 | 1.76 | 1.74 | 1.92 | 1.85 | 1.86 | 2.04 | 1.63 | 1.66 | 1.82 |
| Asp9 recoupling | 1.76 | 1.76 | 1.92 | 1.85 | 1.89 | 2.01 | 1.64 | 1.65 | 1.79 |
| Ser at 8 | 1.94 | 1.96 | 2.08 | 1.87 | 1.88 | 2.02 | 1.67 | 1.63 | 1.87 |
| Ser8 recoupling | 1.94 | 1.94 | 2.10 | 1.87 | 1.88 | 2.04 | 1.67 | 1.66 | 1.85 |
| Thr at 7 Phe at 6 | 1.83 | 1.89 | 2.06 | 1.80 | 1.83 | 1.99 | 1.63 | 1.65 | 1.82 |
| Thr at 5 | 1.75 | 1.69 | 1.91 | 1.88 | 1.92 | 2.03 | 1.57 | 1.62 | 1.72 |
| Gly at 4 | 1.57 | 1.63 | 1.72 | 1.67 | 1.71 | 1.84 | 1.52 | 1.56 | 1.66 |
| Gly4 recoupling | 1.60 | 1.62 | 1.68 | 1.68 | 1.71 | 1.80 | 1.52 | 1.58 | 1.64 |
| Glu at 3 | 1.67 | 1.74 | 1.81 | 1.64 | 1.73 | 1.80 | 1.53 | 1.60 | 1.71 |
| Glu3 recoupling | 1.65 | 1.72 | 1.81 | 1.63 | 1.75 | 1.80 | 1.52 | 1.56 | 1.69 |
| Aib at 2 | 1.55 | 1.76 | 1.87 | 1.64 | 1.75 | 1.80 | 1.72 | 1.76 | 1.91 |
| Boc-Tyr at 1 | 1.57 | 1.71 | 1.83 | 1.66 | 1.73 | 1.80 | 1.77 | 1.83 | 2.00 |

An average of 10 DMF washes are used after coupling (see Table 8). In a manufacturing run, it is recommended that 7 washes are to be done to save time and solvents.

Starting with the proline coupling at the 37 position, take automated samples for on-line LCMS. Automated samples containing solid resin are taken from RB3 at 15, 75, 180, 324, 503, and 684 min into the coupling step. Automated samples are also taken at various times from RB3 during the deprotection step. For each sample, a 1.0 mL slurry sample is taken from the reactor by the automated pump and valves. The sample is diluted with 25 mL TFA and intermittently mixed for 30 min reaction time, cleaving the peptide from the resin beads and removing protecting groups from the peptide. Next, the sample is mixed with 75 mL of 4:1 DMSO: acetonitrile. The diluted solution is parked in the 2 μL LC switching loop and injected onto the column.

Adjust the number of 20% piperidine in DMF washes and stir time in order to achieve ≥99% conversion as determined by LCMS. For Ser39 through Leu26, the stir time for the 20% piperidine in DMF is 30 min; for Trp25 and Gln24 it is 40 min; for Val23 through Leu14 it is 50 min. For Aib13 5 washes are stirred for 50 min and 3 more washes are stirred for 90 min. For the remaining amino acids (Ile12 through Boc-Tyr1), the first 3 washes of 20% piperidine in DMF are stirred from 20-30 min, and then for longer extended times when the 4$^{th}$ piperidine wash entered the first reactor in series. For Pro36 and Gly34, perform an extra deprotection and washing step as outlined in General Procedure A. It is to be noted that generally three 30-minute stirs with 20% piperidine in DMF is sufficient to achieve ≥99% conversion, and this would save time, solvents, and reagents in a manufacturing run of this procedure.

Adjust the number of DMF washes after the piperidine deprotection step to ensure that the wash stream contains <600 ppm piperidine by gas chromatographic (GC) analysis before carrying out the coupling procedure with the next amino acid. The average number of washes used after the piperidine deprotection step is 11 washes (see Table 7) Generally this is achieved with 10 washes, so it is recommended that in a manufacturing run 10 DMF washes are to be used after the piperidine deprotection steps.

Table 3 shows the on-line LCMS sample times and the calculated % conversions throughout the 39-mer peptide backbone synthesis. FIG. 4 shows the process and instrumentation diagram for automated sampling, cleavage, deprotection, dilution, and parking cart for on-line LCMS.

TABLE 3

On-line LCMS samples and reaction % conversions

| Sample | % conversion |
|---|---|
| 75 min coupling Pro at 37 | 94.5 |
| 180 min coupling Pro at 37 | 99 |
| 300 min coupling Pro at 37 | 99.8 |
| 498 min coupling Pro at 37, taken during wash | 99.6 |
| Deprotected Pro at 37 after eight 30-min piperidine washes | 99.8 |
| 75 min coupling Pro at 36 | 89.8 |
| 180 min coupling Pro at 36 | 99.1 |
| 480 min coupling Pro at 36 | 99.6 |
| After 200 min recoupling with extra 1 eq | 99.6 |
| After 216 min recoupling with extra 1 eq, sampled during wash | 100 |
| Deprotected Pro at 36 after eight 30-min piperidine washes | 99.7 |
| 75 min coupling Ala at 35 | 70.9 |
| 280 min coupling Ala at 35 | 99.2 |
| After 121 min recoupling with extra 1 eq | 99.3 |
| After 243 min recoupling with extra 1 eq | 99.2 |
| Deprotected Ala at 35 after three 30-min piperidine washes | 99.4 |
| Deprotected Ala at 35 after 15 min into 4th 30-min piperidine wash | 99.8 |
| Deprotected Ala at 35 after 15 min into 6th 30-min piperidine wash | 99.9 |
| Deprotected Ala at 35 after six 30-min piperidine washes | 100 |
| 15 min coupling Gly at 34 | 36.6 |
| 75 min coupling Gly at 34 | 65.5 |
| 180 min coupling Gly at 34 | 98.7 |
| 360 min coupling Gly at 34 | 99.3 |
| After 15 min recoupling with extra 1 eq | 100 |
| After 60 min recoupling with extra 1 eq | 100 |
| Deprotected Gly at 34 after 15 min into 3rd 30-min piperidine wash | 99.5 |
| 240 min coupling Ser at 33 | 100 |
| 360 min coupling Ser at 33 | 99.7 |
| 453 min coupling Ser at 33 | 99.6 |
| 466 min coupling Ser at 33, sample during wash | 99.9 |
| 120 min coupling Ser at 32 | 99.2 |
| 240 min coupling Ser at 32 | 98.9 |
| 360 min coupling Ser at 32 | 100 |
| After 15 min recoupling with extra 0.5 eq | 100 |
| After 60 min recoupling with extra 0.5 eq | 100 |
| After 110 min recoupling with extra 0.5 eq | 100 |
| After 2 h recoupling with extra 0.5 eq, sample during wash | 100 |
| Deprotected Ser at 32 after 15 min into 3rd 30-min piperidine wash | 99.3 |
| Deprotected Ser at 32 after 15 min into 5th 30-min piperidine wash | 99.4 |
| Deprotected Ser at 32 after six 30-min piperidine stirs | 99.3 |
| 60 min coupling Pro at 31 | 74.6 |
| 110 min coupling Pro at 31 | 93.2 |
| 180 min coupling Pro at 31 | 99.8 |
| 240 min coupling Pro at 31 | 99.7 |
| 15 min into third 30-min deprotection of Pro at 31 | 99.5 |
| 15 min into fifth 30-min deprotection of Pro at 31 | 99.3 |
| Deprotected Pro at 31 after eight 30-min piperidine stirs | 99.5 |
| 60 min coupling Gly at 30 | 55.6 |
| 120 min coupling Gly at 30 | 70 |
| 180 mine coupling Gly at 30 | 101.9 |
| 240 min coupling Gly at 30 | 98.2 |
| 360 min coupling Gly at 30 | 98.4 |
| After 85 min recoupling with extra 1 eq, sampled during wash | 99.7 |
| 15 min into third 30-min deprotection of Gly at 30 | 99 |
| 15 min into fifth 30-min deprotection of Gly at 30 | 99.5 |
| Deprotected Gly at 30 after six 30-min stirs, sampled during wash | 99.7 |
| 60 min coupling Gly at 29 | 45.1 |
| 120 min coupling Gly at 29 | 74.1 |
| 180 min coupling Gly at 29 | 98.3 |
| 240 min coupling Gly at 29 | 98.8 |
| 360 min coupling Gly at 29 | 99.2 |
| After 167 min recoupling with extra 1 eq, sampled during wash | 99.4 |
| 15 min into third 30-min deprotection of Gly at 29 | 99.5 |
| 15 min into fifth 30-min deprotection of Gly at 29 | 99.4 |
| Deprotected Gly at 29 after eight 30-min piperidine stirs | 99.6 |
| 60 min coupling Ala at 28 | 52.4 |
| 120 min coupling Ala at 28 | 78.2 |
| 180 min coupling Ala at 28 | 98.1 |
| 240 min coupling Ala at 28 | 98.4 |
| 360 min coupling Ala at 28 | 98.9 |
| After 120 min recoupling with extra 1 eq | 99.4 |
| After 180 min recoupling with extra 1 eq, taken during wash | 99.6 |
| 15 min into fifth 30-min deprotection of Ala at 28 | 99.9 |

TABLE 3-continued

On-line LCMS samples and reaction % conversions

| Sample | % conversion |
|---|---|
| Deprotected Ala at 28 after eight 30-min piperidine stirs | 99.9 |
| 60 min coupling Ile at 27 | 72 |
| 120 min coupling Ile at 27 | 91.4 |
| 180 min coupling Ile at 27 | 97.7 |
| 240 min coupling Ile at 27 | 98.6 |
| 360 min coupling Ile at 27 | 99.1 |
| 5 min into third 30-min deprotection of Ile at 27 | 99.8 |
| 5 min into fifth 30-min deprotection of Ile at 27 | 100 |
| Deprotected Ile at 27 after eight 30-min piperidine stirs | 100 |
| 75 min coupling Leu at 26 | 74.6 |
| 135 min coupling Leu at 26 | 84.8 |
| 5 min into third 30-min deprotection of Leu at 26 | 101.4 |
| 75 min coupling Trp at 25 | 100 |
| 135 min coupling Trp at 25 | 99.8 |
| 195 min coupling Trp at 25 | 100 |
| 255 min coupling Trp at 25 | 100 |
| 360 min coupling Trp at 25 | 100 |
| 391 min coupling Trp at 25, sample during wash | 100 |
| 5 min into 2nd 40-min deprotection of Trp at 25 | 97.4 |
| 5 min into 3rd 40-min deprotection of Trp at 25 | 99.2 |
| 5 min into 5th 40-min deprotection of Trp at 25 | 98.7 |
| Deprotected Trp at 25 after six 40-min piperidine stirs | 100.1 |
| 75 min coupling Gln at 24 | 93.6 |
| 135 min coupling Gln at 24 | 98.6 |
| 195 min coupling Gln at 24 | 99.9 |
| 255 min coupling Gln at 24 | 100 |
| 360 min coupling Gln at 24 | 100 |
| 75 min coupling Val at 23 | 93.8 |
| 135 min coupling Val at 23 | 99.2 |
| 195 min coupling Val at 23 | 99.2 |
| 255 min coupling Val at 23 | 99.5 |
| 350 min coupling Val at 23 | 99.5 |
| After 60 min recoupling with extra 1.5 eq | 99.6 |
| After 221 min recoupling with extra 1.5 eq, taken during wash | 99.7 |
| 5 min into 2nd 50-min deprotection of Val at 23 | 95.8 |
| 5 min into 3rd 50-min deprotection of Val at 23 | 100.3 |
| 5 min into 4th 50-min deprotection of Val at 23 | 100 |
| deprotected Val at 23 after five 50-min piperidine stirs | 100 |
| 75 min coupling Phe at 22 | 98.9 |
| 135 min coupling Phe at 22 | 99.1 |
| 195 min coupling Phe at 22 | 99.5 |
| 255 min coupling Phe at 22 | 99.4 |
| 360 min coupling Phe at 22 | 99.7 |
| Phe at 22 coupling after 120 min recoupling with extra 1.5 eq | 99.8 |
| 5 min into 2nd 50-min deprotection of Phe at 22 | 94.8 |
| 5 min into 3rd 50-min deprotection of Phe at 22 | 99.5 |
| 5 min into 4th 50-min deprotection of Phe at 22 | 100 |
| Deprotected Phe at 22 after five 50-min piperidine stirs | 100 |
| 75 min coupling Ala at 21 | 78.2 |
| 135 min coupling Ala at 21 | 96.2 |
| 195 min coupling Ala at 21 | 99 |
| 255 min coupling Ala at 21 | 99.5 |
| 360 min coupling Ala at 21 | 99.8 |
| Ala at 21 coupling after 120 min recoupling with extra 1.5 eq | 99.7 |
| Ala at 21 coupling after 216 min recoupling with extra 1.5 eq | 99.8 |
| Deprotected Ala at 21 after five 50-min piperidine stirs | 100 |
| 75 min coupling Lys-ivDde at 20 | 73 |
| 135 min coupling Lys-ivDde at 20 | 82.4 |
| 195 min coupling Lys-ivDde at 20 | 92 |
| 255 min coupling Lys-ivDde at 20 | 95.1 |
| 360 min coupling Lys-ivDde at 20 | 98 |
| 448 min coupling Lys-ivDde at 20 | 98.3 |
| 565 min coupling Lys-ivDde at 20 | 99.1 |
| Lys-ivDde at 20 coupling after 60 min with extra 1.5 eq | 99 |
| Deprotected Lys-ivDde at 20 after five 50-min piperidine stirs | 98.1 |
| 75 min coupling Gln at 19 | 65.5 |
| 135 min coupling Gln at 19 | 79.7 |
| 195 min coupling Gln at 19 | 90.7 |
| 255 min coupling Gln at 19 | 96.2 |
| 360 min coupling Gln at 19 | 98.9 |
| Gln at 19 coupling after 60 min recoupling with extra 1.5 eq | 99.4 |
| Gln at 19 coupling after 180 min recoupling with extra 1.5 eq, taken during wash | 99.6 |
| 5 min into 2nd 50-min deprotection of Gln at 19 | 93.8 |
| 5 min into 3rd 50-min deprotection of Gln at 19 | 99.1 |
| 5 min into 4th 50-min deprotection of Gln at 19 | 99.6 |
| Deprotected Gln at 19 after five 50-min piperidine stirs | 99.8 |
| 75 min coupling Ala at 18 | 81.8 |
| 135 min coupling Ala at 18 | 97.1 |
| 195 min coupling Ala at 18 | 99.1 |
| 255 min coupling Ala at 18 | 99.5 |
| 360 min coupling Ala at 18 | 99.7 |
| Ala at 18 coupling after 60 min with extra 1.5 eq | 99.8 |
| Ala at 18 coupling after 180 min with extra 1.5 eq, taken during wash | 99.9 |
| Ala at 18 coupling after 180 min with extra 1.5 eq, taken during second combined wash | 99.9 |
| 5 min into 2nd 50-min deprotection of Ala at 18 | 87.2 |
| 5 min into 3rd 50-min deprotection of Ala at 18 | 98.5 |
| 5 min into 4th 50-min deprotection of Ala at 18 | 99.6 |
| Deprotected Ala at 18 after five 50-min piperidine stirs | 99.7 |
| 75 min coupling Ile at 17 | 68.6 |
| 135 min coupling Ile at 17 | 85.7 |
| 195 min coupling Ile at 17 | 91.7 |
| 255 min coupling Ile at 17 | 93.9 |
| 360 min coupling Ile at 17 | 96.5 |
| Ile at 17 coupling after 60 min recoupling with extra 1.5 eq | 98.3 |
| Ile at 17 coupling after 180 min recoupling with extra 1.5 eq, taken during wash | 99.2 |
| Ile at 17 coupling after 60 min second recoupling with extra 1.5 eq | 99.6 |
| Ile at 17 coupling after 600 min second recoupling with extra 1.5 eq | 99.5 |
| Ile at 17 coupling after 689 min second recoupling with extra 1.5 eq, taken during wash | 99.8 |
| 5 min into first 50-min deprotection of Ile at 17 | |
| 5 min into 2nd 50-min deprotection of Ile at 17 | 90.3 |
| 5 min into 3rd 50-min deprotection of Ile at 17 | 99.5 |
| 5 min into 4th 50-min deprotection of Ile at 17 | 99.7 |
| Deprotected Ile at 17 after five 50-min piperidine stirs | 99.9 |
| 75 min coupling Lys at 16 | 82.3 |
| 135 min coupling Lys at 16 | 91.2 |
| 195 min coupling Lys at 16 | 96.5 |
| 255 min coupling Lys at 16 | 99 |
| 360 min coupling Lys at 16 | 99.5 |
| Lys at 16 coupling after 60 min recoupling with extra 1.5 eq | 99.7 |
| Lys at 16 coupling after 180 min recoupling with extra 1.5 eq | 99.8 |
| 5 min into 2nd 50-min deprotection of Lys at 16 | 94.4 |
| 5 min into 3rd 50-min deprotection of Lys at 16 | 99.7 |
| 5 min into 4th 50-min deprotection of Lys at 16 | 99.8 |
| Deprotected Lys at 16 after five 50-min piperidine stirs | 100 |
| 75 min coupling Asp at 15 | 89.6 |
| 135 min coupling Asp at 15 | 98.7 |
| 195 min coupling Asp at 15 | 99.2 |
| 255 min coupling Asp at 15 | 99.5 |
| 360 min coupling Asp at 15 | 99.6 |
| Asp at 15 coupling after 120 min recoupling with extra 1.5 eq | 99.7 |
| Asp at 15 coupling after 360 min recoupling with extra 1.5 eq, taken during wash | 99.7 |

TABLE 3-continued

On-line LCMS samples and reaction % conversions

| Sample | % conversion |
|---|---|
| 5 min into 2nd 50-min deprotection of Asp at 15 | 99.2 |
| 5 min into 3rd 50-min deprotection of Asp at 15 | 99.8 |
| 75 min coupling Leu at 14 | 80 |
| 135 min coupling Leu at 14 | 93.9 |
| 195 min coupling Leu at 14 | 99.2 |
| 255 min coupling Leu at 14 | 99.5 |
| 360 min coupling Leu at 14 | 99.6 |
| 5 min into 2nd 50-min deprotection of Leu at 14 | 60.1 |
| 5 min into 3rd 50-min deprotection of Leu at 14 | 95.6 |
| 5 min into 4th 50-min deprotection of Leu at 14 | 99.5 |
| Deprotected Leu at 14 after five 50-min piperidine stirs | 99.8 |
| 75 min coupling Aib at 13 | 66.4 |
| 135 min coupling Aib at 13 | 79.9 |
| 195 min coupling Aib at 13 | 88.3 |
| 255 min coupling Aib at 13 | 89.4 |
| 360 min coupling Aib at 13 | 94.5 |
| 474 min coupling Aib at 13 | 96.4 |
| Aib at 13 coupling after 60 min recoupling with extra 1.5 eq | 97.9 |
| Aib at 13 coupling after 180 min recoupling with extra 1.5 eq | 98.1 |
| Aib at 13 coupling after 440 min recoupling with extra 1.5 eq | 98.6 |
| Aib at 13 coupling after 600 min recoupling with extra 1.5 eq | 99.3 |
| Aib at 13 coupling after 817 min recoupling with extra 1.5 eq | 99.4 |
| Aib at 13 coupling after 1059 min recoupling with extra 1.5 eq | 99.4 |
| 5 min into 2nd 50-min deprotection of Aib at 13 | 97 |
| 5 min into 3rd 50-min deprotection of Aib at 13 | 96.9 |
| 5 min into 4th 50-min deprotection of Aib at 13 | 97.9 |
| 5 min into 6th deprotection (90 min stir) | 99.4 |
| 5 min into 7th deprotection (90 min stir) | 99.2 |
| 5 min into 8th deprotection (90 min stir) | 99.7 |
| Deprotected Aib at 13 after 8 piperidine stirs | 99.7 |
| 75 min coupling Ile at 12 | 54.9 |
| 135 min coupling Ile at 12 | 58.8 |
| 195 min coupling Ile at 12 | 62.8 |
| 360 min coupling Ile at 12 | 70.7 |
| 600 min coupling Ile at 12 | 79.1 |
| 897 min coupling Ile at 12 (60 min into recoupling) | 86.7 |
| 1137 min coupling Ile at 12 (5 h into recoupling) | 89.9 |
| 1437 min coupling Ile at 12 (10 h into recoupling) | 94 |
| 1837 min coupling Ile at 12 (16.7 h into recoupling) | 96.7 |
| 2337 min coupling Ile at 12 (25 h into recoupling) | 98.1 |
| 2789 min coupling Ile at 12 (32.5 h into recoupling) | 99 |
| 2946 min coupling Ile at 12 (15 min into 2nd recoupling) | 99 |
| 3006 min coupling Ile at 12 (75 min into 2nd recoupling) | 99.1 |
| 3171 min coupling Ile at 12 (240 min into 2nd recoupling) | 99.1 |
| 3454 min coupling Ile at 12 (523 min into 2nd recoupling) | 99.3 |
| 5 min into 3rd 20-min deprotection of Ile 12 | 100.4 |
| 2 h into 4th deprotection of Ile 12 | 99.6 |
| Near end of 4th deprotection of Ile 12 | 100 |
| 75 min coupling Ser11 | 97.2 |
| 135 min coupling Ser11 | 99.1 |
| 5 min into 3rd 20-min deprotection of Ser11 | 100 |
| 45 min into 4th deprotection of Ser11 | 99.6 |
| Final deprotection sample taken during wash | 99.7 |
| 75 min coupling Tyr10 | 93.7 |
| 135 min coupling Tyr10 | 98.3 |
| 195 min coupling Tyr10 | 99.3 |
| 255 min coupling Tyr10 | 99.5 |
| 360 min coupling Tyr10 | 100 |
| 589 min sample, 60 min into recoupling Tyr10 coupling | 100 |
| 648 in sample, Tyr10 coupling at end, sample during wash | 100 |
| 5 min into 3rd 20-min deprotection of Tyr10 (76 min) | 99.4 |
| 45 min into 4th deprotection of Tyr10 (151 min) | 99.5 |
| 2 h into 4th deprotection of Tyr10 (226 min) | 99.7 |
| 4 h into 4th deprotection of Tyr10 (346 min) | 99.7 |
| 6 h into 4th deprotection of Tyr10 (466 min) | 99.7 |
| 8 h into 4th deprotection of Tyr10 (586 min) | 99.7 |
| Deprotection of Tyr10, sample during wash (668 min) | 100 |
| 15 min coupling Asp 9 | 90.1 |
| 75 min coupling Asp 9 | 98.1 |
| 135 min coupling Asp 9 | 99.3 |
| 195 min coupling Asp 9 | 99.3 |
| 255 min coupling Asp 9 | 99.4 |
| 360 min coupling Asp 9 | 99.6 |
| 562 min sample, 60 min into recoupling Asp9 coupling | 99.6 |
| 682 min sample, Asp9 coupling at end, sample during wash | 99.6 |
| 851 min sample, Asp9 coupling at end, sample during wash | 99.7 |
| 2 min into 4th 5-min deprotection of Asp9 (71 min) | 100 |
| 1 h into 4th deprotection of Asp9 (129 min) | 99.6 |
| End of Asp9 deprotection sampled during wash (221 min) | 99.6 |
| 75 min coupling Ser8 | 96.3 |
| 135 min coupling Ser8 | 97.9 |
| 195 min coupling Ser8 | 99.7 |
| 255 min coupling Ser8 | 99.5 |
| 360 min coupling Ser8 | 99.6 |
| 562 min sample (60 min into recoupling) Ser8 | 99.7 |
| 682 min sample (180 min into recoupling) Ser8 | 99.7 |
| 5 min into 2nd 30-min deprotection of Ser8 (60 min) | 99.9 |
| 5 min into 3rd 30-min deprotection of Ser8 (105 min) | 99.7 |
| 5 min into 4th 30-min deprotection of Ser8 (149 min) | 99.8 |
| 2 h into 4th deprotection of Ser8 (264 min) | 99.8 |
| 4 h into 4th deprotection of Ser8 (384 min) | 99.9 |
| End of deprotection of Ser8, sample during wash (620 min) | 99.9 |
| 75 min coupling Thr7 | 99.7 |
| 135 min coupling Thr7 | 99.5 |
| 195 min coupling Thr7 | 99.7 |
| 5 min into 2nd 30-min deprotection of Thr7 (65 min) | 98.7 |
| 5 min into 3rd 30-min deprotection of Thr7 (115 min) | 99.7 |
| 5 min into 4th 30-min deprotection of Thr7 (164 min) | 100 |
| 2 h into 4th deprotection of Thr7 (279 min) | 100 |
| Final deprotection of Thr7, during wash (453 min) | 100 |
| 75 min coupling Phe6 | 96.7 |
| 135 min coupling Phe6 | 97.6 |
| 195 min coupling Phe6 | 99.1 |
| 255 min coupling Phe6 | 99.5 |
| 360 min coupling Phe6 | 99.3 |
| 485 min coupling Phe6 | 99.5 |
| 605 min coupling Phe6 | 99.2 |
| 725 min coupling Phe6 | 99.5 |
| 845 min coupling Phe6 | 99.5 |
| 903 min coupling Phe6, sample during wash | 99.5 |
| 5 min into 3rd 30-min deprotection of Phe6 (81 min) | 98.7 |
| 25 min into 4th 30-min deprotection of Phe6 (136 min) | 99.6 |
| 2 h into 4th deprotection of Phe6 (230 min) | 99.6 |
| 4 h into 4th deprotection of Phe6 (350 min) | 99.5 |
| final deprotection of Phe6, during wash (441 min) | 99.5 |
| 75 min coupling Thr5 | 99.3 |
| 135 min coupling Thr5 | 98.5 |
| 195 min coupling Thr5 | 99.3 |

TABLE 3-continued

On-line LCMS samples and reaction % conversions

| Sample | % conversion |
|---|---|
| 255 min coupling Thr5 | 99.5 |
| 360 min coupling Thr5 | 99.5 |
| 486 min coupling Thr5 | 99.5 |
| 606 min coupling Thr5 | 99.6 |
| 726 min coupling Thr5 | 99.7 |
| 783 min coupling Thr5, during wash | 99.7 |
| 5 min into 3rd 30-min deprotection of Thr5 (81 min) | 99.9 |
| 25 min into 4th 30-min deprotection of Thr5 (136 min) | 99.2 |
| 2 h into 4th deprotection of Thr5 (230 min) | 99.5 |
| 4 h into 4th deprotection of Thr5 (350 min) | 99.8 |
| Final deprotection of Thr5, during wash (804 min) | 100 |
| 195 min coupling Gly4 | 99.2 |
| 255 min coupling Gly4 | 99.1 |
| 360 min coupling Gly4 | 99.3 |
| 486 min coupling Gly4 | 99.4 |
| 606 min coupling Gly4 | 99.5 |
| 726 min coupling Gly4 | 99.4 |
| 846 min coupling Gly4 | 99.4 |
| 966 min coupling Gly4 | 99.4 |
| 1238 min coupling Gly4 | 99.4 |
| 1358 min coupling Gly4 | 99.6 |
| 1478 min coupling Gly4 | 99.5 |
| 1598 min coupling Gly4 | 99.6 |
| 1749 min coupling Gly4 | 99.6 |
| 5 min into 3rd 30-min deprotection of Gly4 (81 min) | 99.7 |
| 25 min into 4th 30-min deprotection of Gly4 (136 min) | 100 |
| 2 h into 4th deprotection of Gly4 (230 min) | 100 |
| 4 h into 4th deprotection of Gly4 (350 min) | 100 |
| 6 h into 4th deprotection of Gly4 (466 min) | 100 |
| final deprotection of Gly4, during wash (588 min) | 100 |
| 75 min coupling Glu3 | 94.6 |
| 135 min coupling Glu3 | 98.6 |
| 195 min coupling Glu3 | 98.6 |
| 255 min coupling Glu3 | 99.1 |
| 360 min coupling Glu3 | 99 |
| 486 min coupling Glu3 | 99.3 |
| 606 min coupling Glu3 | 99 |
| 726 min coupling Glu3 | 99.2 |
| 846 min coupling Glu3 | 99.2 |
| 965 min coupling Glu3 | 99.4 |
| 1304 min coupling Glu3 | 99.4 |
| 5 min into 3rd 30-min deprotection of Glu3 (81 min) | 99.8 |
| 25 min into 4th 30-min deprotection of Glu3 (136 min) | 99.4 |
| 2 h into 4th deprotection of Glu3 (230 min) | 100 |
| 4 h into 4th deprotection of Glu3 (350 min) | 100 |
| 75 min coupling Aib2 | 95 |
| 135 min coupling Aib2 | 99.4 |
| 195 min coupling Aib2 | 99.6 |
| 255 min coupling Aib2 | 99.7 |
| 360 min coupling Aib2 | 99.7 |
| 5 min into 3rd 30-min deprotection of Aib2 (81 min) | 100 |
| 25 min into 4th 30-min deprotection of Aib2 (136 min) | 99.6 |
| 2 h into 4th deprotection of Aib2 (230 min) | 100 |
| 4 h into 4th deprotection of Aib2 (350 min) | 100 |
| 6 h into 4th deprotection of Aib2 (470 min) | 100 |
| Deprotection of Aib2, sample during wash (559 min) | 100 |
| 75 min coupling Boc-Tyr1 | 86.8 |
| 135 min coupling Boc-Tyr1 | 94.8 |
| 195 min coupling Boc-Tyr1 | 98 |
| 255 min coupling Boc-Tyr1 | 99.4 |
| 360 min coupling Boc-Tyr1 | 99.6 |
| 485 min coupling Boc-Tyr1 | 100 |

Several improvements are made to the on-line LCMS automated sampling system during the 39mer peptide synthesis, because of troubleshooting problems with solids clogging and carryover. From Pro37 to Ser33, sampling is accomplished with a peristaltic pump located between the reactor and the 3-way sampling valves. However, the pump grinds the resin, generating fine solids which causes slow filtration rates when emptying liquid from RB3. The resin sample pumping time is reduced and the pump is moved to after the 3-way valves, so that the resin does not actually enter the pump. During the Ala21 coupling and all subsequent couplings, the system is modified to install the capability to flush the 2 automated 3-way slurry sample valves with DMF solvent after each sample. To prevent the 3-way sample valves from getting clogged with solids that do not flush out back to the reactors at the end of each sequence, DMF is flushed through the sample valves, into the deprotection mix pot, and then out valve 518k to waste (FIG. 4).

At intervals during the synthesis, samples of the resin are removed for analysis as described above, and samples are also taken for further study off-line. The remaining amount of resin in each reactor, expressed in mmol based on mass balance, is listed in Table 4. Accordingly, the amounts of materials charged to the system for deprotection, post-deprotection DMF washing, amino acid coupling, and post-coupling DMF washing are adjusted for the amount of resin that remains at each step. It is to be noted that in a manufacturing run, large samples are not likely be taken for off-line analysis and the resin mmol basis would not change dramatically.

TABLE 4

Resin mmol basis in each reactor throughout the 39mer peptide synthesis after removing samples, calculated from mass balances.

| AA position | Resin remaining in RB1 from mass balances (mmol) | Resin remaining in RB2 from mass balances (mmol) | Resin remaining in RB3 from mass balances (mmol) |
|---|---|---|---|
| Ser39 | 117 | 117 | 117 |
| Pro38 | 117 | 117 | 116.7 |
| Pro37 | 117 | 117 | 115.8 |
| Pro36 | 117 | 117 | 115.3 |
| Ala35 | 117 | 117 | 114.4 |
| Gly34 | 117 | 117 | 114 |
| Ser33 | 117 | 117 | 113.4 |
| Ser32 | 108.6 | 108.6 | 108.3 |
| Pro31 | 108.6 | 108.6 | 106.9 |
| Gly30 | 108.6 | 108.6 | 106.3 |
| Gly29 | 107.1 | 107 | 104 |
| Ala28 | 107.1 | 107 | 103.4 |
| Ile27 | 105.4 | 105.3 | 101.1 |
| Leu26 | 105.2 | 105.3 | 100.5 |
| Trp25 | 105.2 | 105.3 | 99.85 |
| Gln24 | 105.2 | 105.3 | 99.25 |
| Val23 | 105.2 | 104.9 | 98.91 |
| Phe 22 | 105.2 | 104.9 | 98.26 |
| Ala21 | 100.1 | 98.48 | 97.45 |
| Lys-ivDde20 | 97.33 | 96.34 | 96.7 |
| Gln19 | 97.33 | 91.9 | 94.29 |
| Ala18 | 97.33 | 91.58 | 93.66 |
| Ile17 | 50.98 | 49.1 | 51.08 |
| Lys16 | 50.98 | 48.96 | 50.28 |
| Asp15 | 50.98 | 48.8 | 49.84 |
| Leu14 | 46.48 | 44.07 | 49.01 |
| Aib13 | 46.48 | 43.89 | 48.37 |
| Ile12 | 42.02 | 43.89 | 47.72 |
| Ser11 | 42.02 | 43.89 | 46.45 |
| Tyr10 | 42.02 | 43.89 | 45.96 |
| Asp9 | 42.02 | 40.09 | 45.31 |
| Ser8 | 38.44 | 40.09 | 44.83 |
| Thr7 | 38.44 | 40.09 | 44.3 |
| Phe6 | 38.44 | 40.01 | 43.7 |

TABLE 4-continued

Resin mmol basis in each reactor throughout the 39mer peptide synthesis after removing samples, calculated from mass balances.

| AA position | Resin remaining in RB1 from mass balances (mmol) | Resin remaining in RB2 from mass balances (mmol) | Resin remaining in RB3 from mass balances (mmol) |
|---|---|---|---|
| Thr5 | 38.44 | 36.23 | 43.12 |
| Gly4 | 38.44 | 36.23 | 39.78 |
| Glu3 | 35.72 | 36.23 | 38.94 |
| Aib2 | 35.62 | 36.23 | 34.56 |
| Boc-Tyr1 | 35.62 | 36.23 | 33.98 |

The masses of amino acid and coupling reagent solutions used in the amino acid coupling steps are shown in Table 5.

TABLE 5

Masses of amino acid solutions and coupling reagents used in amino acid coupling steps

| AA position | Mass AA to RB1 (0.375M solution), g | Mass oxyma to RB1 (0.68M solution, density 0.985), g | Mass DIC to BB1 (0.6M solution, density 0.946), g | Mass AA to RB2 (0.375M solution), g | Mass oxyma to RB2 (0.68M solution, density 0.985), g | Mass DIC to BB2 (0.6M solution, density 0.946), g | Mass AA to RB3 (0.375M solution), g | Mass oxyma to RB3 (0.68M solution, density 0.985), g | Mass DIC to RB3 (0.6M solution, density 0.946), g |
|---|---|---|---|---|---|---|---|---|---|
| Ser at 39 | 764 | 442 | 521 | 764 | 407 | 511 | 773 | 406 | 510 |
| Pro at 38 | 460 | 249 | 308 | 457 | 242 | 310 | 459 | 244 | 311 |
| Pro at 38 recoupling | 153 | 88 | 101 | 153 | 84 | 106 | 154 | 87 | 104 |
| Pro at 37 | 476 | 253 | 305 | 476 | 253 | 304 | 464 | 253 | 505 |
| Pro at 36 | 458 | 257 | 304 | 458 | 257 | 304 | 457 | 255 | 304 |
| Pro at 36 recoupling | 306 | 165 | 200 | 305 | 167 | 202 | 305 | 166 | 202 |
| Ala at 35 |  | 250 | 300 | 467 | 252 | 303 | 447 | 251 | 304 |
| Ala at 35 recoupling | 296 | 167 | 201 | 298 | 169 | 203 | 296 | 168 | 202 |
| Gly at 34 | 454 | 256 | 306 | 448 | 253 | 305 | 458 | 251 | 306 |
| Gly at 34 recoupling | 308 | 166 | 204 | 305 | 166 | 204 | 307 | 167 | 203 |
| Ser at 33 | 466 | 254 | 302 | 468 | 253 | 303 | 467 | 252 | 301 |
| Ser at 32 | 427 | 228 | 277 | 428 | 231 | 278 | 427 | 231 | 278 |
| Ser at 32 recoupling | 142 | 76 | 93 | 143 | 76 | 93 | 143 | 75 | 92 |
| Pro at 31 | 422 | 228 | 275 | 421 | 229 | 276 | 420 | 229 | 279 |
| Pro at 31 recoupling | 281 | 155 | 186 | 281 | 155 | 186 | 280 | 153 | 185 |
| Gly at 30 | 411 | 230 | 280 | 412 | 229 | 279 | 418 | 228 | 279 |
| Gly at 30 recoupling | 281 | 153 | 185 | 279 | 154 | 188 | 281 | 153 | 187 |
| Gly at 29 | 414 | 226 | 270 | 416 | 227 | 270 | 416 | 228 | 271 |
| Gly at 29 recoupling | 277 | 153 | 185 | 276 | 152 | 183 | 275 | 150 | 183 |
| Ala at 28 | 423 | 225 | 269 | 426 | 226 | 270 | 420 | 227 | 270 |
| Ala at 28 recouping | 283 | 150 | 181 | 286 | 150 | 183 | 280 | 151 | 183 |
| Ile at 27 |  | 222 | 268 | 391 | 224 | 268 | 399 | 221 |  |
| Ile at 27 recoupling | 270 | 147 | 183 | 270 | 151 | 181 | 270 | 151 | 182 |
| Leu at 26 | 403 | 221 | 268 | 403 | 224 | 268 | 403 | 222 | 267 |
| Leu at 26 recoupling | 273 | 148 | 180 | 272 | 149 | 180 | 273 | 149 | 180 |
| Trp at 25 | 420 | 224 | 266 | 422 | 222 | 267 | 421 | 223 | 269 |
| Gln at 24 | 411 | 228 | 265 | 418 | 230 | 268 | 419 | 229 | 268 |
| Gln at 24 recoupling | 415 | 227 | 264 | 418 | 228 | 266 | 417 | 227 | 266 |
| Val at 23 | 500 | 225 | 269 | 419 | 225 | 267 | 449 | 229 | 267 |
| Val at 23 recoupling | 399 | 226 | 268 | 408 | 226 | 269 | 394 | 227 | 267 |
| Phe at 22 | 466 | 222 | 264 | 340 | 226 | 266 | 364 | 227 | 267 |
| Phe at 22 recouping | 424 | 224 | 268 | 405 | 226 | 272 | 382 | 228 | 270 |
| Ala at 21 | 385 | 218 | 262 | 387 | 217 | 259 | 389 | 218 | 259 |
| Ala at 21 recoupling | 363 | 219 | 260 | 389 | 219 | 258 | 415 | 218 | 258 |

TABLE 5-continued

Masses of amino acid solutions and coupling reagents used in amino acid coupling steps

| AA position | Mass AA to RB1 (0.375M solution), g | Mass oxyma to RB1 (0.68M solution, density 0.985), g | Mass DIC to BB1 (0.6M solution, density 0.946), g | Mass AA to RB2 (0.375M solution), g | Mass oxyma to RB2 (0.68M solution, density 0.985), g | Mass DIC to BB2 (0.6M solution, density 0.946), g | Mass AA to RB3 (0.375M solution), g | Mass oxyma to RB3 (0.68M solution, density 0.985), g | Mass DIC to RB3 (0.6M solution, density 0.946), g |
|---|---|---|---|---|---|---|---|---|---|
| Lys-ivDde at 20 | 384 | 214 | 258 | 401 | 214 | 257 | 386 | 214 | 257 |
| Lys-ivDde at 20 recoupling | 374 | 216 | 255 | 389 | 215 | 255 | 392 | 216 | 255 |
| Gln at 19 | 373 | 205 | 240 | 376 | 204 | 242 | 378 | 205 | 243 |
| Gln at 19 recoupling | 375 | 208 | 240 | 377 | 204 | 241 | 377 | 204 | 242 |
| Ala at 18 | 367 | 204 | 241 | 373 | 208 | 243 | 399 | 204 | 243 |
| Ala at 18 recoupling | 352 | 205 | 242 | 370 | 202 | 242 | 379 | 206 | 243 |
| Ile at 17 | 179 | 102 | 124 | 184 | 103 | 118 | 183 | 104 | 125 |
| Ile at 17 recoupling | 183 | 106 | 122 | 184 | 101 | 122 | 185 | 104 | 124 |
| Ile at 17 second recoupling | 184 | 101 | 121 | 184 | 102 | 122 | 184 | 101 | 121 |
| Lys at 16 | 188 | 105 | 131 | 201 | 108 | 131 | 195 | 113 | 131 |
| Lys at 16 recoupling | 194 | 109 | 132 | 191 | 109 | 132 | 191 | 111 | 131 |
| Asp at 15 | 197 | 108 | 131 | 199 | 109 | 131 | 199 | 110 | 131 |
| Asp at 15 recoupling | 199 | 110 | 130 | 200 | 109 | 132 | 199 | 109 | 131 |
| Leu at 14 | 189 | 109 | 129 | 190 | 108 | 130 | 191 | 109 | 131 |
| Aib at 13 | 190 | 103 | 130 | 188 | 108 | 130 | 187 | 110 | 130 |
| Aib at 13 recouping | 187 | 109 | 127 | 182 | 107 | 123 | 183 | 109 | 127 |
| Ile at 12 | 184 | 111 | 128 | 183 | 111 | 128 | 183 | 111 | 126 |
| Ile at 12 recoupling | 193 | 110 | 126 | 193 | 110 | 124 | 194 | 112 | 127 |
| Ile at 12 second recoupling | 193 | 109 | 123 | 193 | 112 | 125 | 194 | 110 | 141 |
| Ser at 11 | 197 | 111 | 131 | 199 | 111 | 131 | 199 | 111 | 129 |
| Ser at 11 recoupling | 201 | 108 | 127 | 201 | 109 | 127 | 200 | 108 | 127 |
| Tyr 10 | 186 | 109 | 128 | 196 | 111 | 130 | 197 | 111 | 125 |
| Tyr 10 recoupling | 198 | 111 | 130 | 197 | 105 | 115 | 196 | 111 | 130 |
| Asp at 9 | 197 | 106 | 127 | 197 | 108 | 129 | 197 | 109 | 130 |
| Asp at 9 recouping | 197 | 107 | 127 | 197 | 110 | 127 | 198 | 108 | 128 |
| Ser at 8 | 198 | 109 | 126 | 199 | 109 | 128 | 199 | 106 | 132 |
| Ser at 8 recoupling | 198 | 108 | 127 | 199 | 109 | 129 | 199 | 108 | 131 |
| Thr at 7 | 187 | 105 | 125 | 192 | 106 | 126 | 192 | 106 | 127 |
| Phe at 6 | | | | | | | | | |
| Thr at 5 | 178 | 94 | 116 | 181 | 101 | 116 | 180 | 101 | 117 |
| Gly at 4 | 159 | 91 | 104 | 160 | 90 | 105 | 160 | 90 | 104 |
| Gly at 4 recoupling | 162 | 90 | 102 | 161 | 90 | 103 | 160 | 91 | 103 |
| Glu at 3 | 157 | 90 | 102 | 157 | 91 | 103 | 157 | 90 | 105 |
| Glu at 3 recoupling | 156 | 89 | 102 | 156 | 92 | 103 | 156 | 88 | 104 |
| Aib at 2 | 147 | 91 | 105 | 158 | 92 | 103 | 158 | 88 | 104 |
| Boc-Tyr at 1 | 148 | 88 | 103 | 159 | 91 | 103 | 159 | 90 | 107 |

The concentration of piperidine measured by GC in a selection of the DMF washes after piperidine deprotection is shown in Table 6.

TABLE 6

Piperidine concentration measured by GC in DMF wash samples after piperidine deprotection

| AA being deprotected | Wash number | Piperidiene concentration measured by GC (ppm) |
|---|---|---|
| Pro37 | 1 | 92934 |
| Pro37 | 2 | 48686 |
| Pro37 | 3 | 20466 |
| Pro37 | 4 | 9359 |
| Pro37 | 5 | 3430 |
| Pro37 | 6 | 1511 |
| Pro37 | 7 | 584 |
| Pro37 | 8 | 210 |
| Pro36 | 8 | 293 |
| Ser33 | 9 | 416 |
| Ser32 | 9 | 405 |
| Gly30 | 10 | 303 |
| Gly29 | 10 | 314 |
| Ala28 | 10 | 314 |
| Trp25 | 1 | 79261 |
| Trp25 | 2 | 47881 |
| Trp25 | 3 | 28632 |
| Trp25 | 4 | 30848 |
| Trp25 | 5 | 13531 |
| Trp25 | 6 | 873 |
| Trp25 | 7 | 5600 |
| Trp25 | 8 | 3051 |
| Trp25 | 9 | 1552 |
| Trp25 | 10 | 715 |
| Trp25 | 11 | 118 |
| Gln24 | 1 | No data |
| Gln24 | 2 | 78207 |
| Gln24 | 3 | 51279 |
| Gln24 | 4 | 40019 |
| Gln24 | 5 | 17834 |
| Gln24 | 6 | 10398 |
| Gln24 | 7 | 4117 |
| Gln24 | 8 | 2607 |
| Gln24 | 9 | 1104 |
| Gln24 | 10 | 530 |
| Gln24 | 11 | 251 |
| Val23 | 1 | 91976 |
| Val23 | 2 | 67926 |
| Val23 | 3 | 44561 |
| Val23 | 4 | 26703 |
| Val23 | 5 | 12570 |
| Val23 | 6 | 5879 |
| Val23 | 7 | 2901 |
| Val23 | 8 | 1359 |
| Val23 | 9 | 639.8 |
| Val23 | 10 | 248.8 |
| Val23 | 11 | 173.2 |
| Phe22 | 1 | 76446 |
| Phe22 | 2 | 74814.6 |
| Phe22 | 3 | 26287.3 |
| Phe22 | 4 | 24601.2 |
| Phe22 | 5 | 8974 |
| Phe22 | 6 | 4339.3 |
| Phe22 | 7 | 1890.2 |
| Phe22 | 8 | 1151.8 |
| Phe22 | 9 | 392.79 |
| Phe22 | 10 | 98.56 |
| Phe22 | 11 | 172 |
| Lys-ivDde20 | 1 | 42643 |
| Lys-ivDde20 | 2 | 44257.4 |
| Lys-ivDde20 | 3 | 25899.6 |
| Lys-ivDde20 | 4 | 21715.9 |
| Lys-ivDde20 | 5 | 8076.5 |
| Lys-ivDde20 | 6 | 3272.5 |
| Lys-ivDde20 | 7 | 1805.4 |
| Lys-ivDde20 | 8 | 1416.9 |
| Lys-ivDde20 | 9 | 345.7 |
| Lys-ivDde20 | 10 | 187.2 |
| Lys-ivDde20 | 11 | 48 |
| Ile17 | 11 | BQL* |
| Lys16 | 10 | BQL* |
| Leu14 | 1 | 70943 |
| Leu14 | 2 | 46640 |
| Leu14 | 3 | 29161 |
| Leu14 | 4 | 11809 |
| Leu14 | 5 | 6028 |
| Leu14 | 6 | 3130 |
| Leu14 | 7 | 1514 |
| Leu14 | 8 | 693 |
| Leu14 | 9 | 355 |
| Leu14 | 10 | 170 |
| Leu14 | 11 | 89 |
| Aib13 | 1 | 73216 |
| Aib13 | 2 | 46359 |
| Aib13 | 3 | 25310 |
| Aib13 | 4 | 9889 |
| Aib13 | 5 | 4531 |
| Aib13 | 6 | 2035 |
| Aib13 | 7 | 855 |
| Aib13 | 8 | 339 |
| Aib13 | 9 | 141 |
| Aib13 | 10 | 65 |
| Aib13 | 11 | 32 |
| Ile12 | 1 | 47929 |
| Ile12 | 1 | 47624 |
| Ile12 | 1 | 47547 |
| Ile12 | 1 | 47997 |
| Ile12 | 2 | 45752 |
| Ile12 | 3 | 27704 |
| Ile12 | 4 | 14982 |
| Ile12 | 5 | 7596 |
| Ile12 | 6 | 3726 |
| Ile12 | 7 | 1785 |
| Ile12 | 8 | 881 |
| Ile12 | 9 | 416 |
| Ile12 | 10 | 226 |
| Ile12 | 11 | 130 |
| Ile12 | 12 | 77 |
| Ser11 | 1 | 68399 |
| Ser11 | 2 | 56189 |
| Ser11 | 3 | 34710 |
| Ser11 | 4 | 17972 |
| Ser11 | 5 | 8946 |
| Ser11 | 6 | 4422 |
| Ser11 | 7 | 2116 |
| Ser11 | 8 | 1079 |
| Ser11 | 9 | 571 |
| Ser11 | 10 | 341 |
| Ser11 | 11 | 220 |
| Ser11 | 12 | 150 |
| Tyr10 | 1 | 82614 |
| Tyr10 | 2 | 70849 |
| Tyr10 | 3 | 52591 |
| Tyr10 | 4 | 33232 |
| Tyr10 | 5 | 20875 |
| Tyr10 | 6 | 12343 |
| Tyr10 | 7 | 7197 |
| Tyr10 | 8 | 4270 |
| Tyr10 | 9 | 2315 |
| Tyr10 | 10 | 1349 |
| Tyr10 | 11 | 822 |
| Tyr10 | 12 | 529 |
| Asp9 | 1 | 89611 |
| Asp9 | 2 | 66987 |
| Asp9 | 3 | 48125 |
| Asp9 | 4 | 31863 |
| Asp9 | 5 | 19910 |
| Asp9 | 6 | 12544 |
| Asp9 | 7 | 7585 |
| Asp9 | 8 | No data |

TABLE 6-continued

Piperidine concentration measured by GC in DMF wash samples after piperidine deprotection

| AA being deprotected | Wash number | Piperidiene concentration measured by GC (ppm) |
|---|---|---|
| Asp9 | 9 | No data |
| Asp9 | 10 | No data |
| Asp9 | 11 | 1079 |
| Asp9 | 12 | 628 |
| Ser8 | 1 | 71900 |
| Ser8 | 2 | 67376 |
| Ser8 | 3 | 43750 |
| Ser8 | 4 | 30884 |
| Ser8 | 5 | 19589 |
| Ser8 | 6 | 11802 |
| Ser8 | 7 | No data |
| Ser8 | 8 | No data |
| Ser8 | 9 | No data |
| Ser8 | 10 | No data |
| Ser8 | 11 | No data |
| Ser8 | 12 | No data |
| Thr7 | 12 | 417 |
| Phe6 | 0 | 144053 |
| Phe6 | 1 | 91619 |
| Phe6 | 2 | 70218 |
| Phe6 | 3 | 48031 |
| Phe6 | 4 | 29556 |
| Phe6 | 5 | 18298 |
| Phe6 | 6 | 10522 |
| Phe6 | 7 | 6101 |
| Phe6 | 8 | 3600 |
| Phe6 | 9 | 1908 |
| Phe6 | 10 | 1087 |
| Phe6 | 11 | 665 |
| Phe6 | 12 | 406 |
| Thr5 | 1 | 84672 |
| Thr5 | 2 | 64401 |
| Thr5 | 3 | 42721 |
| Thr5 | 4 | 26810 |
| Thr5 | 5 | 15413 |
| Thr5 | 8 | 237 |
| Thr5 | 8 | 245 |
| Thr5 | 8 | 241 |
| Thr5 | 6 | 9225 |
| Thr5 | 7 | 5301 |
| Thr5 | 8 | 3008 |
| Thr5 | 9 | 1628 |
| Thr5 | 10 | 898 |
| Thr5 | 11 | 534 |
| Thr5 | 12 | 302 |
| Gly4 | 1 | 74341 |
| Gly4 | 2 | 53045 |
| Gly4 | 3 | 39664 |
| Gly4 | 4 | 23499 |
| Gly4 | 5 | 12191 |
| Gly4 | 6 | 8351 |
| Gly4 | 7 | 4645 |
| Gly4 | 8 | 2426 |
| Gly4 | 9 | 1253 |
| Gly4 | 10 | 741 |
| Gly4 | 11 | 459 |
| Gly4 | 12 | 269 |
| Glu3 | 1 | 81614 |
| Glu3 | 2 | 62388 |
| Glu3 | 3 | 40864 |
| Glu3 | 4 | 24403 |
| Glu3 | 5 | 13902 |
| Glu3 | 6 | 7720 |
| Glu3 | 7 | 4301 |
| Glu3 | 8 | 2244 |
| Glu3 | 9 | 1124 |
| Glu3 | 10 | 602 |
| Glu3 | 11 | 347 |
| Glu3 | 12 | 187 |
| Aib2 | 1 | 74997 |
| Aib2 | 2 | 59347 |
| Aib2 | 3 | 42527 |
| Aib2 | 4 | 25732 |
| Aib2 | 5 | 14293 |
| Aib2 | 6 | 8446 |
| Aib2 | 7 | 4789 |
| Aib2 | 8 | 2650 |
| Aib2 | 9 | 1321 |
| Aib2 | 10 | 721 |
| Aib2 | 11 | 427 |
| Aib2 | 12 | 216 |

*BQL-below the limit of quantitation

The number and mass of piperidine solution washes and DMF washes used in deprotections throughout the synthesis of the 39-mer backbone intermediate (FIG. 7) are shown in Table 7. Also in Table 7 is a calculation of the mass of these solutions (g) used per mmol resin (determined by dividing mass by the mmol of resin present in each step as listed in Table 4).

TABLE 7

Number of washes and reagent/solvent mass used per mmol resin for all deprotections throughout the synthesis of the 39-mer backbone intermediate

| AA position | Number of 20 vol % piperidine solution washes for deprotection | Total mass of 20 vol % piperidine solution washes for deprotection (g) | Total mass of 20 vol % piperidine solution washes (g)/mmol resin | Number of DMF washes after deprotection | Total mass of DMF washes after deprotection (g) | Total mass of DMF washes after deprotection (g)/mmol resin |
|---|---|---|---|---|---|---|
| Ser39 | 3 | 4040 | 11.51 | 8 | 11950 | 34.05 |
| Pro38 | 3 | 4030 | 11.49 | 8 | 11580 | 33.02 |
| Pro37 | 4 | 5430 | 15.52 | 11 | 15720 | 44.94 |
| Pro36 | 8 | 11030 | 31.58 | 16 | 23590 | 67.54 |
| Ala35 | 4 | 5480 | 15.73 | 8 | 11730 | 33.67 |
| Gly34 | 6 | 8250 | 23.71 | 16 | 23540 | 67.64 |
| Ser33 | 6 | 8410 | 24.21 | 11 | 15830 | 45.57 |
| Ser32 | 6 | 8410 | 25.84 | 9 | 12400 | 38.1 |
| Pro31 | 6 | 7750 | 23.91 | 9 | 12380 | 38.2 |
| Gly30 | 8 | 10430 | 32.24 | 10 | 13830 | 42.75 |

TABLE 7-continued

Number of washes and reagent/solvent mass used per mmol resin for all deprotections throughout the synthesis of the 39-mer backbone intermediate

| AA position | Number of 20 vol % piperidine solution washes for deprotection | Total mass of 20 vol % piperidine solution washes for deprotection (g) | Total mass of 20 vol % piperidine solution washes (g)/mmol resin | Number of DMF washes after deprotection | Total mass of DMF washes after deprotection (g) | Total mass of DMF washes after deprotection (g)/mmol resin |
|---|---|---|---|---|---|---|
| Gly29 | 6 | 7620 | 23.95 | 10 | 13520 | 42.5 |
| Ala28 | 8 | 9720 | 30.61 | 10 | 13580 | 42.77 |
| Ile27 | 8 | 9560 | 30.66 | 11 | 13440 | 43.1 |
| Leu26 | 8 | 9720 | 31.25 | 11 | 13510 | 43.44 |
| Trp25 | 8 | 9690 | 31.22 | 11 | 13460 | 43.37 |
| Gln24 | 6 | 7220 | 23.31 | 11 | 13540 | 43.71 |
| Val23 | 5 | 6030 | 19.51 | 11 | 13440 | 43.49 |
| Phe22 | 5 | 6100 | 19.78 | 11 | 13410 | 43.49 |
| Ala21 | 5 | 6130 | 20.71 | 11 | 13650 | 46.11 |
| Lys-ivDde20 | 5 | 6100 | 21.01 | 11 | 13790 | 47.49 |
| Gln19 | 5 | 5460 | 19.26 | 11 | 12330 | 43.49 |
| Ala18 | 5 | 5390 | 19.07 | 11 | 13570 | 48.02 |
| Ile17 | 5 | 2640 | 17.46 | 11 | 7050 | 46.64 |
| Lys16 | 5 | 2400 | 15.98 | 11 | 6950 | 46.27 |
| Asp15 | 5 | 2420 | 16.17 | 11 | 7090 | 47.39 |
| Leu14 | 5 | 2510 | 17.99 | 11 | 7060 | 50.59 |
| Aib13 | 5 | 2490 | 17.95 | 11 | 10200 | 73.52 |
| Ile12 | 8 | 3830 | 28.66 | 12 | 11050 | 82.69 |
| Ser11 | 6 | 3020 | 22.82 | 12 | 11000 | 83.11 |
| Tyr10 | 6 | 3040 | 23.05 | 12 | 7390 | 56.04 |
| Asp9 | 6 | 3050 | 23.94 | 12 | 6920 | 54.31 |
| Ser8 | 6 | 3010 | 24.4 | 12 | 7450 | 60.39 |
| Thr7 | 6 | 3010 | 24.51 | 12 | 7690 | 62.61 |
| Phe6 | 6 | 3030 | 24.81 | 12 | 7550 | 61.81 |
| Thr5 | 6 | 2970 | 25.21 | 12 | 7530 | 63.93 |
| Gly4 | 6 | 3010 | 26.3 | 12 | 7540 | 65.88 |
| Glu3 | 6 | 2990 | 26.96 | 12 | 7840 | 70.7 |
| Aib2 | 6 | 3010 | 28.29 | 12 | 7600 | 71.42 |
| Boc-Tyr1 | 6 | 3000 | 28.35 | 12 | 7600 | 71.81 |

The mass of coupling reagents (g) used per mmol resin, the number of DMF washes after amino acid couplings, and the mass of DMF (g) used in those washes per mmol resin throughout the synthesis of the 39-mer backbone intermediate (FIG. 7) are shown in Table 8. As in Table 7, masses of materials (g) used per mmol resin in Table 8 is determined by dividing mass by the mmol of resin present in each step as listed in Table 4.

TABLE 8

Number of washes and reagent/solvent mass used per mmol resin for all amino acid couplings throughout the synthesis of the 39-mer backbone intermediate

| AA position | Total Mass of AA solution used in coupling (g)/mmol resin | Total mass of oxyma solutions used in coupling (g)/mmol resin | Total mass of DIC solutions used in coupling (g)/mmol resin | Number of DMF washes after AA coupling | Total mass of DMF washes after coupling (g)/mmol resin |
|---|---|---|---|---|---|
| Ser39 | 6.56 | 3.58 | 4.39 | 7 | 28.75 |
| Pro38 | 5.24 | 2.83 | 3.54 | 8 | 33.13 |
| Pro37 | 4.05 | 2.17 | 3.18 | 8 | 33.59 |
| Pro36 | 6.55 | 3.63 | 4.34 | 7 | 29.12 |
| Ala35 | 6.5 | 3.61 | 4.34 | 8 | 33.67 |
| Gly34 | 6.55 | 3.62 | 4.39 | 8 | 33.79 |
| Ser33 | 4.03 | 2.18 | 2.61 | 7 | 29.27 |
| Ser32 | 5.25 | 2.82 | 3.41 | 6 | 38.96 |
| Pro31 | 6.49 | 3.55 | 4.28 | 5 | 43.1 |
| Gly30 | 6.44 | 3.55 | 4.32 | 5 | 43.28 |
| Gly29 | 6.52 | 3.57 | 4.28 | 5 | 42.66 |
| Ala28 | 6.67 | 3.56 | 4.27 | 10 | 43.37 |
| Ile27 | 6.42 | 3.58 | 4.33 | 11 | 43.14 |
| Leu26 | 6.52 | 3.58 | 4.32 | 11 | 43.38 |
| Trp25 | 4.07 | 2.16 | 2.58 | 11 | 43.4 |
| Gln24 | 8.06 | 4.42 | 5.16 | 11 | 43.26 |
| Val23 | 8.31 | 4.39 | 5.2 | 11 | 43.75 |
| Phe22 | 7.72 | 4.39 | 5.21 | 11 | 44.1 |
| Ala21 | 7.86 | 4.42 | 5.26 | 11 | 46.48 |
| Lys-ivDde20 | 8.01 | 4.44 | 5.29 | 11 | 47.32 |
| Gln19 | 7.96 | 4.34 | 5.11 | 11 | 48.6 |

TABLE 8-continued

Number of washes and reagent/solvent mass used per mmol resin for all amino acid couplings throughout the synthesis of the 39-mer backbone intermediate

| AA position | Total Mass of AA solution used in coupling (g)/mmol resin | Total mass of oxyma solutions used in coupling (g)/mmol resin | Total mass of DIC solutions used in coupling (g)/mmol resin | Number of DMF washes after AA coupling | Total mass of DMF washes after coupling (g)/mmol resin |
|---|---|---|---|---|---|
| Ala18 | 7.93 | 4.35 | 5.15 | 11 | 66.85 |
| Ile17 | 10.92 | 6.11 | 7.27 | 11 | 44.32 |
| Lys16 | 7.72 | 4.36 | 5.25 | 11 | 47.2 |
| Asp15 | 7.97 | 4.38 | 5.25 | 11 | 47.45 |
| Leu14 | 4.08 | 2.34 | 2.79 | 11 | 50.73 |
| Aib13 | 8.05 | 4.66 | 5.53 | 11 | 64.08 |
| Ile12 | 12.8 | 7.45 | 8.59 | 12 | 85.01 |
| Ser11 | 9.04 | 4.97 | 5.83 | 12 | 84.32 |
| Tyr10 | 8.87 | 4.99 | 5.75 | 10 | 47.24 |
| Asp9 | 9.28 | 5.09 | 6.03 | 10 | 43.01 |
| Ser8 | 9.66 | 5.26 | 6.27 | 10 | 53.26 |
| Thr7 | 4.65 | 2.58 | 3.08 | 10 | 53.24 |
| Phe6 | 4.69 | 2.55 | 3.07 | 10 | 53.79 |
| Thr5 | 4.58 | 2.51 | 2.96 | 10 | 55.52 |
| Gly4 | 8.41 | 4.74 | 5.43 | 10 | 57.14 |
| Glu3 | 8.47 | 4.87 | 5.58 | 10 | 59.07 |
| Aib2 | 4.35 | 2.55 | 2.93 | 10 | 61.55 |
| Boc-Tyr1 | 4.4 | 2.54 | 2.96 | 10 | 61.42 |

Table 9 shows the sum total of the amount of materials charged to the reaction vessels, during the synthesis of the 39-amino acid backbone intermediate (FIG. 7). Table 9 includes the totals for the piperidine/DMF deprotections and DMF washes thereafter, the amino acid coupling steps and DMF washes thereafter, and the Sieber resin.

TABLE 9

Sum totals of material mass/mmol of resin

| Process steps | Total of mass of materials used per mmol of resin (g/mmol) |
|---|---|
| Piperidine/DMF solution used in deprotection steps | 898.93 |
| DMF used in washes after piperidine deprotections | 2045.57 |
| Amino acids, oxyma, and DIC solutions used in coupling steps | 601.87 |
| DMF used in washes after amino acid couplings | 1871.32 |
| Sieber resin | 1.43 |
| Sum Total mass of materials used/mmol of resin (g/mmol) | 5419.12 |

After the coupling of Boc-Tyr1, the resin bound peptide is removed from all 3 reactors, de-swelled by washing with methylene chloride, and dried. The remaining steps are done manually in batch vessels, not in the automated reactors-in-series. In a manufacturing run, the resin is not to be removed from the reactors at this point and the next steps would be performed in the reactors-in-series. This would reduce the amount of reagents and solvents needed.

To remove the -ivDde protecting group from Lys20, combine hydrazine hydrate (5.34 g, 68.3 mmol) and DMF (165 g) in a 2 L jacketed filter reactor under nitrogen and then add the dried resin (50.0 g, 7.24 mmol). Stir at 20° C. for 6 h, then wash the resin with DMF (5×500 mL; it is recommended that a wash volume of ~100 mL should be sufficient), with a 5 min stir for each wash.

For the fatty acid/linker coupling, prepare the activated ester by charging a 250 mL round-bottom flask with the acid of Formula I (3,6,12,15-tetraoxa-9,18-diazatricosanedioic acid, 22-{[20-(1,1-dimethylethoxy)-1,20-dioxoeicosyl] amino}-10,19-dioxo-, 2,3-(1,1-dimethylethyl) ester, (22S); 9.5 g, 11 mmol), benzotriazol-1-yl-oxytripyrrolidinophosphonium hexafluorophosphate (PYBOP; 5.7 g, 11 mmol), and DMF (50 g).

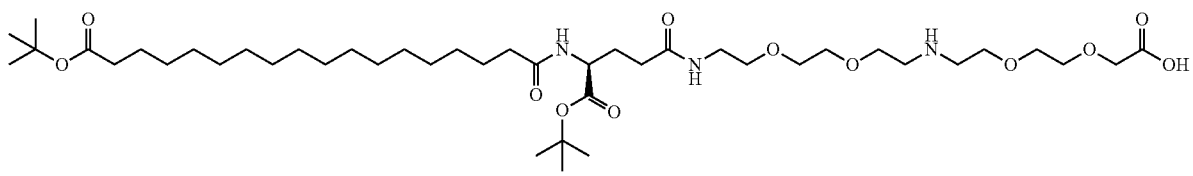

I

Stir the mixture for 20 min to dissolve and then add 2,4,6-trimethylpyridine (1.29 g, 10.6 mmol). Stir the activated ester mixture at 13.5 to 15.8° C. for 20 min and then add it to the resin in the filter reactor with the reactor jacket at 25° C., using an additional 5 mL of DMF to rinse and transfer out of the flask. Stir the slurry for 29 h, then drain and wash the resin with DMF (4×300 mL; ~100 mL wash volume should be sufficient) with a 5 min stir for each wash. Add another batch of activated ester prepared as before to the reaction mixture and stir at 25° C. for 19 h. Drain the resin and wash with DMF (4×300 mL; ~100 mL wash volume should be sufficient) and methylene chloride (4×300 mL; ~100 mL wash volume should be sufficient) with a 4 min stir for each wash. The lot of PYBOP used is determined to be of sub-optimal quality, so add another batch of activated ester (prepared on one-third the reagent scale as before in 50 g DMF, using a new bottle of PYBOP) to the reaction mixture and stir at 25° C. for 18 h. Drain the resin and wash with DMF (4×300 mL; ~100 mL wash volume should be sufficient) and isopropanol (4×300 mL; ~100 mL wash volume should be sufficient) with a 5 min stir for each wash. In a manufacturing run, the PYBOP is to be of high quality and only a single charge of activated ester is to be used for the coupling of the intermediate of Formula I. Dry the resin in-vacuo at 40° C. overnight.

Prepare the cleavage cocktail as follows: Combine dithiothreitol (DTT; 12.33 g, 79.93 mmol) and water (17.63 g) in a 5 L round-bottom flask. Charge a glass pressure bottle with TFA (538 g, 4720 mmol) and inert with 4 pressure purge cycles with 5-10 psig nitrogen. Add 60 g of the inerted TFA to the 5 L round-bottom flask in 20 g portions in 2 min intervals, then add the remaining TFA to the 5 L round-bottom flask over 2 min. Add triisopropylsilane (9.37 g, 59.2 mmol) and methylene chloride (51 g) to the 5 L round-bottom flask and cool the mixture to 15° C.

To cleave the peptide from the resin and deprotect, charge the dried resin to the filter reactor and rinse with methylene chloride. Add the cleavage cocktail to the resin in the filter reactor and stir for 4.5 h. Drain the reaction solution from the resin and add it to the 5 L round-bottom flask in which the cleavage cocktail was prepared. Add methylene chloride (206 g) to the resin, stir for 5 min, drain the solution, and add it to the 5 L round-bottom flask. Stir and cool the resulting mixture at −15° C. jacket setpoint. Over 1.5 h, add MTBE (754 g) which has been inerted by bubbling with nitrogen for 15 min followed by maintaining under a slow nitrogen purge. Warm the slurry to −8° C. and stir for 1 h, then warm to 0° C. and stir for 1 h. Filter the slurry under nitrogen without allowing to dry completely, then wash the solid with MTBE (2×155 g) and dry in-vacuo to give crude tirzepatide (38.7 g) with 40.9% potency as determined by HPLC. Over the course of the -ivDde deprotection, coupling with the acid of Formula I, and cleavage off of the resin, samples are taken from the mixture accounting for a total of 0.34 mmol of the starting resin. Accounting for this and the HPLC potency, the crude yield of tirzepatide in this process is 48%.

Batch Process Method

A batch manufacturing process for tirzepatide is described for comparison. Fmoc Sieber resin (17 kg, 0.76 mmol/g) is charged to a reactor. The resin is swelled with DMF, stirred for 2 hours, then DMF filtered off from the resin. The resin is then washed with DMF for a total of two times. The Fmoc-protected resin is then de-protected using 20% PIP/NMP treatments. Sampling to verify Fmoc removal is performed after the last PIP/NMP treatment to confirm >99% Fmoc removal via UV analysis. After the final 20% w/w PIP/NMP treatment, the resin bed is washed multiple times with DMF. The peptide backbone is then built out using the following general conditions for each amino acid coupling and deprotection:

| Process step | Solvent/Reagent | Volume | Equivalence |
|---|---|---|---|
| Fmoc de-protection | 20% (v/v) piperidine/NMP | 9 ml/g resin | |
| Post de-protection washes | DMF | 9 ml/g resin | |
| Coupling reaction solution | NMP Amino Acid Oxyma Pure DIC | 7.25 ml/g resin | 3.0 equiv 3.0 equiv 3.3 equiv |
| Post coupling washes | DMF | 9 ml/g resin | |
| ivDde removal | 8% hydrazine/DMF | 9 ml/g resin | |
| Post ivDde removal washes | DMF | 9 ml/g resin | |
| Post build de-swelling washes | IPA | 1.8 mL/g resin | |

Fmoc Deprotection:

Resin in the peptide reactor is treated with either three or four charges of the 20% v/v PIP/NMP solution. Each treatment is stirred on the resin for 30 min followed by filtration to complete Fmoc protecting group removal. After the final 20% v/v PIP/NMP treatment, the resin bed is washed a minimum of six times with DMF at the pre-specified DMF volume charge.

Amino Acid Activation:

A pre-prepared solution of 12% w/w Oxyma Pure/NMP is charged to a reactor. The selected Fmoc amino acid is then added. The mixture is stirred at 20±5° C. until the Fmoc amino acid has completely dissolved. The Fmoc-AA/Oxyma Pure/NMP solutions are then cooled to 15±3° C. prior to activation to ensure the minor exothermic activation reaction is controlled and the resulting solution temperature is maintained in the range specified of 20±5° C. The amino acid solution is then activated by DIC addition. The activated ester solution is then stirred for 20-30 min. prior to transfer of the solution to the reactor containing the peptide on resin intermediate.

Coupling:

Upon completion of the pre-activation step, the activated ester solution is transferred to the reactor containing deprotected peptide on resin to initiate the coupling reaction. The peptide coupling reaction is stirred at 20±5° C. for at least 4 hours. After the required stir time, the resin slurry is sampled for coupling completion (IPC). Sampling is repeated at specific intervals as needed until a passing IPC result is obtained. Re-coupling operations are performed, if necessary. When the coupling is complete, the peptide reactor solution contents are filtered then the peptide on resin intermediates are washed several times with DMF to prepare for the next coupling.

Ile (12) to Aib (13) Coupling:

The Fmoc-Ile (12) to Aib (13) coupling is performed using a symmetric anhydride approach utilizing six equivalents of the Fmoc-AA, three equivalents DIC. Activation time is extended to 40-60 min for this sequence to ensure formation of the activated symmetric anhydride species. An extended coupling stir time (18 h) is required to achieve reaction completion (<1% uncoupled) as determined by HPLC analysis.

Summary of Materials Used in the Synthesis of the 39-Amino Acid Backbone Intermediate (FIG. 7):

An average of 3.15 piperidine charges are used per cycle at 9 mL/g resin with a density of 0.93 g/mL, for an average of 26.4 g/g resin. An average of 7.2 DMF washes are performed after deprotection at 9 mL/g resin with a density of 0.945 g/mL, for an average of 61.2 g/g resin per cycle. For the amino acid couplings, an average of 7.25 mL/g resin of the coupling solution is used per cycle with a density of approximately 1 g/mL, for an average of 7.25 g/g resin per cycle. After the couplings, an average of 5 DMF washes are performed at 9 mL/g resin with a density of 0.945 g/mL, for an average of 42.5 g/g resin per cycle.

In total for each cycle, an average of 137 g of materials are used per gram of resin. With 39 cycles performed to produce the 39-amino acid backbone intermediate (FIG. 7), 5356 g of materials are used per gram of resin. Since the molar capacity of the Sieber resin is 0.7 mmol/g, the sum total mass of materials used per mmol of resin (including the mass of the resin itself) is approximately 7650 g/mmol.

Lys-ivDde (20) Deprotection, Coupling to Formula I, Cleavage Off of Resin, Crude Product Isolation:

The remaining steps to de-protect Lys-ivDde, couple the acid of Formula I, cleavage off of the resin, and isolation of crude tirzepatide are performed essentially as described for the reactors-in-series preparation. Overall, 45.39 kg crude tirzepatide is produced with 45 wt % and 64% HPLC area percent purity. Contained yield based on Sieber resin=47%.

Method Comparison

Similar crude yields are obtained by the batch and reactors-in-series production of tirzepatide (47% and 48%, respectively). For the reactors-in-series method, 5.42 kg total materials (solvents plus reagents plus resin) are used per mmol starting resin to produce the 39-mer backbone intermediate (FIG. 7). In the batch process method, 7.65 kg total materials are used per mmol starting resin.

Example: Making Fragment with DMF Recycle and Reduced Reagent Equivalents

A three reactors in series setup was improved upon and used to synthesize a peptide containing the first 10 amino acid residues of the tirzepatide backbone, which is GPSSGAPPPS-NH-Resin, however, each of the S amino acids are protected by a t-Butyl group.

The equipment setup was the same as that which is shown in FIG. 3, with the exception of small adjustments in which the peristaltic pumps (435) in FIG. 3 is replaced with a pressure transfer system. Rather than pumping out the solvent, this system pulls a vacuum on the transfer can, then opens the inlet valve from the desired reactor (RB1, RB2 or RB3). A pressure sensor is used to determine when the reactor is fully drained, as the pressure will increase quickly once it starts pulling nitrogen into the can rather than solvent. The transfer can is then pressurized and the valve is open to the desired reactor (RB2, RB3 or waste/recycle). This technique provides for quicker and more complete draining of the reactors, which results in less residual solvent in the reactors after we drain, which improves the resin washing. The other difference is adding an online GC (gas chromatograph) to measure the piperidine to ensure sufficient washing and the DMF recycle bottle.

In regard to similarities to the system of FIG. 3, three reactors were setup in series with the effluent from the first reactor routed to the second reactor, the second to the third, and the third to waste. However, only wash operations were conducted in series. This experiment also used improved conditions for the both the Fmoc deprotection and amino acid coupling reactions. The new reaction conditions eliminated a large majority of the excess reagents and rendered the concept of doing the deprotection and coupling reactions in series of minimal benefit. For the Fmoc deprotection, only one 20% piperidine in DMF charge was used. The volume of this charge was reduced to around four volumes (starting dry resin charge basis). At this point the piperidine waste is reduced by around 80% from the original process that used more than three independent nine volume charges to a single reactor. The potential piperidine saving of performing this operation in series was deemed to not be worth the potential problems that could arise from the buildup of the deprotection byproduct (piperidine-dibenzofulvene adduct) in the third reactor. As such, each reactor was operated independently for the Fmoc deprotection reaction.

To further minimize PMI, the system was modified to add a DMF recycle vessel. (PMI is Process Mass Intensity and is defined as the total mass of material used to make a specified amount of product, so 2000 g of material to make 1 g of product is a PMI of 2000.) The recycle vessel is used to collect the second half of washes after the Fmoc deprotection and is downstream of the third reactor, as all washing is done in series. For instance, the recycle vessel collected the last five of ten washes. The collected DMF has a piperidine concentration on the order of 1%. This being significantly lower than the piperidine concentration in the reactor after a deprotection reaction, the DMF collected is used for the first half of the subsequent wash cycle. This results in better utilization of the DMF, increasing the average piperidine concentration in the waste stream. An additional change to washing was added, due to the need to wash the online-LCMS equipment (described previously) to avoid sample carryover. The LCMS equipment washing results in about 80 mL of DMF in each of the three reactors. After this a quick sprayball wash of approximately 50 mL of fresh DMF is done to each reactor to ensure any resin on the walls is washed down into the resin bed. The online-LCMS and sprayball washes are integrated into the reactor in series wash program, where all DMF used is transferred through the reactors in series and accounted for in the final PMI calculation.

Previously in FIG. 3, peristaltic pumps were used to transfer material from one reactor to the next. At times peristaltic pumps have not completely drained the reactor of free solvent. This reduces wash efficiency and increases PMI. Accordingly, a change was made to use pressure transfers to better empty all liquid from a reactor. One transfer vessel was added, connected to all reactors, waste, and the DMF recycle vessel. To transfer from the reactor to the transfer vessel an automated sequence is used. Vacuum is pulled on the transfer vessel and the valve between the vessel bottom of transfer can is opened. The valve closes when the pressure in the transfer vessel reaches a predetermined setpoint. The transfer vessel is pressurized, the valve leading to the top of the target vessel is opened and transfer occurs until the pressure in the transfer vessel drops below a set value.

Online analysis of the wash solutions was added as well. An online GC was set up in the waste line to allow for monitoring of residual piperidine in the washes. The program was set up so that the last three washes out of the third reactor would be analyzed. Additionally, the online-LCMS was utilized to sample the washes for residual amino acid when washing after coupling. In order to prevent yield reductions, the resin was allowed to settle before triggering the wash sample. This prevented resin from being sampled, as the dip tube would be in the liquid layer above the resin.

Precise calculations of PMI were obtained for each cycle. For the sake of this particular experiment, all reaction monitoring samples were taken from the third reactor, as it was expected to have the slowest reactions due to the highest level of residual materials due to lower wash efficiency. Once reactions in reactor three are complete, it is assumed that all three reactors will be complete. This also helps with carryover issues in the online-LCMS as each sample would only be marginally impacted by carryover. For the assumption of 5% carryover, a coupling reaction that is 100% complete may only measure 95% complete due to 5% of the previous deprotection reaction sample. If each of the three reactors are sequentially sampled, this 5% error could be prevalent in each of the samples and after three hours, the reaction still does not appear to be complete. If only one reactor is sampled, assuming complete conversion, the first sample conversion would be 95%, but the second sample would measure 99.75% conversion and the reaction could be stopped after only two hours. Experimental history suggests that there is a quality detriment associated with reacting longer than necessary, especially in regard to the Fmoc deprotection reaction. The risk of only sampling one reactor is perceived as negligible relative to potential quality improvements that may result from stopping the reaction when it is complete, without excessive additional stir time.

For this experiment, the goal was to reduce the piperidine concentration to 2000 ppm utilizing 10 wash cycles. The results of post piperidine deprotection washes are shown in Table 10. A model was used to predict the wash charge quantity needed to result in about 2000 ppm piperidine after 10 washes and a sample cart cleaning cycle. The simulation utilized previous resin swelling and piperidine adsorption experimental data. Some samples were missed due to equipment malfunctions, but the 2000 ppm target was normally met, with the only exception being the final cycle.

TABLE 10

Piperidine Wash Results

| Synthesis Cycle # | AA Deprotecting | Wash # | Piperidine concentration (ppm) |
|---|---|---|---|
| 1 | Sieber Resin | 10 | 1804 |
| 1 | Sieber Resin | Sample cart cleaning | 950 |
| 2 | Ser 39 | 10 | 2100 |
| 2 | Ser 39 | Sample cart cleaning | 1003 |
| 3 | Pro 38 | 10 | 3605 |
| 3 | Pro 38 | Sample cart cleaning | 1723 |
| 4 | Pro 37 | 10 | 5215 |
| 4 | Pro 37 | Sample cart cleaning | 2013 |
| 5 | Pro 36 | 9 | 4164 |
| 5 | Pro 36 | 10 | 4132 |
| 5 | Pro 36 | Sample cart cleaning | 1715 |
| 6 | Ala 35 | 9 | 3393 |
| 6 | Ala 35 | 10 | 1605 |
| 7 | Gly 34 | 9 | 3473 |
| 7 | Gly 34 | 10 | 1452 |
| 8 | Ser 33 | 9 | 3871 |
| 9 | Ser 32 | 9 | 4069 |
| 9 | Ser 32 | Sample cart cleaning | 1927 |
| 10 | Pro 31 | 9 | 4982 |
| 10 | Pro 31 | 10 | 4232 |
| 10 | Pro 31 | Sample cart cleaning | 3048 |

After coupling reactions, the system was washed in series with three wash charges. After that the same sample cart cleaning procedure was used. A good quantification methodology for residual AA was not developed, so progressively more DMF was used per wash charge as the peptide grew and solvent holdup increased.

Reaction monitoring was done on the third reactor in series. The online LC-MS system was used as in the previous experiment. The deprotection results are given in Table 11. With an understanding that the methodology for quantification is biased toward under reporting and the fact that the sample analysis is an hour behind the actual reaction, a 98% conversion was desired before stopping the reaction and proceeding. All deprotections met the threshold for proceeding by the time the two hour sample was processed. The processing time is just over one hour.

TABLE 11

Deprotection reaction results

| Cycle | AA Deprotecting | ≈15 min | ≈65 min | ≈115 min |
|---|---|---|---|---|
| 1 | Sieber Resin | N/A | N/A | N/A |
| 2 | Ser 39 | 93.2% | 94.8% | 98.6% |
| 3 | Pro 38 | 100.0% | 97.5% | 99.0% |
| 4 | Pro 37 | 98.5% | 99.1% | 99.7% |
| 5 | Pro 36 | 97.9% | 98.9% | 99.5% |
| 6 | Ala 35 | 97.3% | 98.3% | 99.3% |
| 7 | Gly 34 | 98.5% | 98.8% | 99.8% |
| 8 | Ser 33 | 98.5% | 99.1% | N/A |
| 9 | Ser 32 | N/A | 99.1% | N/A |
| 10 | Pro 31 | 99.0% | 99.4% | N/A |

Similar monitoring was done for the coupling reactions. The results are given in Table 12. All couplings but Gly 30 were stopped no later than the time the result of two hour sample was known. The prevailing theory for the low conversion of the Gly 30 coupling was the high level of residual piperidine present after washing. A recoupling was done for the Gly 30 reaction and the recoupling quickly brought the coupling conversion to 99.2% and the reaction was stopped.

TABLE 12

Coupling reaction results

| Cycle | AA Coupling | ≈15 min | ≈65 min | ≈115 min |
|---|---|---|---|---|
| 1 | Ser 39 | N/A | N/A | N/A |
| 2 | Pro 38 | 93.8% | 100.0% | N/A |
| 3 | Pro 37 | 95.5% | 99.4% | N/A |
| 4 | Pro 36 | 83.9% | 98.5% | 97.9% |
| 5 | Ala 35 | 80.6% | 97.9% | 100.0% |
| 6 | Gly 34 | 73.2% | 95.1% | 100.0% |
| 7 | Ser 33 | N/A | N/A | 99.8% |
| 8 | Ser 32 | 63.5% | 90.1% | 100.0% |
| 9 | Pro 31 | N/A | 99.7% | N/A |
| 10 | Gly 30 | N/A | 68.8% | 78.4% |

The main focus of this experiment was to make quality material with the minimal amount of raw materials. The amount of materials used in the deprotection for each cycle is listed in Table 13. Material amount is given in g/mmol for each cycle. Since the mmol of peptide is reduced each cycle, neither summing the total material use over 10 cycles and dividing by the final mmol nor starting mmol would yield an accurate number.

TABLE 13

Material used for deprotection

| Cycle # | AA Deprotect | Volumes Pip/DMF RB1 | RB2 | RB3 | Piperidine Use g | mmol | DMF in 20% Pip Solution G | mmol |
|---|---|---|---|---|---|---|---|---|
| 1 | Resin | 4.3 | 4.1 | 4.0 | 142 | 0.9 | 627 | 4.2 |
| 2 | Ser 39 | 4.7 | 4.7 | 4.7 | 160 | 1.1 | 704 | 4.8 |
| 3 | Pro 38 | 4.8 | 4.7 | 4.7 | 159 | 1.1 | 702 | 4.8 |
| 4 | Pro 37 | 3.8 | 3.9 | 3.8 | 285 | 2.0 | 1254 | 8.7 |
| 5 | Pro 36 | 4.8 | 4.9 | 4.7 | 157 | 1.1 | 691 | 4.9 |
| 6 | Ala 35 | 4.8 | 4.8 | 4.7 | 151 | 1.1 | 667 | 4.8 |
| 7 | Gly 34 | 4.4 | 4.6 | 4.6 | 143 | 1.0 | 629 | 4.6 |
| 8 | Ser 33 | 4.7 | 4.7 | 4.6 | 145 | 1.1 | 637 | 4.7 |
| 9 | Ser 32 | 4.4 | 4.4 | 4.3 | 134 | 1.0 | 589 | 4.4 |
| 10 | Pro 31 | 4.1 | 4.3 | 4.2 | 128 | 1.0 | 563 | 4.2 |
| | Total | | | | 1603 | 11.3 | 7062 | 49.9 |
| | Average | | | | 160 | 1.1 | 706 | 5.0 |

DMF use for washing after deprotection is shown in Table 14. Table 15 lists the molar equivalents of coupling reagents used for each cycle for each of the three reactors. The total materials used for each coupling cycle are given in Table 16. Table 17 gives the DMF use for washing after coupling.

TABLE 14

Material used to wash after deprotection.

| Cycle # | AA Deprotect | Avg Vol Rec DMF wash RB1 | RB2 | RB3 | Avg Vol Fresh DMF wash RB1 | RB2 | RB3 | DMF Wash g | mmol | DMF Sample Cart clean g/ | g/ mmol |
|---|---|---|---|---|---|---|---|---|---|---|---|
| 1 | Resin | 4.2 | 4.3 | 4.3 | 2.9 | 2.9 | 2.9 | 927 | 6.2 | 376 | 2.5 |
| 2 | Ser 39 | 3.9 | 4.0 | 3.9 | 4.1 | 4.2 | 4.2 | 1279 | 8.7 | 416 | 2.8 |
| 3 | Pro 38 | 5.4 | 5.3 | 5.4 | 4.2 | 4.2 | 4.2 | 1286 | 8.8 | 374 | 2.6 |
| 4 | Pro 37 | 5.3 | 5.2 | 5.2 | 4.2 | 4.3 | 4.3 | 1273 | 8.9 | 374 | 2.6 |
| 5 | Pro 36 | 5.3 | 5.3 | 5.3 | 4.9 | 4.9 | 4.9 | 1474 | 10.4 | 372 | 2.6 |
| 6 | Ala 35 | 6.0 | 5.9 | 6.0 | 4.9 | 4.9 | 4.9 | 1448 | 10.4 | 369 | 2.6 |
| 7 | Gly 34 | 6.1 | 6.0 | 6.1 | 5.0 | 5.0 | 5.0 | 1447 | 10.5 | 368 | 2.7 |
| 8 | Ser 33 | 6.1 | 6.1 | 6.1 | 5.0 | 4.9 | 4.9 | 1443 | 10.6 | 338 | 2.5 |
| 9 | Ser 32 | 6.2 | 6.1 | 6.3 | 5.2 | 5.1 | 5.1 | 1457 | 10.8 | 383 | 2.8 |
| 10 | Pro 31 | 6.2 | 6.2 | 6.5 | 4.6 | 4.5 | 4.5 | 1266 | 9.5 | 263 | 2.0 |
| | Total | | | | | | | 13302 | 94.8 | 3633 | 25.7 |
| | Average | | | | | | | 1330 | 9.5 | 363 | 2.6 |

TABLE 15

Molar equivalents of coupling reagents used

| Cycle # | AA Coupling | EQ AA RB1 | RB2 | RB3 | EQ Oxyma RB1 | RB2 | RB3 | EQ DIC RB1 | RB2 | RB3 |
|---|---|---|---|---|---|---|---|---|---|---|
| 1 | Ser 39 | 1.36 | 1.41 | 2.52 | 1.39 | 1.44 | 2.57 | 1.53 | 1.59 | 2.83 |
| 2 | Pro 38 | 1.42 | 1.50 | 1.49 | 1.42 | 1.50 | 1.48 | 1.58 | 1.67 | 1.65 |
| 3 | Pro 37 | 1.43 | 1.49 | 1.55 | 1.43 | 1.49 | 1.55 | 1.59 | 1.66 | 1.72 |
| 4 | Pro 36 | 1.43 | 1.50 | 1.55 | 1.43 | 1.50 | 1.55 | 1.59 | 1.67 | 1.72 |
| 5 | Ala 35 | 1.43 | 1.51 | 1.55 | 1.42 | 1.50 | 1.55 | 1.58 | 1.67 | 1.72 |
| 6 | Gly 34 | 1.43 | 1.51 | 1.56 | 1.42 | 1.50 | 1.56 | 1.58 | 1.67 | 1.73 |
| 7 | Ser 33 | 1.43 | 1.51 | 1.57 | 1.42 | 1.50 | 1.56 | 1.57 | 1.66 | 1.73 |
| 8 | Ser 32 | 1.43 | 1.50 | 1.56 | 1.43 | 1.50 | 1.56 | 1.58 | 1.66 | 1.73 |
| 9 | Pro 31 | 1.49 | 1.49 | 1.47 | 1.50 | 1.50 | 1.48 | 1.66 | 1.66 | 1.63 |
| 10 | Gly 30 | 2.25 | 1.96 | 2.14 | 2.23 | 1.94 | 2.12 | 2.48 | 2.16 | 2.36 |

TABLE 16

Total coupling reagents used

| Cycle # | AA Coupling | AA g | mmol | Oxyma g | mmol | DIC g | mmol | DMF for Coupling solution g | mmol |
|---|---|---|---|---|---|---|---|---|---|
| 1 | Ser 39 | 101 | 0.68 | 38 | 0.26 | 37 | 0.25 | 932 | 6.3 |
| 2 | Pro 38 | 77 | 0.53 | 31 | 0.21 | 30 | 0.21 | 771 | 5.3 |
| 3 | Pro 37 | 76 | 0.53 | 31 | 0.21 | 30 | 0.21 | 762 | 5.3 |
| 4 | Pro 36 | 75 | 0.53 | 30 | 0.21 | 30 | 0.21 | 751 | 5.3 |
| 5 | Ala 35 | 69 | 0.49 | 30 | 0.21 | 29 | 0.21 | 748 | 5.3 |
| 6 | Gly 34 | 61 | 0.44 | 29 | 0.21 | 29 | 0.21 | 740 | 5.3 |
| 7 | Ser 33 | 78 | 0.57 | 29 | 0.21 | 28 | 0.21 | 716 | 5.2 |
| 8 | Ser 32 | 77 | 0.57 | 29 | 0.21 | 28 | 0.21 | 707 | 5.2 |
| 9 | Pro 31 | 70 | 0.53 | 28 | 0.21 | 28 | 0.21 | 704 | 5.3 |
| 10 | Gly 30 | 83 | 0.62 | 39 | 0.30 | 39 | 0.29 | 1001 | 7.6 |
| | Total | 768 | 5.5 | 313 | 2.2 | 308 | 2.2 | 7833 | 55.9 |
| | Average | 77 | 0.55 | 31 | 0.22 | 31 | 0.22 | 783 | 5.59 |

TABLE 17

DMF use for washing after coupling

| Cycle # | AA Coupling | Avg Vol DMF wash RB1 | RB2 | RB3 | DMF Wash use g | g/mmol | DMF Sample Cart clean g | g/mmol |
|---|---|---|---|---|---|---|---|---|
| 1 | Ser 39 | 5.2 | 6.3 | 7.0 | 1276 | 9.10 | 373 | 2.52 |
| 2 | Pro 38 | 3.5 | 4.3 | 4.7 | 892 | 6.44 | 366 | 2.49 |
| 3 | Pro 37 | 3.4 | 4.4 | 5.0 | 924 | 6.75 | 389 | 2.69 |

TABLE 17-continued

DMF use for washing after coupling

| Cycle # | AA Coupling | Avg Vol DMF wash | | | DMF Wash use | | DMF Sample Cart clean | |
|---|---|---|---|---|---|---|---|---|
| | | RB1 | RB2 | RB3 | g | g/mmol | g | g/mmol |
| 4 | Pro 36 | 4.3 | 5.4 | 6.3 | 1068 | 7.92 | 361 | 2.53 |
| 5 | Ala 35 | 4.4 | 5.4 | 5.9 | 1041 | 7.81 | 368 | 2.61 |
| 6 | Gly 34 | 5.0 | 5.9 | 6.5 | 1148 | 8.77 | 373 | 2.69 |
| 7 | Ser 33 | 5.0 | 6.0 | 6.6 | 1155 | 8.93 | 354 | 2.60 |
| 8 | Ser 32 | 5.0 | 6.0 | 6.6 | 1134 | 8.87 | 361 | 2.67 |
| 9 | Pro 31 | 4.5 | 6.5 | 6.9 | 1327 | 10.50 | 357 | 2.68 |
| 10 | Gly 30 | 4.6 | 6.4 | 7.2 | 1058 | 8.48 | 370 | 2.81 |
| | Total | | | | 11024 | 83.6 | 3671 | 26.3 |
| | Average | 4.49 | 5.65 | 6.27 | 1102 | 8.36 | 367 | 2.63 |

Taking the data from each step, a summary was generated where raw material use, by compound and in totality, is compared against the current batch manufacturing process. Table 18 shows that coupling reagent use was reduced by 37%, whereas piperidine use was reduced by 84%. The DMF used for washing is the vast majority of the material use in the process, accounting for well over 90% of the total mass consumption and reducing DMF consumption was the primary goal of this experiment. DMF use was reduced by 79% compared to the first ten cycles of the tirzepatide batch manufacturing process. In total, the experimental demonstration of the new process technology used 357 g/mmol of peptide. By comparison, the current batch manufacturing process uses 1690 g/mmol. This represents a total reduction of 79%.

TABLE 18

Total material used in the 10 mer SPPS in series and batch

| Cycle # | DMF g/mmol | | Piperidine g/mmol | | AA g/mmol | | Oxyma g/mmol | | DIC g/mmol | | Total g/mmol | |
|---|---|---|---|---|---|---|---|---|---|---|---|---|
| | Series | Batch | Series | Batch | Series | Batch | Series | Batch | Series | Batch | Series | Batch |
| 1 | 30.8 | 150. | 1.0 | 6.2 | 0.68 | 0.96 | 0.26 | 0.36 | 0.25 | 0.35 | 32.9 | 157 |
| 2 | 30.4 | 150. | 1.1 | 6.2 | 0.53 | 0.89 | 0.21 | 0.36 | 0.21 | 0.35 | 32.5 | 157 |
| 3 | 30.9 | 159 | 1.1 | 8.3 | 0.53 | 0.89 | 0.21 | 0.36 | 0.21 | 0.35 | 32.9 | 168 |
| 4 | 35.9 | 159 | 2.0 | 8.3 | 0.53 | 0.89 | 0.21 | 0.36 | 0.21 | 0.35 | 38.8 | 168 |
| 5 | 33.6 | 159 | 1.1 | 8.3 | 0.49 | 0.82 | 0.21 | 0.36 | 0.21 | 0.35 | 35.6 | 168 |
| 6 | 34.6 | 150. | 1.1 | 6.2 | 0.44 | 0.74 | 0.21 | 0.36 | 0.21 | 0.35 | 36.5 | 157 |
| 7 | 34.5 | 150. | 1.0 | 6.2 | 0.57 | 0.96 | 0.21 | 0.36 | 0.21 | 0.35 | 36.5 | 156 |
| 8 | 34.5 | 161 | 1.1 | 6.2 | 0.57 | 0.96 | 0.21 | 0.36 | 0.21 | 0.35 | 36.6 | 168 |
| 9 | 36.5 | 184 | 1.0 | 6.2 | 0.53 | 0.89 | 0.21 | 0.36 | 0.21 | 0.35 | 38.4 | 191 |
| 10 | 34.6 | 193 | 1.0 | 8.3 | 0.62 | 0.74 | 0.30 | 0.36 | 0.29 | 0.35 | 36.7 | 202 |
| Total | 336.2 | 1614 | 11.3 | 70.2 | 5.47 | 8.74 | 2.24 | 3.55 | 2.20 | 3.47 | 357.4 | 1691 |
| Avg | 33.6 | 161 | 1.1 | 7.0 | 0.55 | 0.87 | 0.22 | 0.36 | 0.22 | 0.35 | 35.7 | 169 |
| % Reduce | 79% | | 84% | | 37% | | 37% | | 37% | | 79% | |

Having established nearly 80% reduction in material consumption, the final part of the experiment was to demonstrate that the resulting material was of high quality. The material from all three reactors underwent a soft cleavage of the peptide from the resin, while keeping all protecting groups on the AA R groups. HPLC analysis, shown in Table 19, showed high quality across all three reactors. In a bit of surprise there was absolutely no correlation between quality and reactor. The hypothesis was that there would be a minor purity decrease across the three reactors as the third reactor in series is not washed as much as the first. This finding proves the wash strategy utilized to be beyond adequate. In theory the wash targets for residual piperidine and AA could be increased, which would allow for reducing material consumption even further.

TABLE 19

HPLC purity data for each reactor

| Impurity | desSer32 | des2xPro36 | desPro36 | desAlaPro36 | 10 mer | 4xPro36 | desAla35 | 2xPro31 | 2xGly34 | 3xSer32 |
|---|---|---|---|---|---|---|---|---|---|---|
| Retention | 4.48 | 6.32 | 6.85 | 6.97 | 7.12 | 7.30 | 7.40 | 7.53 | 7.77 | 9.59 |
| Reactor 1 | 1.38% | 1.26% | 0.24% | 0.52% | 94.02% | 0.81% | 0.24% | 0.37% | 0.46% | ND |
| Reactor 2 | 0.98% | 1.16% | 0.32% | 0.67% | 94.54% | 0.67% | 0.08% | 0.39% | 0.17% | 0.14% |
| Reactor 3 | 1.48% | 1.27% | 0.15% | 0.56% | 94.30% | 0.74% | 0.13% | 0.43% | 0.13% | 0.14% |

Example: Construction of Tirzepatide Tetramer by SPPS in DMF solvent

The following Tirzepatide tetramer contains 4 amino acids:

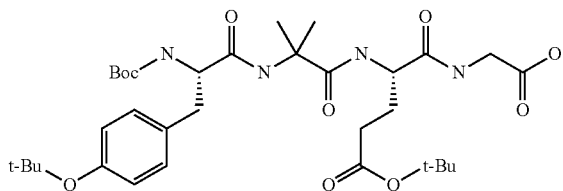 [SMILES: CC(C)(C)OC(=O)CC[C@H](NC(=O)C(C)(C)NC(=O)[C@H](Cc1ccc(OC(C)(C)C)cc1)NC(=O)OC(C)(C)C)C(=O)NCC(=O)O]

This tetramer is synthesized using linear solid phase peptide synthesis (SPPS) achieved via loading method and reactors-in-series method described in the following text. Table 20 lists the sequence of the 4 amino acids used for the synthesis of the tirzepatide tetramer backbone. It is noted that the first amino acid glycine of tetramer intermediate is initially loaded on the 2-Chlorotrityl chloride (CTC) resin solid support as shown below using loading method. (The CTC resin solid is shown as the circle below).

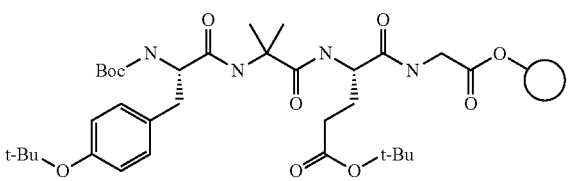 [SMILES: COC(=O)CNC(=O)[C@H](CCC(=O)OC(C)(C)C)NC(=O)C(C)(C)NC(=O)[C@H](Cc1ccc(OC(C)(C)C)cc1)NC(=O)OC(C)(C)C]

TABLE 20

Order of the 4 amino acids used in the synthesis of Tirzepatide tetramer via SPPS

| Amino acid (AA) order of addition | AA position on peptide | AA name | AA used in coupling step |
|---|---|---|---|
| 1 | 4 | Glycine | Fmoc-Gly-OH |
| 2 | 3 | Glutamic acid | Fmoc-Glu(tBu)-OH |
| 3 | 2 | 2-Aminoisobutyric acid | Fmoc-Aib-OH |
| 4 | 1 | Tyrosine | Boc-Tyr(tBu)-OH |

The remaining 3 amino acids are constructed using reactors-in-series method. The α-nitrogen of glycine, glutamic acid and 2-aminoisobutyric acid are protected by a 9-fluorenyl-methyloxycarbonyl (Fmoc) group and tyrosine α-nitrogen is protected by a t-butyloxycarbonyl (Boc). Oxygen of glutamic acid and tyrosine are protected via tert-butyl (tBu).

Loading Method

Prepare a Fmoc-Gly-OH coupling solution: To a 5000 mL specimen bottle, dissolve Fmoc-Gly-OH (142.7 g, 480.0 mmol) with DMF up to a volume of 1.8 L solution. Then, add N-ethyl-N-isopropyl-propan-2-amine (309 g, 2390.9 mmol) and stir the contents for 5 mins.

Resin Coupling

To a 10 L glass large scale peptide synthesizer, add CTC resin (380 g, 610 mmol, 1.6 mmol/g). Add DMF (2400 mL) and stir 15 min. Drain and discard the remaining solution. Wash the resin with DMF (2400 ML) for 15 mins stir twice. Add an additional N-ethyl-N-isopropyl-propan-2-amine (62 g, 479.73 mmol) and stir at ambient temperature for a total of 18 hrs. Upon completion of the 18 hrs. drain the solution and wash the resin with DMF (1800 mL) for five times with 5 mins. mixing.

Resin Capping

Add DMF (900 mL), N-ethyl-N-isopropyl-propan-2-amine (145.8 g, 1128 mmol) and methanol (191 g, 5960.9 mmol) to a bottle and stir at room temperature for 2 minutes. Add solution to the resin and stir for 60 min and drain the solution afterwards. Wash the resin with DMF (1800 mL) for 5 times with 5 mins stir each. Furthermore, wash the resin with DCM (1800 mL) 5 times for 5 minutes stir each. Transfer the resin to a drying disk and dry under vacuum at 35° C. to a constant weight.

The dry resin is weighed at 473.37 g with Fmoc-Gly-OH loading of 0.85 mmol/g measured via NMR.

Reactor-In-Series Method

Raw Material Preparation

Prepare a 20 vol % solution of piperidine in DMF as follows: dilute piperidine (2.0 L) up to a volume of 10.0 L by the addition of DMF to obtain a 20% solution by volume.

Prepare a 1.25 mol/kg solution of oxyma in DMF as follows: dissolve ethyl (hydroxyimino) cyanoacetate (oxyma, 195.69 g) in DMF (905.91 g) up to obtain a 1.25 mol/kg solution, then bubble nitrogen through the solution at 2 SCFH.

Prepare a 1.25 mol/kg solution of DIC in DMF as follows: dissolve N,N'-5 diisopropylcarbodiimide (191.16 g) in DMF (1020.60 g) up to obtain a 1.25 mol/kg solution, then bubble nitrogen through the solution at 2 SCFH.

Prepare a 0.40 mol/kg solution of glutamic acid in DMF as follows: dissolve Fmoc-Glu(tBu)-OH (162.85 g) in DMF (755.15 g), shake to dissolve, and then bubble nitrogen through the solution at 2 SCFH.

Prepare a 0.40 mol/kg solution of Fmoc-Aib-OH in DMF as follows: dissolve Fmoc-Aib-OH (119.50 g) in DMF (798.51 g), shake to dissolve, and then bubble nitrogen through the solution at 2 SCFH.

Prepare a 0.40 mol/kg solution of Boc-Tyr (tBu)-OH in DMF as follows: dissolve Boc-Tyr (tBu)-OH (123.89 g) in DMF (794.11 g), shake to dissolve, and then bubble nitrogen through the solution at 2 SCFH.

Prepare the reaction system as follows: add CTC resin (108 g, 0.85 mmol/g, 91.8 mmol), divided equally between the reactors "RB1", "RB2", and "RB3". Add 350 mL DMF to each reactor and stir at room temperature for 2 h to swell the resin.

General Procedure A—Fmoc deprotection and DMF washing process: Fmoc deprotection is proceeded in parallel for all three reactors, RB1, RB2 and RB3. More specifically, to RB1 add a solution of piperidine (20 vol % in DMF, 202.4 g) and rinse the piperidine transfer line with 5 ml of DMF and start stirring. In a similar manner, add 205.4 g and 205.2 g 20 vol % piperidine solution into RB2 and RB3 and rinse the piperidine line, respectively. Then, three reactors are stirred for 120 mins at 20° C. for deprotection in parallel simultaneously. Piperidine solution charge for the entire TZP tetramer build is summarized in Table 21. Deprotection reaction is monitored using online LC-MS supported by sampling cart. Deprotection conversion cannot be quantitatively determined since mass spectrum of deprotected tetramer intermediate cannot be tabulated due to its low molecular weight. However, deprotection completion is qualitatively verified to make sure extracted ions peaks of Fmoc protected tetramer is zero.

After deprotection, drain the solutions from all three reactors to waste tank using pressure transfer system. It is noted that DMF wash after deprotection is conducted using reactor-in-series measure, i.e. DMF wash solvent is firstly charged into RB1 then transferred to RB2 and to RB3. To remove residual piperidine in the resin, 10 DMF wash cycles are applied with the following detailed procedure. For the first 5 DMF washes, recycled DMF is added to RB1 from DMF recycle vessel with equally divided solvent mass and stir (i.e. DMF mass in recycle vessel is equally divided by 5 wash cycles and charged into RB1). After DMF recycle vessel is emptied and first five DMF recycle wash is complete, fresh DMF is from DMF solvent vessel is charged for the remaining 5 wash cycles. The used DMF from the first 5 wash cycles is discard into waste tank, while the used DMF solvent from the remaining 5 wash cycles is instead collected into DMF recycle tank that will be reused in the next amino acid construction. 5 mins stir time is applied throughout the wash cycle. After 10 wash cycles are completed, an additional sample cart cleaning cycle is applied where 100 ml of fresh DMF is charged into three reactors respectively. Then DMF from RB1 and RB2 is transferred to RB3, which is finally collected in DMF solvent recycle vessel. Material use for DMF wash after deprotection is summarized in Table 22. Piperidine concentration of DMF solution discharged from the final three wash cycles is measured using online GC, which is summarized in Table 23. The final residual piperidine concentration is controlled under 500 ppm throughout the synthesis.

TABLE 21

Material used for deprotection

| Cycle # | AA Deprotect | Volumes Pip/DMF RB1 | RB2 | RB3 | Piperidine Use g | mmol | DMF in 20% Pip Solution g | mmol |
|---|---|---|---|---|---|---|---|---|
| 1 | Gly 4 | 6.2 | 6.2 | 6.2 | 114.4 | 1.2 | 500.4 | 5.5 |
| 2 | Glu 3 | 5.0 | 5.2 | 5.2 | 109.2 | 1.2 | 477.2 | 5.3 |
| 3 | Aib 2 | 5.4 | 5.4 | 5.3 | 119.8 | 1.4 | 524.0 | 6.0 |
| | Total | 16.5 | 16.7 | 16.7 | 343.4 | 3.8 | 1501.6 | 16.7 |
| | Average | 5.5 | 5.6 | 5.6 | 114.5 | 1.3 | 500.5 | 5.6 |

TABLE 22

Material use for wash after deprotection

| Cycle # | AA Deprotect | Avg Vol Rec DMF wash RB1 | RB2 | RB3 | Avg Vol Fresh DMF wash RB1 | RB2 | RB3 | DMF Wash g | mmol | DMF Sample Cart clean g | mmol |
|---|---|---|---|---|---|---|---|---|---|---|---|
| 1 | Gly 4 | 9.7 | 9.7 | 9.7 | 8.3 | 8.3 | 8.3 | 1133.1 | 12.4 | 314.3 | 3.4 |
| 2 | Glu 3 | 8.2 | 8.2 | 8.3 | 6.0 | 6.0 | 6.1 | 984.2 | 11.0 | 346.8 | 3.9 |
| 3 | Aib 2 | 6.6 | 6.6 | 6.7 | 6.4 | 6.4 | 6.5 | 1115.9 | 12.8 | 351.2 | 4.0 |
| | Total | 24.5 | 24.5 | 24.7 | 20.7 | 20.7 | 20.9 | 3233.2 | 36.2 | 1012.3 | 11.3 |
| | Average | 8.2 | 8.2 | 8.2 | 6.9 | 6.9 | 7.0 | 1077.7 | 12.1 | 337.4 | 3.8 |

TABLE 23

Residual piperidine concentration for wash after deprotection

| Synthesis cycle | AA deprotection | Wash # | PPM |
|---|---|---|---|
| 1 | Gly 4 | 9th | no data |
| 1 | Gly 4 | 10th | no data |
| 1 | Gly 4 | Sample cleaning wash | 369.1 |
| 2 | Glu 3 | 9th | 535.7 |
| 2 | Glu 3 | 10th | 506.1 |
| 2 | Glu 3 | Sample cleaning wash | 337.8 |
| 3 | Aib 2 | 9th | 555.8 |
| 3 | Aib 2 | 10th | 474.2 |
| 3 | Aib 2 | Sample cleaning wash | 409.7 |

General Procedure B—amino acid activation and coupling process: To a jacketed reactor RA, add glutamic acid solution (0.4 mol/kg, 401.2 g), oxyma solution (1.25 mol/kg, 128.5 g), DIC solution (1.25 mol/kg, 141.2 g). Stir the solution at 20° C. for 30 min to form an activated glutamic acid solution and add to RB1 (225.4 g), RB2 (225.4 g) and RB3 (227.4 g). Stir the reactors RB1, RB2 and RB3 for 8 hrs at 20° C. except for tyrosine coupling where 18 hrs. coupling time is applied. After coupling time reach, drain the solution from all three reactors to waste tank using pressure transfer. At the end of reaction, coupling completion is confirmed via Kaiser test. The material use for coupling is summarized in Table 24 which details the equivalent ratio usage throughout the build.

Wash reactors RA, RB1, RB2 and RB3 for three cycles using fresh DMF after coupling in a similar reactor-in-series manner in general procedure A. More specifically, add fresh DMF solvent into RA through spray valve and then to RB1, RB2 and RB3 in series. It is noted that sample cart cleaning procedure is conducted in a similar manner as general procedure A. Afterwards, all the used DMF from three DMF wash cycles and additional sample cart cleaning cycle are discarded into waste tank. The material uses for DMF wash after coupling is summarized in Table 25.

TABLE 24

Materials use for coupling

| Cycle # | AA Coupling | EQ AA RB1 | RB2 | RB3 | EQ Oxyma RB1 | RB2 | RB3 | EQ DIC RB1 | RB2 | RB3 |
|---|---|---|---|---|---|---|---|---|---|---|
| 1 | Gly 4 | 1.77 | 1.77 | 1.79 | 1.77 | 1.77 | 1.79 | 1.96 | 1.95 | 1.96 |
| 2 | Glu 3 | 1.80 | 1.80 | 1.86 | 1.81 | 1.81 | 1.86 | 2.02 | 1.98 | 2.05 |
| 3 | Aib 2 | 1.84 | 1.84 | 1.91 | 1.84 | 1.84 | 1.84 | 1.91 | 2.02 | 2.10 |
| | Total | 5.4 | 5.4 | 5.6 | 5.4 | 5.4 | 5.5 | 5.9 | 6.0 | 6.1 |
| | Average | 1.8 | 1.8 | 1.9 | 1.8 | 1.8 | 1.8 | 2.0 | 2.0 | 2.0 |

TABLE 25

Materials use for wash after coupling

| Cycle # | AA Coupling | Avg Vol DMF wash RB1 | RB2 | RB3 | DMF Wash use g | g/mmol | DMF Sample Cart clean g | g/mmol |
|---|---|---|---|---|---|---|---|---|
| 1 | Gly 4 | 6.2 | 6.2 | 6.3 | 527.7 | 5.9 | 341.9 | 3.8 |
| 2 | Glu 3 | 6.7 | 6.7 | 6.9 | 557.2 | 6.4 | 368.8 | 4.2 |
| 3 | Aib 2 | 7.5 | 7.5 | 7.8 | 609.5 | 7.1 | 340.8 | 4.0 |
| | Total | 20.4 | 20.4 | 20.9 | 1694.4 | 19.3 | 1051.5 | 12.0 |
| | Average | 6.8 | 6.8 | 7.0 | 564.8 | 6.4 | 350.5 | 4.0 |

TZP Tetramer Purity Analysis Method

After coupling of Boc-Tyr 1, the resin is transferred out from all three reactors to drying disks, de-swelled by washing with methylene chloride and dried. The tetramer sample is soft cleaved with tBu and Boc protection group remain on the peptide and its purity is analyzed as following method. For every 500 mg of peptide on resin, add 10 mL of 30% hexafluoro-2-propanol/methylene chloride (v/v) in a scintillation vial. Mix on rotary mixer for 2 hours. Filter and wash resin cake with 10 ml of methylene chloride. Concentrate to an oil by rotavapor. The tetramer oil is further diluted with 50% acetonitrile/water (v/v) for UPLC-MS analysis. The resulting TZP tetramer purity for RB1, RB2 and RB3 are 99.23%, 99.58% and 99.39%, respectively.

Batch Process Method for TZP Tetramer Synthesis

TZP tetramer batch process at 600 mmol is described followings for comparison with reactor-in-series technology. It is noted that a single batch reactor is used for the batch process in lieu of three batch reactors in series employed by the new technology. The material use is summarized in Table 26.

Fmoc-Gly-OH Loading

CTC resin (500 g) is charged to a reactor. The resin is swelled with DMF and stirred. Fmoc-Gly-OH along with DMF/DCM is added into the reactor and loading for 2 hrs. The solution is drained and wash with DMF. Add DMF/DIPEA/MeOH twice into the reactor and drain for capping and stir for 20 min, each. The Gly loaded resin is further wash with DMF. Loading is determined to be 1.2 mmol/g.

Fmoc Deprotection

Fmoc deprotection employs two stirs of 20% piperidine in DMF. For each stir, 80 min reaction time applies and the deprotection reagents are drained and filtrated. Upon completion of deprotection reaction, wash with 6.5 volume DMF eight times with 5 min stirs. Chloranil test is used to confirm deprotection completion.

Amino Acid Activation

An oxyma solution (2 eq., 1.25 mol/kg) is added into a pre-activation reactor and then amino acid (2 eq.) is added along with additional DMF solvent to dilute amino acid concentration to 0.4 mol/kg. Then DIC solution (2.2 eq., 1.25 mol/kg) is added into the reactor to start the activation. 2 hr. activation time is applied for Glu while 15 mins stir is used for Aib and Tyr. The activation process is maintained at 20° C.

Coupling

The activated ester solution is transferred to the reactor which contains deprotected peptide on resin. 8 hrs. stir time is applied for Glu and Aib while Tyr coupling would require 18 hrs. Kaiser test is used to confirm reaction completion. Once the coupling completes, the coupling solution is drained and 3×6.5 vol. DMF wash is employed to remove residual activated esters.

Purity Analysis

Similar soft cleavage analytical method along with UPLC-MS is used for determining TZP tetramer sample for batch process. The purity is determined 99.6%.

TABLE 26

Manufacturing batch process material uses at 600 mmol scale for TZP tetramer synthesis.

| Process step | Reagent/Solvent | Volume | Equivalence |
|---|---|---|---|
| Fmoc de-protection washes | 20% (v/v) piperidine/DMF | 2 × 6.5 ml/g resin | |
| Post de-protection washes | DMF | 8 × 6.5 ml/g resin | |
| Coupling | Amino acid | | 2 |
| | Oxyma | | 2 |
| | DIC | | 2.2 |
| | DMF | 8.36 ml/g resin | |
| Post coupling washes | DMF | 3 × 6.5 ml/g resin | |

Method Comparison

Similar TZP tetramer purities are obtained for reactor-in-series technology and batch method (99.3% and 99.6%, respectively). For the reactor-in-series method, 118.9 g total materials (solvents, reagents excludes resin) are utilized per mmol starting resin to produce TZP tetramer. In the batch method, 218.8 g total materials (solvents, reagents excludes resin) are applied per mmol starting resin. Overall, new reactor-in-series allows 45.7% PMI reduction compared with traditional batch methods.

Example Construction of Tirzepatide Tetramer by Solid Phase Peptide Synthesis (SPPS) in N-Butylpyrrolidinone/Furans Green Alternative Solvent Significant amount of toxic solvent such as dimethylformamide, N-methyl-2-pyrrolidone, dimethylacetamide and dichloromethane are utilized in conventional solid phase peptide synthesis which poses challenges to industrial hygiene and environmental protection. For this reason, there is a strong interest in developing greener alternative solvent with the PMI reduction benefits of reactor-in-series method for next generation SPPS technology. NBP/furans (particularly prefer tetrahydrofuran and 2-methyltetrahydrofuran) dual system has been chosen as alternative green solvent for its excellent swelling of polystyrene-based resin, coupling reagents solubility, and high coupling and deprotection reaction performance from extensive prescreening studies. For the purpose of back-to-back comparison with TZP (tirzepatide) tetramer synthesis using DMF solvent in previous example, NBP/THE green alternative solvent system is applied to synthesize tirzepatide tetramer:

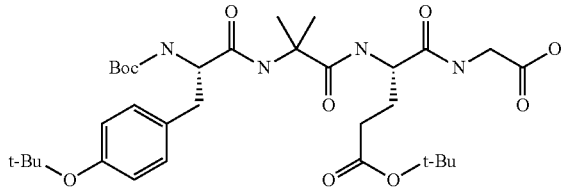 [SMILES: CC(C)(C)OC(=O)CC[C@H](NC(=O)C(C)(C)NC(=O)[C@H](Cc1ccc(OC(C)(C)C)cc1)NC(=O)OC(C)(C)C)C(=O)NCC(=O)O]

Construction of this tetramer using the reactors-in-series method described in the following text. The amino acids sequence is presented in Table 27, where 9-fluorenylmethyloxycarbonyl (Fmoc) group protects α-nitrogen of glycine, glutamic acid and 2-aminoisobutyric acid, while t-butyloxycarbonyl (Boc) and tert-butyl (tBu) are used to protect tyrosine α-nitrogen and oxygen of glutamic acid, respectively. It is noted that Fmoc-Gly-OH loaded CTC resin (loading 0.85 mmol/g) prepared in TZP tetramer synthesis in DMF solvent example is used for NBP/THE green solvent example. The detailed loading method can be referred to previous example. Similar reactor-in-series method is used to construct the remaining 3 amino acids in NBP/THF solvent system on CTC resin is shown below.

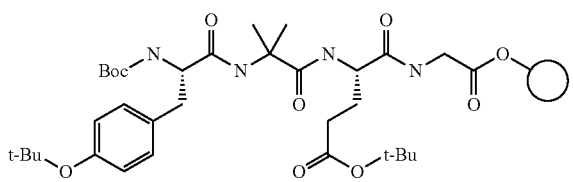 [SMILES: COC(=O)CNC(=O)[C@H](CCC(=O)OC(C)(C)C)NC(=O)C(C)(C)NC(=O)[C@H](Cc1ccc(OC(C)(C)C)cc1)NC(=O)OC(C)(C)C]

TABLE 27

Order of the 4 amino acids used in the synthesis of Tirzepatide tetramer via SPPS

| Amino acid (AA) order of addition | AA position on peptide | AA name | AA used in coupling step |
|---|---|---|---|
| 1 | 4 | Glycine | Fmoc-Gly-OH |
| 2 | 3 | Glutamic acid | Fmoc-Glu(tBu)-OH |
| 3 | 2 | 2-Aminoisobutyric acid | Fmoc-Aib-OH |
| 4 | 1 | Tyrosine | Boc-Tyr(tBu)-OH |

Reactor-In-Series with NBP/Furans Alternative Solvent Method

Raw Material Preparation

Prepare a 20 vol % solution of piperidine in NBP/THF as follows: dilute piperidine (2.0 L) up to a volume of 10.0 L by the addition of NBP/THF (1.5:1 v:v) to obtain a 20% solution by volume.

Prepare a 0.72 mol/kg solution of oxyma in NBP/THF (2:1, v:v) as follows: dissolve ethyl (hydroxyimino) cyanoacetate (oxyma, 176.1 g) in NBP: THF (2:1, v:v) (1545.1 g) to obtain a 0.72 mol/kg solution, then bubble nitrogen through the solution at 2 SCFH.

Prepare a 0.72 mol/kg solution of DIC in NBP/THF (2:1, v:v) as follows: dissolve N,N'-5 diisopropylcarbodiimide (172.0 g) in NBP/THF (2:1, v:v) (1721.3 g) to obtain a 0.72 mol/kg solution, then bubble nitrogen through the solution at 2 SCFH.

Prepare a 0.35 mol/kg solution of glutamic acid in NBP/THF (2:1, v:v) as follows: dissolve Fmoc-Glu(tBu)-OH (175.8 g) in NBP/THF (2:1, v:v) (1004.5 g), shake to dissolve, and then bubble nitrogen through the solution at 2 SCFH.

Prepare a 0.35 mol/kg solution of Fmoc-Aib-OH in NBP/THF (2:1, v:v) as follows: dissolve Fmoc-Aib-OH (139.4 g) in NBP/THF (2:1, v:v) (1045.9 g), shake to dissolve, and then bubble nitrogen through the solution at 2 SCFH.

Prepare a 0.45 mol/kg solution of Boc-Tyr (tBu)-OH in NBP/THF (2:1, v:v) as follows: dissolve Boc-Tyr (tBu)-OH (139.4 g) in NBP/THF (2:1, v:v) (1040.9 g), shake to dissolve, and then bubble nitrogen through the solution at 2 SCFH.

Prepare the reaction system as follows: add CTC resin (108 g, 0.85 mmol/g, 91.8 mmol), divided equally between the reactors "RB1", "RB2", and "RB3". Add 350 mL NBP/THF (1.5:1, v:v) to each reactor and stir at room temperature for 1 h at 20° C. to swell the resin.

General Procedure A—Fmoc deprotection and NBP/THE washing process: Fmoc deprotection is proceeded in parallel for all three reactors, RB1, RB2 and RB3 under 30° C. for a specific amount of time and 20% piperidine solution in NBP/THF (1.5:1, v:v). Then solution is drained to waste tank and additional piperidine solution is charged for deprotection stir until reaction is completed. More specifically for the $1^{st}$ deprotection stir of Fmoc-Gly-OH as an example, to RB1 add a solution of piperidine (20 vol % in NBP/THF (1.5:1, v:v), 209 g) and rinse the piperidine transfer line with 5 ml of NBP/THF (1.5:1, v:v) solvent mixture and start stirring. In a similar manner, add 208.8 g and 205 g 20 vol % piperidine solution into RB2 and RB3 and rinse the piperidine line, respectively. Then, stir three reactors 45 mins at 30° C. for parallel deprotection and drain the solution afterwards. Online LC-MS is sampled and qualitatively verify if extracted ions peaks of Fmoc protected tetramer is zero to confirm reaction completion. To allow Fmoc-Gly-CTC to be fully deprotected, another five parallel deprotection stirs are apply to RB 1/2/3. Similar deprotection stir strategy is applied for the Glu 3 and Aib 4 deprotection with two deprotection stirs and Table 28 summarizes piperidine solution charge for the entire TZP tetramer build.

NBP/THF (1.5:1, v:v) solvent mixture is utilized for post reaction washes under 30° C. with similar reactor-in-series and solvent recycle strategies applied. More specifically, RB1/2/3 are washed with ten NBP/THF wash cycles throughout the TZP tetramer build. Used NBP/THF solvent in recycle vessel is equally divided into five charges and added into RB1/2/3 in series for the first five wash cycles with 5 min stir each. All first five NBP/THF used solvents are discarded into waste tank after usage. For the remaining 5 washes, fresh NBP/THF is used for RB 1/2/3 in series washes and collected into NBP/THF recycle vessel prepared for the next amino acid post deprotection wash. Finally, NBP/THF is charged into three reactors with 100 ml in each as the sample cart cleaning cycle and further collected into recycle vessel. Table 29 summarizes mass balance for post deprotection wash and Table 30 details residual piperidine concentration throughout the synthesis, which is below 600 PPM for all cycles.

TABLE 30

Residual piperidine concentration for wash after deprotection

| Synthesis cycle | AA deprotection | Wash # | PPM |
|---|---|---|---|
| 1 | Gly 4 | 9th | Not available |
| 1 | Gly 4 | 10th | Not available |
| 1 | Gly 4 | Sample cleaning wash | 416 |
| 2 | Glu 3 | 9th | 499 |
| 2 | Glu 3 | 10th | no data |
| 2 | Glu 3 | Sample cleaning wash | 348 |
| 3 | Aib 2 | 9th | 593 |
| 3 | Aib 2 | 10th | 506 |
| 3 | Aib 2 | Sample cleaning wash | Not available |

General Procedure B—amino acid activation and coupling process in NBP/THF: For activation and coupling reaction, NBP/THF volume ratio is adjusted to 2:1 to allow better reagents solubility. Take Fmoc-Glu(tBu)-OH coupling as an example, glutamic acid solution (0.35 mol/kg, 786.4 g), oxyma solution (0.72 mol/kg, 382.4 g) and DIC solution (0.72 mol/kg, 420.6 g) are added to a jacketed reactor RA and stir 70 min at 30° C. to form an activated glutamic acid solution and transfer to RB1 (531.9 g), RB2 (529.7 g) and RB3 (533.9 g), respectively. Stir the reactors RB1, RB2 and RB3 for 8 hrs at 30° C. and drain the solution from all three reactors to waste tank afterwards. At the end of reaction, coupling completion is checked via Kaiser test. Since Glu coupling is not complete after the first coupling step, 1.5 equivalent ratio of Fmoc-Glu(tBu)-OH activated solution is further added to allow another 19 hrs. coupling until Kaiser test passes. The remaining Aib 2 and Tyr 1 coupling however applies only one coupling step with 8 hrs and 18 hrs. stir time, respectively. Table 31 summarizes detailed material usage during coupling.

For post coupling wash using NBP/THF (1.5:1, v:v) solvent, three wash cycles are applied to rinse RA, RB1, RB2 and RB3. More specifically, fresh NBP/THF solvent is charged through spray valve into RA and then to RB1, RB2 and RB3 in series for three times. A similar sample cart cleaning procedure is conducted as post deprotection wash. All the used post coupling solvents are discarded into waste tank. The material uses for NBP/THF wash after coupling is summarized in Table 32.

TABLE 28

Material used for deprotection at 30° C.

| Cycle # | AA Deprotect | Dep. cycle | Rxn. time (min) | Volumes pip soln RB1 | RB2 | RB3 | Piperidine Use g | g/mmol | NBP in 20% Pip Solution g | g/mmol | THF in 20% Pip Solution g | g/mmol |
|---|---|---|---|---|---|---|---|---|---|---|---|---|
| 1 | Gly 4 | 1 | 45 | 6.8 | 6.8 | 6.7 | 126.4 | 1.2 | 288.9 | 3.3 | 210.6 | 2.2 |
|   |       | 2 | 45 | 6.7 | 6.9 | 6.9 | 127.2 | 1.2 | 288.9 | 3.3 | 210.6 | 2.2 |
|   |       | 3 | 45 | 6.7 | 6.6 | 6.7 | 123.9 | 1.1 | 281.5 | 3.2 | 205.2 | 2.1 |
|   |       | 4 | 120 | 7.0 | 6.9 | 6.8 | 128.3 | 1.2 | 291.4 | 3.3 | 212.4 | 2.2 |
|   |       | 5 | 300 | 6.6 | 6.8 | 6.7 | 124.6 | 1.2 | 283.1 | 3.2 | 206.3 | 2.1 |
|   |       | 6 | 120 | 7.0 | 7.0 | 6.9 | 129.5 | 1.2 | 294.1 | 3.3 | 214.4 | 2.2 |
| 2 | Glu 3 | 1 | 90 | 6.4 | 6.5 | 6.5 | 120.4 | 1.1 | 273.6 | 3.1 | 199.4 | 2.1 |
|   |       | 2 | 90 | 6.7 | 6.9 | 6.7 | 125.9 | 1.2 | 285.9 | 3.2 | 208.4 | 2.2 |
| 3 | Aib 2 | 1 | 90 | 6.5 | 6.5 | 6.5 | 121.0 | 1.1 | 274.8 | 3.1 | 200.3 | 2.5 |
|   |       | 2 | 90 | 6.8 | 6.7 | 6.5 | 123.7 | 1.1 | 280.9 | 3.2 | 204.8 | 2.1 |
| Total |  |  |  | 60.4 | 61.0 | 60.3 | 1127.1 | 10.4 | 2562.0 | 29.1 | 1867.5 | 21.9 |
| Average |  |  |  | 6.0 | 6.1 | 6.0 | 112.7 | 1.0 | 256.2 | 2.9 | 186.8 | 2.2 |

TABLE 29

Material use for wash after deprotection

| Cycle # | AA Deprotect | NBP/THF rec wash g | mmol | NBP/THF Wash g | mmol | NBP/THF Sample Cart clean g | mmol |
|---|---|---|---|---|---|---|---|
| 1 | Gly 4 | 1551.4 | 16.9 | 1307.0 | 14.2 | 657.0 | 7.2 |
| 2 | Glu 3 | 1460.4 | 16.1 | 1295.2 | 14.3 | 369.7 | 4.1 |
| 3 | Aib 2 | 1387.8 | 15.4 | 1315.6 | 14.6 | 296.9 | 3.3 |
| Total |  | 4399.6 | 48.4 | 3917.8 | 43.1 | 1323.6 | 14.5 |
| Average |  | 1466.5 | 16.1 | 1305.9 | 14.4 | 441.2 | 4.8 |

TABLE 31

Materials use for coupling

| Cycle # | AA Coupling | Coupling cycle | Coupling Time (hr.) | Activation time (min) | EQ AA RB1 | EQ AA RB2 | EQ AA RB3 | EQ Oxyma RB1 | EQ Oxyma RB2 | EQ Oxyma RB3 | EQ DIC RB1 | EQ DIC RB2 | EQ DIC RB3 |
|---|---|---|---|---|---|---|---|---|---|---|---|---|---|
| 1 | Glu 3 | 1 | 8 | 68 | 3.01 | 3.00 | 3.02 | 3.01 | 3.00 | 3.02 | 3.46 | 3.44 | 3.46 |
|   |       | 2 | 19 | 69 | 1.51 | 1.51 | 1.48 | 1.51 | 1.51 | 1.48 | 1.70 | 1.73 | 1.70 |
| 2 | Aib 2 | 1 | 8 | 35 | 3.04 | 3.04 | 3.07 | 3.04 | 3.04 | 3.07 | 3.50 | 3.49 | 3.52 |
| 3 | Tyr 1 | 1 | 18 | 35 | 3.06 | 3.06 | 3.01 | 3.06 | 3.06 | 3.06 | 3.01 | 3.51 | 3.45 |
|   | Total |   |   |   | 10.6 | 10.6 | 10.6 | 10.6 | 10.6 | 10.6 | 11.7 | 12.2 | 12.1 |
|   | Average |   |   |   | 3.5 | 3.5 | 3.5 | 3.5 | 3.5 | 3.5 | 3.9 | 4.1 | 4.0 |

TABLE 32

Materials use for wash after coupling

| Cycle # | AA Coupling | Coupling cycle | Avg Vol NBP/THF wash RB1 | Avg Vol NBP/THF wash RB2 | Avg Vol NBP/THF wash RB3 | NBP/THF Wash use g | NBP/THF Wash use g/mmol | NBP/THF Sample Cart clean g | NBP/THF Sample Cart clean g/mmol |
|---|---|---|---|---|---|---|---|---|---|
| 1 | Glu 3 | 1 | 10.7 | 10.7 | 10.7 | 992.1 | 10.8 | 391.7 | 4.3 |
|   |       | 2 | 10.6 | 10.6 | 10.6 | 985.3 | 10.7 | 297.0 | 3.2 |
| 2 | Aib 2 | 1 | 10.9 | 10.9 | 10.9 | 1013.8 | 11.1 | 278.7 | 3.1 |
| 3 | Tyr 1 | 1 | 10.4 | 10.4 | 10.4 | 971.6 | 10.8 | 357.0 | 4.0 |
|   | Total |   | 42.6 | 42.6 | 42.6 | 3962.7 | 43.5 | 1324.5 | 14.5 |
|   | Average |   | 14.2 | 14.2 | 14.2 | 1320.9 | 14.5 | 441.5 | 4.8 |

Results Summary

The resin is washed with methylene chloride and dried after coupling of Boc-Tyr 1. Then the sample is soft cleaved with 30% hexafluoro-2-propanol/methylene chloride (v/v) and isolated for UPLC-MS analysis. The resulting TZP tetramer purity for RB1, RB2 and RB3 are 92.19%, 94.64% and 98.04%, respectively. The major impurity is glutamic acid addition. This is mainly due to double glutamic acid coupling strategy applied in the example. It is noted that the challenges of Gly 4 deprotection and Glu 3 coupling can be mitigated with longer resin swelling time (>8 hrs.) before Fmoc-Gly-CTC deprotection. For example, 99.6% TZP tetramer purity is obtained with 12 hours resin swelling using NBP/2-MeTHF (1.5;1, v:v) green solvent at 1 mmol scale. For this reason, significant peptide purity improvement can be achieved using NBP/furans green solvent and reactor-in-series technology under more optimal process conditions. For the reactor-in-series method using NBP/THE green solvent, 252.71 g total materials (solvents, reagents excludes resin) are utilized per mmol starting resin to produce TZP tetramer. Conventional batch method with DMF used 218.8 g/mmol, and reactors in series method with DMF used 118.9 mmol. The procedure with NBP/THF was new and not optimized, and it used more total solvent than the procedure with DMF. However, the reactors in series still use less solvent compared to single batch reactor, for either solvent system.

The invention claimed is:

1. A process for coupling amino acid "X" to a protected N-group attached to a peptide synthesis resin comprising:

obtaining a first reactor and a second reactor, the first reactor and the second reactor each containing a quantity of a protected N-group attached to a peptide synthesis resin;

adding a first quantity of de-protecting reagent to the first reactor;

removing the first quantity of de-protecting reagent from the first reactor adding the first quantity of de-protecting reagent to the second reactor;

adding a second quantity of de-protecting reagent to the first reactor;

removing the first quantity of de-protecting reagent from the second reactor;

removing the second quantity of de-protecting reagent from the first reactor;

adding the second quantity of de-protecting reagent to the second reactor;

removing the second quantity of de-protecting reagent from the second reactor;

washing the peptide synthesis resin in both the first and second reactors with a solvent;

adding a first quantity amino acid "X" activated ester to the first reactor;

removing the first quantity amino acid "X" activated ester from the first reactor;

adding the first quantity of amino acid "X" activated ester to the second reactor, adding a second quantity of amino acid "X" activated ester to the first reactor;

removing the first quantity of amino acid "X" activated ester from the second reactor;

removing the second quantity of amino acid "X" activated ester from the first reactor adding the second quantity of amino acid "X" activated ester to the second reactor;

removing the second quantity of amino acid "X" activated ester from the second reactor; and washing the peptide synthesis resin in both the first and second reactors with a solvent.

2. The process of claim 1, wherein the amino acid "X", that is found in the first and second quantity of amino acid "X" activated ester, itself has a protected N-group.

3. The process of claim 1, further comprising:

adding the first quantity of de-protecting reagent to a third reactor, wherein this adding occurs after the first quantity of de-protecting reagent is removed from the second reactor, wherein the third reactor contains a quantity of a protected N-group attached to a peptide synthesis resin; and adding the second quantity of de-protecting reagent to the third reactor, wherein this adding occurs after the second quantity of de-protecting reagent is removed from the second reactor.

4. The process of claim 3, further comprising:

adding the first quantity of amino acid "X" activated ester to the third reactor, wherein this adding occurs after the first quantity of amino acid "X" activated ester is removed from the second reactor; and adding the second quantity of amino acid "X" activated ester to the third reactor, wherein this adding occurs after the second quantity of amino acid "X" activated ester is removed from the second reactor.

5. The process of claim 4, further comprising:

adding a third quantity of de-protecting reagent to the first reactor, wherein this third quantity of de-protecting reagent is added to the first reactor after the second quantity of de-protecting reagent has been removed from the first reactor; and transferring the third quantity of de-protecting reagent from the first reactor to the second reactor, wherein this transferring occurs after the second quantity of de-protecting reagent is removed from the second reactor; and transferring the third quantity of de-protecting reagent from the second reactor to the third reactor; and removing the third quantity of de-protecting reagent from the third reactor.

6. The process of claim 5, further comprising:

adding a third quantity amino acid "X" activated ester to the first reactor, wherein this adding occurs after the second quantity of amino acid "X" activated ester is removed from the first reactor;

transferring the third quantity of amino acid "X" activated ester to the second reactor, wherein this transferring occurs after the second quantity of amino acid "X" activated ester is removed from the second reactor;

transferring the third quantity of amino acid "X" activated ester from the second reactor to the third reactor; and removing the third quantity of amino acid "X" activated ester from the third reactor.

7. The process of claim 6, further comprising:

removing the first quantity of amino acid "X" activated ester from the third reactor; and adding the first quantity of amino acid "X" activated ester back to first reactor.

8. The process of claim 7, further comprising:

removing the first quantity of de-protecting reagent from the third reactor; and adding the first quantity of de-protecting reagent back to the first reactor.

9. The process of claim 1, wherein the washing the first and second reactors with a solvent occurs by adding solvent to the reactors.

10. The process of claim 2, wherein after the second quantity of amino acid "X" activated ester has been removed from the first reactor, the method further comprising:

adding a first additional quantity of de-protecting reagent to the first reactor;

transferring the first additional quantity of de-protecting reagent from the first reactor to the second reactor;

adding a second additional quantity of de-protecting reagent to the first reactor;

removing the first additional quantity of de-protecting reagent from the second reactor;

transferring the second additional quantity of de-protecting reagent from the first reactor to the second reactor;

removing the second additional quantity of de-protecting reagent from the second reactor.

11. The process of claim 10 wherein after the second additional quantity of de-protecting reagent is removed from the first reactor, further comprising:

adding a first quantity amino acid "Z" activated ester to the first reactor;

transferring the first quantity of amino acid "Z" activated ester to the second reactor;

adding a second quantity of amino acid "Z" activated ester to the first reactor;

removing the first quantity of amino acid "Z" activated ester from the second reactor;

transferring the second quantity of amino acid "Z" activated ester from the first reactor to the second reactor; and removing the second quantity of amino acid "Z" activated ester from the second reactor.

12. The process of claim 11, further comprising:

adding the first additional quantity of de-protecting reagent to a third reactor, wherein this adding occurs after the first additional quantity of de-protecting reagent is removed from the second reactor, wherein the third reactor contains a quantity of a protected N-group of amino acid "X" activated ester; and adding the second additional quantity of de-protecting reagent to the third reactor, wherein this adding occurs after the second quantity of de-protecting reagent is removed from the second reactor.

13. The process of claim 12, further comprising:

adding the first quantity of amino acid "Z" activated ester to the third reactor, wherein this adding occurs after the first quantity of amino acid "Z" is removed from the second reactor; and adding the second quantity of amino acid "Z" activated ester to the third reactor, wherein this adding occurs after the second quantity of amino acid "Z" activated ester is removed from the second reactor.

14. The process of claim 1, wherein the peptide synthesis resin in the first and second reactors are Seiber or Rink resins.

15. The process of claim 1, wherein the peptide synthesis resin in the first and second reactors are Wang resins or CTC resins.

16. The process of claim 1, wherein the amount of amino acid X that is added is between 1.1 and 1.6 equivalents.

17. A process for coupling amino acid "X" to a protected N-group that is attached to a peptide synthesis resin found in a first reactor and a second reactor, comprising:

adding a first quantity of de-protecting reagent to the first reactor;
removing the first quantity of de-protecting reagent from the first reactor
adding the first quantity of de-protecting reagent to the second reactor;
adding a second quantity of de-protecting reagent to the first reactor;
removing the first quantity of de-protecting reagent from the second reactor;
removing the second quantity of de-protecting reagent from the first reactor
adding the second quantity of de-protecting reagent to the second reactor;
removing the second quantity of de-protecting reagent from the second reactor;
adding a first quantity amino acid "X" activated ester to the first reactor;
removing the first quantity amino acid "X" activated ester from the first reactor;
adding the first quantity of amino acid "X" activated ester to the second reactor;
adding a second quantity of amino acid "X" activated ester to the first reactor;
removing the first quantity of amino acid "X" activated ester from the second reactor;
removing the second quantity of amino acid "X" activated ester from the first reactor;
adding the second quantity of amino acid "X" activated ester to the second reactor; and
removing the second quantity of amino acid "X" activated ester from the second reactor.

18. The process of claim 17, wherein the amino acid "X", that is found in the first and second quantity of amino acid "X" activated ester, itself has a protected N-group.

19. The process of claim 16, further comprising:
adding the first quantity of de-protecting reagent to a third reactor, wherein this adding occurs after the first quantity of de-protecting reagent is removed from the second reactor, wherein the third reactor contains a quantity of a protected N-group attached to a peptide synthesis resin;
removing the first quantity of de-protecting reagent from the third reactor;
adding the second quantity of de-protecting reagent to the third reactor, wherein this adding occurs after the second quantity of de-protecting reagent is removed from the second reactor;
adding a third quantity of de-protecting reagent to the first reactor, wherein this third quantity of de-protecting reagent is added to the first reactor after the second quantity of de-protecting reagent has been removed from the first reactor; and
transferring the third quantity of de-protecting reagent from the first reactor to the second reactor, wherein this transferring occurs after the second quantity of de-protecting reagent is removed from the second reactor;
transferring the third quantity of de-protecting reagent from the second reactor to the third reactor;
adding the first quantity of amino acid "X" activated ester to the third reactor, wherein this adding occurs after the first quantity of amino acid "X" activated ester is removed from the second reactor;
removing the first quantity of amino acid "X" activated ester from the third reactor;
adding the second quantity of amino acid "X" activated ester to the third reactor, wherein this adding occurs after the first quantity of amino acid "X" activated ester is removed from the third reactor; and
removing the second quantity of amino acid "X" activated ester from the third reactor.

20. The process of claim 19, further comprising:
adding a third quantity amino acid "X" activated ester to the first reactor, wherein this adding occurs after the second quantity of amino acid "X" activated ester is removed from the first reactor;
transferring the third quantity of amino acid "X" activated ester to the second reactor, wherein this transferring occurs after the second quantity of amino acid "X" activated ester is removed from the second reactor;
transferring the third quantity of amino acid "X" activated ester and from the second reactor to the third reactor;
removing the third quantity of amino acid "X" activated ester from the third reactor;
adding the first quantity of amino acid "X" activated ester back to first reactor, wherein this adding of the first quantity of amino acid "X" activated ester occurs after the first quantity of amino acid "X" activated ester is removed from the third reactor.

21. A process for coupling amino acid "X" to a de-protected N-group attached to a peptide synthesis resin comprising:
obtaining a first reactor and a second reactor, the first reactor and the second reactor each containing a quantity of a de-protected N-group attached to a peptide synthesis resin;
adding a first quantity amino acid "X" activated ester to the first reactor;
removing the first quantity amino acid "X" activated ester from the first reactor;
adding the first quantity of amino acid "X" activated ester to the second reactor,
adding a second quantity of amino acid "X" activated ester to the first reactor;
removing the first quantity of amino acid "X" activated ester from the second reactor;
removing the second quantity of amino acid "X" activated ester from the first reactor;
adding the second quantity of amino acid "X" activated ester to the second reactor; and
removing the second quantity of amino acid "X" activated ester from the second reactor.

22. The process of claim 21, further comprising washing the first reactor and a second reactor with solvent.

23. The process of claim 20, further comprising:
adding the first quantity of amino acid "X" activated ester to a third reactor, wherein this adding occurs after the first quantity of amino acid "X" is removed from the second reactor, wherein the third reactor contains a quantity of a protected N-group attached to a peptide synthesis resin;
removing the first quantity of amino acid "X" activated ester from the third reactor and
adding the second quantity of amino acid "X" to the third reactor.

24. The process of claim 23, further comprising:
adding a third quantity of amino acid "X" to the first reactor, wherein this third quantity of amino acid "X" is added to the first reactor after the second quantity of amino acid "X" has been removed from the first reactor; and
transferring the third quantity of amino acid "X" from the first reactor to the second reactor, wherein this transferring occurs after the second quantity of amino acid "X" is removed from the second reactor.

25. The process of claim 24, further comprising:
removing the second quantity of amino acid "X" from the third reactor;
transferring the third quantity of amino acid "X" from the second reactor to the third reactor;
removing the third quantity of amino acid "X" from the third reactor; and
adding the first quantity of amino acid "X" back to the first reactor, wherein the first quantity of amino acid "X" is added back to the first reactor after the first quantity of amino acid "X" de-protecting reagent has been removed from the third reactor.

26. A process for de-protecting a protected N-group attached to a peptide synthesis resin comprising:
obtaining a first reactor and a second reactor, the first reactor and the second reactor each containing a quantity of a protected N-group attached to a peptide synthesis resin;
adding a first quantity of de-protecting reagent to the first reactor;
removing the first quantity of de-protecting reagent from the first reactor
adding the first quantity of de-protecting reagent to the second reactor;
adding a second quantity of de-protecting reagent to the first reactor;
removing the first quantity of de-protecting reagent from the second reactor;
removing the second quantity of de-protecting reagent from the first reactor;
adding the second quantity of de-protecting reagent to the second reactor; and
removing the second quantity of de-protecting reagent from the second reactor.

27. The process of claim 26, further comprising washing the first reactor and a second reactor with solvent.

28. The process of claim 26, further comprising:
adding the first quantity of de-protecting reagent to a third reactor, wherein this adding occurs after the first quantity of de-protecting reagent is removed from the second reactor, wherein the third reactor contains a quantity of a protected N-group attached to a peptide synthesis resin;
removing the first quantity of de-protecting reagent from the third reactor; and
adding the second quantity of de-protecting reagent to the third reactor, wherein this adding occurs after the second quantity of de-protecting reagent is removed from the second reactor.

29. The process of claim 28, further comprising:
adding a third quantity of de-protecting reagent to the first reactor, wherein this third quantity of de-protecting reagent is added to the first reactor after the second quantity of de-protecting reagent has been removed from the first reactor; and
transferring the third quantity of de-protecting reagent from the first reactor to the second reactor, wherein this transferring occurs after the second quantity of de-protecting reagent is removed from the second reactor.

30. The process of claim 29, further comprising:
removing the second quantity of de-protecting reagent from the third reactor;
transferring the third quantity of de-protecting reagent from the second reactor to the third reactor;
removing the third quantity of de-protecting reagent from the third reactor; and
adding the first quantity of de-protecting reagent back to the first reactor, wherein the first quantity of de-protecting reagent is added back to the first reactor after the first quantity of de-protecting reagent has been removed from the third reactor.

31. The process of claim 9, wherein multiple washing cycles occur between the addition of each particular amino acid.

32. The process of claim 31, wherein the washing solvent from each washing cycle is collected in a recycle vessel and this recycled washing solvent is used in the next washing cycle.

33. The process of claim 32, wherein the recycled washing solvent is used for the first half of the subsequent washing cycles.

34. The process of claim 32, wherein using the recycled washing solvent cuts solvent requirements in half.

35. The process of claim 32, wherein using the recycled washing solvent reduces solvent requirements by about 79%.

36. The process of claim 9, wherein the solvent comprises an environmentally friendly or green solvent.

37. The process of claim 36, wherein the environmentally friendly or green solvent is acetonitrile, ethyl acetate, isopropyl acetate, 2-methyltetrahydrofuran, cyclopentyl methyl ether, or N-butylpyrrolidinone, or mixtures thereof.

38. The process of claim 9, wherein the solvent is a mixture of N-butylpyrrolidinone and tetrahydrofuran.

39. The process of claim 9, wherein the solvent is a mixture of N-butylpyrrolidinone and 2-methyltetrahydrofuran.

* * * * *